(12) United States Patent
Umeda

(10) Patent No.: US 12,169,323 B2
(45) Date of Patent: Dec. 17, 2024

(54) ZOOM LENS, OPTICAL APPARATUS, AND METHOD FOR MANUFACTURING ZOOM LENS

(71) Applicant: Nikon Corporation, Tokyo (JP)

(72) Inventor: Takeshi Umeda, Fujisawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 18/139,801

(22) Filed: Apr. 26, 2023

(65) Prior Publication Data

US 2023/0258907 A1 Aug. 17, 2023

Related U.S. Application Data

(62) Division of application No. 17/123,597, filed on Dec. 16, 2020, now Pat. No. 11,668,899, which is a
(Continued)

(30) Foreign Application Priority Data

Jan. 30, 2015 (JP) ................................ 2015-017212

(51) Int. Cl.
*G02B 9/60* (2006.01)
*G02B 13/02* (2006.01)
(Continued)

(52) U.S. Cl.
CPC ............ *G02B 9/60* (2013.01); *G02B 13/02* (2013.01); *G02B 15/145527* (2019.08);
(Continued)

(58) Field of Classification Search
CPC .. G02B 27/0025; G02B 15/20; G02B 15/177; G02B 13/02; G02B 9/60
(Continued)

(56) References Cited

U.S. PATENT DOCUMENTS

| 4,730,908 A | 3/1988 | Tanaka |
| 5,530,594 A | 6/1996 | Shibayama |

(Continued)

FOREIGN PATENT DOCUMENTS

| CN | 102411196 A | 4/2012 |
| CN | 104040405 A | 9/2014 |

(Continued)

OTHER PUBLICATIONS

International Search Report from International Patent Application No. PCT/JP2016/052735, Apr. 5, 2016.
(Continued)

*Primary Examiner* — James R Greece
(74) *Attorney, Agent, or Firm* — Potomac Law Group, PLLC

(57) ABSTRACT

A zoom lens includes, in order from an object along an optical axis: a first lens group having a negative refractive power; a second lens group having a positive refractive power; a third lens group having a negative refractive power; a fourth lens group; and a fifth lens group. When the zoom lens performs varying magnification, the distance between the first and second lens groups changes, the distance between the second and third lens groups changes, the distance between the third and fourth lens groups changes, the distance between the fourth and fifth lens groups changes, the second and fourth lens groups move along the same trajectory along the optical axis, and at least the third lens group moves along the optical axis.

7 Claims, 42 Drawing Sheets

Related U.S. Application Data division of application No. 16/503,615, filed on Jul. 4, 2019, now Pat. No. 10,908,388, which is a division of application No. 15/545,706, filed as application No. PCT/JP2016/052735 on Jan. 29, 2016, now Pat. No. 10,379,319.

(51) Int. Cl.
  *G02B 15/14* (2006.01)
  *G02B 15/177* (2006.01)
  *G02B 27/00* (2006.01)
  *G02B 27/64* (2006.01)

(52) U.S. Cl.
  CPC ....... *G02B 15/177* (2013.01); *G02B 27/0025* (2013.01); *G02B 27/646* (2013.01)

(58) Field of Classification Search
  USPC .......................................... 359/676, 680–682
  See application file for complete search history.

(56) References Cited

U.S. PATENT DOCUMENTS

| | | | | |
|---|---|---|---|---|
| 5,663,835 | A * | 9/1997 | Shibayama | G02B 15/177 359/686 |
| 6,285,509 | B1 | 9/2001 | Nakayama et al. | |
| 7,724,446 | B2 * | 5/2010 | Chang | G02B 13/18 359/676 |
| 10,379,319 | B2 | 8/2019 | Umeda | |
| 2009/0002842 | A1 * | 1/2009 | Souma | G02B 15/145527 359/557 |
| 2012/0069441 | A1 | 3/2012 | Fujimoto et al. | |
| 2012/0268831 | A1 | 10/2012 | Yamanashi | |
| 2013/0088786 | A1 | 4/2013 | Sugita | |
| 2013/0215320 | A1 | 8/2013 | Souma et al. | |
| 2014/0132790 | A1 * | 5/2014 | Takahashi | H04N 23/667 359/680 |
| 2014/0268363 | A1 | 9/2014 | Hirayama et al. | |
| 2016/0170189 | A1 * | 6/2016 | Fujimoto | G02B 27/0025 359/557 |
| 2018/0196223 | A1 | 7/2018 | Umeda | |

FOREIGN PATENT DOCUMENTS

| | | |
|---|---|---|
| EP | 3252519 A1 | 12/2017 |
| JP | 61-003113 A | 1/1986 |
| JP | 09-159918 A | 6/1997 |
| JP | 11-190821 A | 7/1999 |
| JP | 2001-042217 A | 2/2001 |
| JP | 2004-061679 A | 2/2004 |
| JP | 2006-337647 A | 12/2006 |
| JP | 2007-279077 A | 10/2007 |
| JP | 2013-080151 A | 5/2013 |
| WO | WO 2016/121955 A1 | 8/2016 |

OTHER PUBLICATIONS

Written Opinion of the International Searching Authority from International Patent Application No. PCT/JP2016/052735, Apr. 5, 2016.
Office Action issued Jul. 24, 2018 in Japanese Patent Application No. 2016-572199.
Extended European Search Report issued Aug. 28, 2018, in European Patent Application No. 16743558.5.
Office Action issued May 7, 2019, in Chinese Patent Application No. 201680019159.5.
Decision of Refusal issued Feb. 19, 2019 in Japanese Patent Application No. 2016-572199.
Office Action issued Nov. 1, 2018, in U.S. Appl. No. 15/545,706.
Office Action issued Jan. 28, 2020, in Japanese Patent Application No. 2019-093547.
Office Action issued Jul. 17, 2020, in Indian Patent Application No. 201717030597.
Office Action issued Nov. 8, 2019, in U.S. Appl. No. 16/503,615.
Office Action issued May 20, 2020, in U.S. Appl. No. 16/503,615.
Advisory Action issued Sep. 2, 2020, in U.S. Appl. No. 16/503,615.
Office Action issued Aug. 17, 2021, in Chinese Patent Application No. 202010180906.1.
Office Action issued Aug. 23, 2021, in Chinese Patent Application No. 202010180665.0.
Office Action issued Sep. 14, 2022, in U.S. Appl. No. 17/123,597.

* cited by examiner (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION

ZOOM LENS, OPTICAL APPARATUS, AND METHOD FOR MANUFACTURING ZOOM LENS

TECHNICAL FIELD

The present invention relates to a zoom lens, an optical apparatus, and a method for manufacturing a zoom lens which are ideal for photographic cameras, electronic still cameras, video cameras, and the like.

Priority is claimed on Japanese Patent Application No. 2015-017212, filed Jan. 30, 2015, the content of which is incorporated herein by reference.

TECHNICAL BACKGROUND

Conventionally, a vibration-reduction (variable power optical system) having a wide angle of view has been proposed (for example, see Patent Document 1).

RELATED ART DOCUMENTS

Patent Document

Patent Document 1:
Japanese Patent Application, Publication No. 2007-279077

SUMMARY OF INVENTION

Technical Problem

However, there is a problem that the conventional vibration-reduction described above cannot sufficiently meet the demands for optical systems having an F-number for brightness and an excellent optical performance.

Solution to Problem

According to an aspect of the present invention, there is provided a zoom lens including, in order from an object along an optical axis, a first lens group having a negative refractive power, a second lens group having a positive refractive power, a third lens group having a negative refractive power, a fourth lens group, and a fifth lens group, wherein when the zoom lens performs varying magnification, the distance between the first and second lens groups changes, the distance between the second and third lens groups changes, the distance between the third and fourth lens groups changes, the distance between the fourth and fifth lens groups changes, the second and fourth lens groups move along the same trajectory along the optical axis, and at least the third lens group moves along the optical axis. In an example, the fourth lens group may have a positive refractive power and the fifth lens group may have a positive refractive power.

According to another aspect of the present invention, there is provided a zoom lens including, in order from an object along an optical axis: a first lens group having a negative refractive power, a second lens group having a positive refractive power, a third lens group having a negative refractive power, a fourth lens group having a positive refractive power, and a fifth lens group having a positive refractive power, wherein when the zoom lens performs varying magnification from a wide-angle end state to a telephoto end state, the second and fourth lens groups move by the same distance along the optical axis, and at least the third lens group moves along the optical axis.

According to another aspect of the present invention, there is provided a method for manufacturing a zoom lens, wherein the zoom lens includes, in order from an object along an optical axis: a first lens group having a negative refractive power, a second lens group having a positive refractive power, a third lens group having a negative refractive power, a fourth lens group, and a fifth lens group, wherein the method includes: arranging the zoom lens such that, when the zoom lens performs varying magnification, the distance between the first and second lens groups changes, the distance between the second and third lens groups changes, the distance between the third and fourth lens groups changes, the distance between the fourth and fifth lens groups changes, the second and fourth lens groups move along the same trajectory along the optical axis, and at least the third lens group moves along the optical axis. In an example, the fourth lens group may have a positive refractive power and the fifth lens group may have a positive refractive power.

According to another aspect of the present invention, there is provided a method for manufacturing a zoom lens, wherein the zoom lens includes, in order from an object along an optical axis: a first lens group having a negative refractive power, a second lens group having a positive refractive power, a third lens group having a negative refractive power, a fourth lens group having a positive refractive power, and a fifth lens group having a positive refractive power, wherein the method includes: arranging the zoom lens such that, when the zoom lens performs varying magnification from a wide-angle end state to a telephoto end state, the second and fourth lens groups move by the same distance along the optical axis, and at least the third lens group moves along the optical axis.

DESCRIPTION OF EMBODIMENTS

Figure 1:
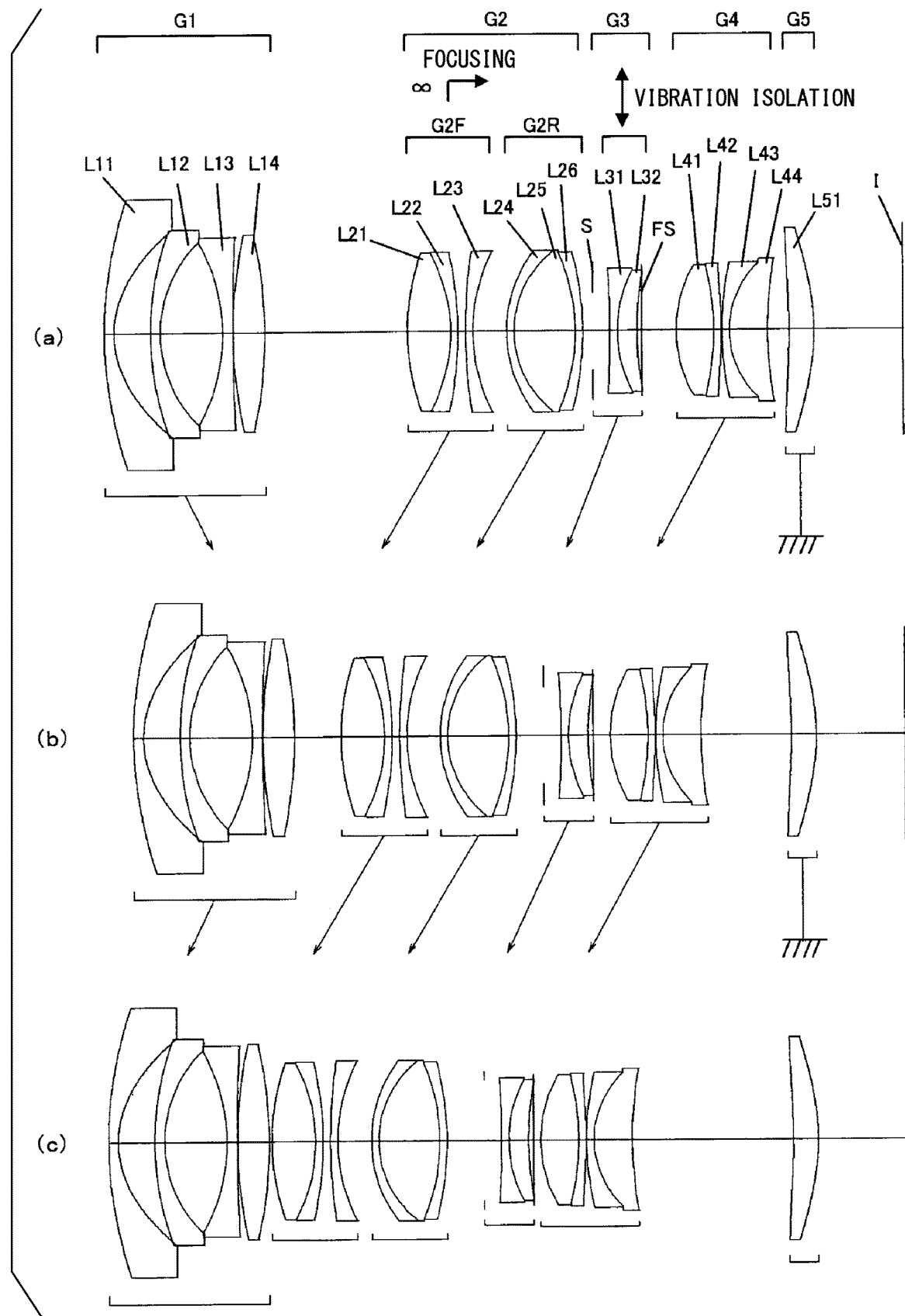
FIG. 1 is a cross-sectional view of a zoom lens according to Example 1, wherein parts (a), (b), and (c) are in a wide-angle end state, an intermediate focal length state, and a telephoto end state, respectively.

An embodiment of a zoom lens, an optical apparatus, and a zoom lens manufacturing method will now be described. First, a zoom lens according to an embodiment will be described.

There is provided a zoom lens including, in order from an object along an optical axis, a first lens group having a negative refractive power, a second lens group having a positive refractive power, a third lens group having a negative refractive power, a fourth lens group, and a fifth lens, wherein when the zoom lens performs varying magnification, the distance between the first and second lens groups changes, the distance between the second and third lens groups changes, the distance between the third and fourth lens groups changes, the distance between the fourth and fifth lens groups changes, the second and fourth lens groups move along the same trajectory along the optical axis, and at least the third lens group moves along the optical axis. In an example, the fourth lens group may have a positive refractive power and the fifth lens group may have a positive refractive power.

Alternatively, there is provided a zoom lens including, in order from an object along an optical axis, a first lens group having a negative refractive power, a second lens group having a positive refractive power, a third lens group having a negative refractive power, a fourth lens group having a positive refractive power, and a fifth lens group having a positive refractive power, wherein when the zoom lens performs varying magnification (varying power) from a wide-angle end state to a telephoto end state, the second and fourth lens groups move by the same distance along the optical axis, and at least the third lens group moves along the optical axis.

Due to this configuration, it is possible to perform varying magnification and to correct aberrations satisfactorily upon varying magnification.

Moreover, it is preferable that the zoom lens satisfy Conditional Expression (1) below.

$$1.500 < (-f3)/fw < 10.000 \quad (1)$$

where f3: a focal length of the third lens group fw: a focal length of the entire zoom lens system in the wide-angle end state Conditional Expression (1) is a conditional expression for defining an appropriate range of the ratio of the focal length of the third lens group with respect to the focal length of an entire system of the zoom lens in the wide-angle end state. When Conditional Expression (1) is satisfied, it is possible to realize a brightness of an F-number of approximately F2.8 to F4.0 and to correct various aberrations including spherical aberration satisfactorily.

When a correspondence value of Conditional Expression (1) exceeds the upper limit value, the burden of coma aberration correction by the fourth lens group increases, eccentricity sensitivity of the fourth lens group increases, and it may be difficult to correct coma aberration. As a result, it may be difficult to realize a brightness of an F-number of approximately F2.8 to F4.0. In order to obtain the effect reliably, it is preferable that the upper limit value of Conditional Expression (1) be set to 8.500. Moreover, in order to obtain the effect more reliably, it is preferable that the upper limit value of Conditional Expression (1) be set to 7.000.

On the other hand, when the correspondence value of Conditional Expression (1) is smaller than the lower limit value, the burden of varying magnification on lens groups other than the third lens group increases. The eccentricity sensitivity of the second and fourth lens groups particularly increases, and it may be difficult to correct spherical aberration and coma aberration. As a result, it may be difficult to realize a brightness of an F-number of approximately F2.8 to F4.0. In order to obtain the effect reliably, it is preferable that the lower limit value of Conditional Expression (1) be set to 1.800. Moreover, in order to obtain the effect more reliably, it is preferable that the lower limit value of Conditional Expression (1) be set to 2.100.

Moreover, it is preferable that the zoom lens satisfy Conditional Expression (2) below.

$$0.050 < |m34|/fw < 1.500 \quad (2)$$

where

|m34|: a change from the wide-angle end state to the telephoto end state, in terms of the distance on the optical axis from the lens surface closest to image, of the third lens group to the lens surface closest to object, of the fourth lens group fw: a focal length of an entire system of the zoom lens in the wide-angle end state Conditional Expression (2) relates to the varying magnification burden of the third and fourth lens groups and is a conditional expression for defining an appropriate range of the ratio of a change from the wide-angle end state to the telephoto end state, in terms of the distance on the optical axis from the lens surface closest to image, of the third lens group to the lens surface closest to object, of the fourth lens group with respect to the focal length of an entire system of the zoom lens in the wide-angle end state.

When the correspondence value of Conditional Expression (2) exceeds the upper limit value, the distance between the fourth lens group and the image plane is decreased, the burden of curvature of field correction by the fourth lens group increases, and it may be difficult to correct coma aberration and curvature of field. In order to obtain the effect reliably, it is preferable that the upper limit value of Conditional Expression (2) be set to 1.250. Moreover, in order to obtain the effect more reliably, it is preferable that the upper limit value of Conditional Expression (2) be set to 1.000.

On the other hand, when the correspondence value of Conditional Expression (2) is smaller than the lower limit value, the varying magnification burden of lens groups other than the fourth lens group increases, and the power of the second lens group particularly is increased, and it may be difficult to correct spherical aberration and coma aberration. In order to obtain the effect reliably, it is preferable that the lower limit value of Conditional Expression (2) be set to 0.090. Moreover, in order to obtain the effect more reliably, it is preferable that the lower limit value of Conditional Expression (2) be set to 0.130.

Moreover, it is preferable that the zoom lens satisfy Conditional Expression (3) below.

$$1.000 < f5/(-f1) < 10.000 \tag{3}$$

where f5: a focal length of the fifth lens group f1: a focal length of the first lens group Conditional Expression (3) is a conditional expression for defining an appropriate range of the ratio of the focal length of the fifth lens group with respect to the focal length of the first lens group. When Conditional Expression (3) is satisfied, it is possible to realize a brightness of an F-number of approximately F2.8 to F4.0 and a wide angle of view and to correct various aberrations including spherical aberration satisfactorily.

When the correspondence value of Conditional Expression (3) exceeds the upper limit value, the power of the first lens group with respect to the fifth lens group is increased and it may be difficult to correct curvature of field and curvature aberration in the wide-angle end state particularly. In order to obtain the effect reliably, it is preferable that the upper limit value of Conditional Expression (3) be set to 8.700. Moreover, in order to obtain the effect more reliably, it is preferable that the upper limit value of Conditional Expression (3) be set to 7.400.

On the other hand, when the correspondence value of Conditional Expression (3) is smaller than the lower limit value, the power of the fifth lens group with respect to the first lens group is increased and it may be difficult to correct curvature of field and curvature aberration in the telephoto end state particularly. In order to obtain the effect reliably, it is preferable that the lower limit value of Conditional Expression (3) be set to 1.700. Moreover, in order to obtain the effect more reliably, it is preferable that the lower limit value of Conditional Expression (3) be set to 2.400.

Moreover, it is preferable that the zoom lens satisfy Conditional Expression (4) below.

$$0.300 < |m12|/fw < 5.000 \tag{4}$$

where

|m12|: a change from the wide-angle end state to the telephoto end state, in terms of the distance on the optical axis from the lens surface closest to image, of the first lens group to the lens surface closest to object, of the second lens group fw: a focal length of an entire system of the zoom lens in the wide-angle end state Conditional Expression (4) relates to the varying magnification burden of the first and second lens groups and is a conditional expression for defining an appropriate range of the ratio of the change from the wide-angle end state to the telephoto end state, in terms of the distance on the optical axis from the lens surface closest to image, of the first lens group to the lens surface closest to object, of the second lens group with respect to the focal length of an entire system of the zoom lens in the wide-angle end state.

When the correspondence value of Conditional Expression (4) exceeds the upper limit value, the distance between the first lens group and the image plane is increased, the burden of spherical and coma aberration correction by the second lens group increases, and it may be difficult to correct spherical and coma aberration. In order to obtain the effect reliably, it is preferable that the upper limit value of Conditional Expression (4) be set to 4.000. Moreover, in order to obtain the effect more reliably, it is preferable that the upper limit value of Conditional Expression (4) be set to 3.000.

On the other hand, when the correspondence value of Conditional Expression (4) is smaller than the lower limit value, the varying magnification burden of lens groups other than the first lens group increases, and the power of the fourth lens group particularly is increased, and it may be difficult to correct coma aberration. In order to obtain the effect reliably, it is preferable that the lower limit value of Conditional Expression (4) be set to 0.600. Moreover, in order to obtain the effect more reliably, it is preferable that the lower limit value of Conditional Expression (4) be set to 0.900.

Moreover, it is preferable that the zoom lens satisfy Conditional Expression (5) below.

$$0.200 < f5/f4 < 4.000 \tag{5}$$

where f5: a focal length of the fifth lens group f4: a focal length of the fourth lens group Conditional Expression (5) is a conditional expression for defining an appropriate range of the ratio of the focal length of the fifth lens group with respect to the focal length of the fourth lens group. When the correspondence value of Conditional Expression (5) exceeds the upper limit value, the power of the fourth lens group with respect to the fifth lens group is increased and it may be difficult to correct coma aberration. In order to obtain the effect reliably, it is preferable that the upper limit value of Conditional Expression (5) be set to 3.300. Moreover, in order to obtain the effect more reliably, it is preferable that the upper limit value of Conditional Expression (5) be set to 2.600.

On the other hand, when the correspondence value of Conditional Expression (5) is smaller than the lower limit value, the power of the fifth lens group with respect to the fourth lens group is increased, and it may be difficult to correct curvature of field. In order to obtain the effect reliably, it is preferable that the lower limit value of Conditional Expression (5) be set to 0.350. Moreover, in order to obtain the effect more reliably, it is preferable that the lower limit value of Conditional Expression (5) be set to 0.450.

Moreover, it is preferable that the zoom lens satisfy Conditional Expression (6) below.

$$0.500 < f4/f2 < 10.000 \tag{6}$$

where f4: a focal length of the fourth lens group f2: a focal length of the second lens group Conditional Expression (6) is a conditional expression for defining an appropriate range of the ratio of the focal length of the fourth lens group to the focal length of the second lens group. When Conditional Expression (6) is satisfied, it is possible to realize a brightness of an F-number of approximately F2.8 to F4.0 and a wide angle of view and to correct various aberrations including spherical aberration satisfactorily.

When the correspondence value of Conditional Expression (6) exceeds the upper limit value, the power of the second lens group with respect to the fourth lens group is increased and it may be difficult to correct spherical aberration and coma aberration in the telephoto end state particularly. In order to obtain the effect reliably, it is preferable that the upper limit value of Conditional Expression (6) be set to 8.000. Moreover, in order to obtain the effect more reliably, it is preferable that the upper limit value of Conditional Expression (6) be set to 6.000.

On the other hand, when the correspondence value of Conditional Expression (6) is smaller than the lower limit value, the power of the fourth lens group with respect to the second lens group is increased and it may be difficult to correct spherical aberration and coma aberration in the wide-angle end state particularly. In order to obtain the effect reliably, it is preferable that the lower limit value of Conditional Expression (6) be set to 0.800. Moreover, in order to obtain the effect more reliably, it is preferable that the lower limit value of Conditional Expression (6) be set to 1.100.

Moreover, in the zoom lens, it is preferable that the fifth lens group includes a meniscus-shaped positive lens having a convex surface oriented toward the image side and satisfy Conditional Expression (7) below.

$$1.100<(r1+r2)/(r1-r2)<5.000 \quad (7)$$

where r1: a radius of curvature of an object-side surface of the positive lens r2: a radius of curvature of an image-side surface of the positive lens Conditional Expression (7) is a conditional expression for defining a shape factor of the positive lens of the fifth lens group. When Conditional Expression (7) is satisfied, it is possible to realize a brightness of an F-number of approximately F2.8 to F4.0 and a wide angle of view and to correct various aberrations including spherical aberration satisfactorily.

When the correspondence value of Conditional Expression (7) exceeds the upper limit value, the power of the positive lens is decreased and the varying magnification burden of lenses other than the positive lens within the fifth lens group or the varying magnification burden of lens groups other than the fifth lens group is increased. The power of the fourth lens group particularly is increased and it may be difficult to correct coma aberration. In order to obtain the effect reliably, it is preferable that the upper limit value of Conditional Expression (7) be set to 4.200. Moreover, in order to obtain the effect more reliably, it is preferable that the upper limit value of Conditional Expression (7) be set to 3.400.

On the other hand, when the correspondence value of Conditional Expression (7) is smaller than the lower limit value, the power of the positive lens is increased, deflection of off-axis light passing through the positive lens is increased, and it may be difficult to correct curvature of field. In order to obtain the effect reliably, it is preferable that the lower limit value of Conditional Expression (7) be set to 1.400. Moreover, in order to obtain the effect more reliably, it is preferable that the lower limit value of Conditional Expression (7) be set to 1.700.

Moreover, in the zoom lens, it is preferable that at least one lens of the third lens group be configured to be movable so as to include a component in a direction orthogonal to the optical axis. For example, in the zoom lens, it is preferable that at least two lenses of the third lens group be configured to be movable so as to include a component in the direction orthogonal to the optical axis.

As described above, when at least two lenses of the third lens group are configured to be movable so as to include a component in the direction orthogonal to the optical axis as a vibration-reduction lens group, it is possible to decrease the size of a vibration-reduction lens group and to satisfactorily correct eccentric coma aberration (decentering coma aberration), curvature of eccentric field, and eccentric magnification chromatic aberration (decentering lateral chromatic aberration) during vibration reduction.

Moreover, in the zoom lens, it is preferable that at least one lens of the second lens group be configured to be movable so as to include a component in a direction orthogonal to the optical axis. For example, in the zoom lens, it is preferable that at least one lens of the second lens group be configured to be movable so as to include a component in the direction orthogonal to the optical axis.

As described above, when at least two lenses of the second lens group are configured to be movable so as to include a component in the direction orthogonal to the optical axis as a vibration-reduction lens group, it is possible to decrease the size of a vibration-reduction lens group and to satisfactorily correct eccentric coma aberration, curvature of eccentric field, and eccentric magnification chromatic aberration during vibration reduction.

Moreover, in the zoom lens, it is preferable that at least one lens of the fourth lens group be configured to be movable so as to include a component in a direction orthogonal to the optical axis. For example, in the zoom lens, it is preferable that at least one lens of the fourth lens group be configured to be movable so as to include a component in the direction orthogonal to the optical axis.

As described above, when at least two lenses of the fourth lens group are configured to be movable so as to include a component in the direction orthogonal to the optical axis as a vibration-reduction lens group, it is possible to decrease the size of a vibration-reduction lens group and to satisfactorily correct eccentric coma aberration, curvature of eccentric field, and eccentric magnification chromatic aberration during vibration reduction.

Moreover, it is preferable that the zoom lens perform focusing from an object at infinity to an object at a close distance by moving at least one lens of the second lens group along the optical axis. For example, it is preferable that the zoom lens perform focusing from an object at infinity to an object at a close distance by moving at least one lens of the second lens group along the optical axis.

Due to this configuration, it is possible to decrease the size of a focusing lens group and to satisfactorily correct variation in chromatic aberration and variation in curvature of field due to focusing.

Moreover, it is preferable that the zoom lens perform focusing from an object at infinity to an object at a close distance by moving at least one lens of the third lens group along the optical axis. For example, it is preferable that the zoom lens perform focusing from an object at infinity to an object at a close distance by moving at least one lens of the third lens group along the optical axis.

Due to this configuration, it is possible to decrease the size of a focusing lens group and to satisfactorily correct variation in chromatic aberration and variation in curvature of field due to focusing.

Moreover, it is preferable that the zoom lens perform focusing from an object at infinity to an object at a close distance by moving at least one lens of the fourth lens group along the optical axis. For example, it is preferable that the zoom lens perform focusing from an object at infinity to an object at a close distance by moving at least one lens of the fourth lens group along the optical axis.

Due to this configuration, it is possible to decrease the size of a focusing lens group and to satisfactorily correct variation in chromatic aberration and variation in curvature of field due to focusing.

Moreover, it is preferable that the zoom lens perform focusing from an object at infinity to an object at a close distance by moving a portion of the fifth lens group or the entire fifth lens group along the optical axis.

Due to this configuration, it is possible to satisfactorily correct variation in axial chromatic aberration, variation in spherical aberration, and variation in coma aberration due to focusing.

Moreover, it is preferable that the zoom lens include an aperture stop disposed between the second lens group and the third lens group.

Due to this configuration, it is possible to satisfactorily correct spherical aberration, coma aberration, and magnification chromatic aberration.

Moreover, an optical apparatus includes the zoom lens having the above-described configuration. Due to this, it is possible to implement an optical apparatus having an F-number for brightness and an excellent optical performance.

There is also provided a method for manufacturing a zoom lens including, in order from an object along an optical axis, a first lens group having a negative refractive power, a second lens group having a positive refractive power, a third lens group having a negative refractive power, a fourth lens group, and a fifth lens group, wherein when the zoom lens performs varying magnification, the distance between the first and second lens groups changes, the distance between the second and third lens groups changes, the distance between the third and fourth lens groups changes, the distance between the fourth and fifth lens groups changes, the second and fourth lens groups move along the same trajectory along the optical axis, and at least the third lens group moves along the optical axis. In an example, the fourth lens group has a positive refractive power and the fifth lens group has a positive refractive power.

Alternatively, there is provided a method for manufacturing a zoom lens including, in order from an object along an optical axis, a first lens group having a negative refractive power, a second lens group having a positive refractive power, a third lens group having a negative refractive power, a fourth lens group having a positive refractive power, and a fifth lens group having a positive refractive power, wherein when the zoom lens performs varying magnification from a wide-angle end state to a telephoto end state, the second and fourth lens groups move by the same distance along the optical axis, and at least the third lens group moves along the optical axis.

With these zoom lens manufacturing methods, it is possible to manufacture a zoom lens having an F-number for brightness and an excellent optical performance.

NUMBERED EXAMPLES

Hereinafter, a zoom lens according to numbered examples will be described with reference to the accompanying drawings.

Example 1

FIG. 1 is a cross-sectional view of a zoom lens according to Example 1, wherein parts (a), (b), and (d) are in a wide-angle end state, an intermediate focal length state, and a telephoto end state, respectively.

Arrows under each lens group in FIG. 1(a) indicate the moving directions of each lens group upon varying magnification from the wide-angle end state to the intermediate focal length state. Arrows under each lens group in FIG. 1(b) indicate the moving directions of each lens group upon varying magnification from the intermediate focal length state to the telephoto end state.

As illustrated in FIG. 1(a), a zoom lens according to this example is constituted by, in order from an object along an optical axis, a first lens group G1 having a negative refractive power, a second lens group G2 having a positive refractive power, a third lens group G3 having a negative refractive power, a fourth lens group G4 having a positive refractive power, and a fifth lens group G5 having a positive refractive power.

The first lens group G1 is constituted by, in order from the object along the optical axis, a negative meniscus lens L11 having a convex surface oriented toward the object side, a negative meniscus lens L12 having a convex surface oriented toward the object side, a biconcave lens L13, and a biconvex lens L14. The negative meniscus lens L11 is an aspherical lens of which the object-side lens surface and the image-side lens surface are aspherical surfaces.

The second lens group G2 is constituted by, in order from the object along the optical axis, a second F lens group G2F having a positive refractive power and a second R lens group G2R having a positive refractive power.

The second F lens group G2F is constituted by, in order from the object along the optical axis, a cemented lens including a biconvex lens L21 and a negative meniscus lens L22 having a concave surface oriented toward the object side and a negative meniscus lens L23 having a convex surface oriented toward the object side. The biconvex lens L21 is an aspherical lens of which the object-side lens surface is an aspherical surface.

The second R lens group G2R is constituted by, in order from the object along the optical axis, a cemented lens including a negative meniscus lens L24 having a convex surface oriented toward the object side, a biconvex lens L25, and a negative meniscus lens L26 having a concave surface oriented toward the object side.

The third lens group G3 is constituted by, in order from the object along the optical axis, an aperture stop S, a cemented lens including a biconcave lens L31 and a positive meniscus lens L32 having a convex surface oriented toward the object side, and a flare-cut diaphragm FS. The positive meniscus lens L32 is an aspherical lens of which the image-side lens surface is an aspherical surface.

The fourth lens group G4 includes, in order from the object along the optical axis, a cemented lens including a biconvex lens L41 and a negative meniscus lens L42 having a concave surface oriented toward the object side and a cemented lens including a negative meniscus lens L43 having a convex surface oriented toward the object side and a positive meniscus lens L44 having a convex surface oriented toward the object side. The negative meniscus lens L42 is an aspherical lens of which the image-side lens surface is an aspherical surface.

The fifth lens group G5 is constituted by a positive meniscus lens L51 having a concave surface oriented toward the object side. The positive meniscus lens L51 is an aspherical lens of which the object-side lens surface and the image-side lens surface are aspherical surfaces.

An image sensor (not illustrated) configured as a CCD, CMOS, or the like is disposed at the image plane I.

In the zoom lens according to this example having the above-described configuration, when the zoom lens performs varying magnification from the wide-angle end state to the telephoto end state, the first lens group G1, the second lens group G2, the third lens group G3, and the fourth lens group G4 move along the optical axis in relation to the image plane I such that the distance between the first and second lens groups G1 and G2 decreases, the distance between the second and third lens groups G2 and G3 increases, the distance between the third and fourth lens groups G3 and G4 decreases, and the distance between the fourth and fifth lens groups G4 and G5 increases. Specifically, when the zoom lens performs varying magnification, the first lens group G1 is moved toward the image plane I and is then moved toward the object side, the second and fourth lens groups G2 and G4 are moved integrally toward the object side, the third lens group G3 is moved toward the object side, and the fifth lens group G5 is immovable in relation to the image plane I.

The aperture stop S is disposed between the second and third lens groups G2 and G3 and is moved together with the third lens group G3 upon varying magnification from the wide-angle end state to the telephoto end state.

Moreover, the zoom lens according to this example performs focusing from an object at infinity to an object at a close distance by moving the second F lens group G2F toward the image plane I.

Moreover, the zoom lens according to this example performs image plane correction (that is, vibration reduction) when image blur occurs by moving the cemented lens of the third lens group G3 including the biconcave lens L31 and the positive meniscus lens L32 having a convex surface oriented toward the object side as a vibration-reduction lens group in such a direction as to include a component in the direction orthogonal to the optical axis.

Here, when the focal length of an entire system of the zoom lens according to this example is f and the ratio of a moving distance of an image on the image plane I with respect to a moving distance of the vibration-reduction lens group during blur correction is K, in order to correct rotation blur of angle θ, the vibration-reduction lens group may be shifted in the direction orthogonal to the optical axis by (f·tan θ)/K.

In the zoom lens according to this example, in the wide-angle end state, since the vibration reduction coefficient K is 0.56 and the focal length is 16.48 (mm) (see Table 2 below), the moving distance of the vibration-reduction lens group for correcting the rotation blur of 0.81° is 0.42 (mm). Moreover, in the intermediate focal length state, since the vibration reduction coefficient K is 0.70 and the focal length is 25.21 (mm) (see Table 2 below), the moving distance of the vibration-reduction lens group for correcting the rotation blur of 0.66° is 0.41 (mm). Moreover, in the telephoto end state, since the vibration reduction coefficient K is 0.87 and the focal length is 33.95 (mm) (see Table 2 below), the moving distance of the vibration-reduction lens group for correcting the rotation blur of 0.57° is 0.38 (mm).

Table 1 below illustrates the specification values of the zoom lens according to Example 1.

In [Overall Specification] in Table 1, f indicates the focal length of an entire system of the zoom lens, FNO indicates the F-number, w indicates a half-angle of view (unit: degrees), Y indicates an image height, TL indicates a total optical system length, and BF indicates the back focus. Here, the total optical system length TL is the distance on the optical axis from the lens surface closest to object, of the first lens group G1 to the image plane I. Moreover, the back focus BF is the distance on the optical axis from the lens surface closest to image, of the fifth lens group G5 to the image plane I. Moreover, W indicates the focal length state in the wide-angle end state, M indicates the focal length state in the intermediate focal length state, and T indicates the focal length state in the telephoto end state.

In [Surface Data], a surface number indicates a sequence number of a lens surface counted from the object side, r indicates the radius of curvature of a lens surface, d indicates the distance between lens surfaces, nd indicates the refractive index for the d-line (wavelength: λ=587.6 nm), and vd indicates the Abbe number for the d-line (wavelength: λ=587.6 nm). Moreover, object plane indicates the object plane, a diaphragm indicates an aperture stop S, FS indicates a flare-cut diaphragm FS, image plane indicates the image plane I. The radius of curvature r=∞ indicates a flat surface and the refractive index of air (d=1.00000) is not illustrated. Moreover, when the lens surface is an aspherical surface, a mark "*" is assigned to the surface number and a paraxial radius of curvature is shown in the radius of curvature column r.

In [Lens Group Data], the starting surface number and the focal length of each lens group are shown.

In [Aspheric Data], the aspheric coefficient and the conic constant are shown when the shape of the aspherical surface shown in [Surface Data] is expressed by the following expression.

$$x=(h^2/r)/[1+\{1-\kappa(h/r)^2\}^{1/2}]+A4h^4+A6h^6+A8h^8+A10h^{10}$$

Here, h is the height in the direction orthogonal to the optical axis, x is the distance (the amount of sag) along the optical axis direction from a tangential plane at the vertex of an aspherical surface at the height h to the aspherical surface, κ indicates a conic constant, and A4, A6, A8, and A10 indicate aspheric coefficients, and r indicates a radius of curvature (a paraxial radius of curvature) of a reference spherical surface. Moreover, "E-n" indicates "×10$^{-n}$," and for example, 1.234E-05=1234×10$^{-5}$. An aspheric coefficient A2 at degree 2 is 0 and is not illustrated.

In [Variable Distance Data], f indicates the focal length of an entire system of the zoom lens, β indicates the imaging magnification, and do indicates a variable surface distance between an n-th surface and an (n+1)th surface (n is an integer). Moreover, d0 indicates the distance from an object to a lens surface closest to the object. Moreover, W indicates the wide-angle end state, M indicates the intermediate focal length state, and T indicates the telephoto end state. Moreover, Infinity indicates the state upon focusing on an object at infinity and Close point indicates the state upon focusing on an object at a close point.

In [Conditional Expression Correspondence Values], the correspondence values of each conditional expression are shown.

Here, "mm" is generally used as the unit of the focal length f, the radius of curvature r, and other lengths shown in Table 1. However, the unit is not limited to this since an equivalent optical performance is obtained even when the optical system is proportionally expanded or reduced.

The same symbols as in Table 1 described above are used in Tables of other examples to be described later.

TABLE 1

Example 1

[Overall Specification]

|  | W | M | T |
|---|---|---|---|
| f | 16.48 | 25.21 | 33.95 |
| FNO | 2.83 | 2.83 | 2.83 |
| ω | 54.0 | 40.0 | 31.8 |
| Y | 21.64 | 21.64 | 21.64 |
| TL | 162.361 | 156.840 | 162.363 |
| BF | 18.070 | 18.065 | 18.063 |

[Surface Data]

| Surface number | r | d | nd | νd |
|---|---|---|---|---|
|  | Object plane | ∞ |  |  |
| *1) | 73.22991 | 2.000 | 1.85135 | 40.1 |
| *2) | 19.62926 | 7.474 |  |  |
| 3) | 61.15202 | 2.000 | 1.90043 | 37.4 |
| 4) | 26.50584 | 12.785 |  |  |
| 5) | −37.55896 | 2.000 | 1.49782 | 82.6 |
| 6) | 312.93830 | 0.150 |  |  |
| 7) | 97.61558 | 6.381 | 2.00100 | 29.1 |
| 8) | −90.94529 | (Variable) |  |  |
| *9) | 45.42754 | 8.894 | 1.58313 | 59.4 |
| 10) | −33.86178 | 1.500 | 1.65160 | 58.6 |
| 11) | −73.70296 | 1.496 |  |  |
| 12) | 108.06528 | 1.500 | 1.51742 | 52.2 |
| 13) | 36.32590 | (Variable) |  |  |
| 14) | 27.56863 | 1.500 | 1.84416 | 24.0 |
| 15) | 20.91099 | 12.393 | 1.48749 | 70.3 |
| 16) | −40.66843 | 1.500 | 1.80328 | 25.5 |
| 17) | −63.71042 | (Variable) |  |  |
| 18) | (Diaphragm) | ∞ | 3.500 |  |
| 19) | −208.49060 | 1.500 | 1.74400 | 44.8 |
| 20) | 26.99771 | 3.953 | 1.80244 | 25.6 |
| *21) | 62.64116 | 1.000 |  |  |
| 22) | (FS) | ∞ | (Variable) |  |
| 23) | 26.91271 | 7.631 | 1.49782 | 82.6 |
| 24) | −57.70103 | 1.500 | 1.88202 | 37.2 |
| *25) | −93.99278 | 0.150 |  |  |
| 26) | 62.42449 | 1.500 | 1.90043 | 37.4 |
| 27) | 19.07512 | 7.749 | 1.49782 | 82.6 |
| 8) | 83.05930 | (Variable) |  |  |
| *29) | −135.00000 | 5.076 | 1.77250 | 49.5 |
| *30) | −44.25074 | (BF) |  |  |
|  | Image plane | ∞ |  |  |

[Lens Group Data]

|  | Starting surface | Focal distance |
|---|---|---|
| G1 | 1 | −26.24 |
| G2 | 9 | 40.29 |
| G3 | 18 | −70.00 |
| G4 | 23 | 92.95 |
| G5 | 29 | 83.19 |

[Aspheric Data]

Surface number: 1

κ = 7.56000E−02
A4 = −2.78471E−06
A6 = 3.86364E−09
A8 = −2.69774E−12
A10 = 9.05111E−16

Surface number: 2

κ = 1.77500E−01
A4 = −2.58137E−06

TABLE 1-continued

Example 1

A6 = 2.51888E−09
A8 = 2.34244E−12
A10 = 1.66721E−16
Surface number: 9

κ = 1.00000E+00
A4 = −2.97350E−06
A6 = −1.01164E−09
A8 = 5.03482E−12
A10 = −6.96957E−15
Surface number: 21

κ = 1.27800E+00
A4 = −2.19664E−07
A6 = −2.34247E−08
A8 = 1.80346E−10
A10 = −4.74051E−13
Surface number: 25

κ = 1.00000E+00
A4 = 1.15418E−05
A6 = 5.82895E−09
A8 = −4.75474E−12
A10 = −1.24299E−13
Surface number: 29

κ = 1.00000E+00
A4 = 1.07645E−05
A6 = −4.55699E−08
A8 = 1.31690E−10
A10 = 1.37085E−13
Surface number: 30

κ = 1.00000E+00
A4 = 1.60203E−05
A6 = −5.49184E−08
A8 = 1.40358E−10
A10 = −1.35750E−13

[Variable Distance Data]

| | W | M | T | W | M | T |
|---|---|---|---|---|---|---|
| | Infinity | Infinity | Infinity | Close point | Close point | Close point |
| d0 | ∞ | ∞ | ∞ | 110.01 | 115.53 | 110.00 |
| β | — | — | — | −0.1220 | −0.1816 | −0.2566 |
| f | 16.48 | 25.21 | 33.95 | — | — | — |
| d8 | 28.899 | 9.423 | 0.500 | 33.772 | 14.498 | 6.164 |
| d13 | 6.862 | 6.862 | 6.862 | 1.989 | 1.787 | 1.198 |
| d17 | 2.000 | 5.572 | 7.582 | 2.000 | 5.572 | 7.582 |
| d22 | 7.082 | 3.510 | 1.500 | 7.082 | 3.510 | 1.500 |
| d28 | 4.315 | 18.275 | 32.723 | 4.315 | 18.275 | 32.723 |
| BF | 18.070 | 18.065 | 18.063 | 18.155 | 18.254 | 18.438 |

[Conditional Expression Correspondence Values]

| (1) | (−f3)/fw = 4.248 |
| (2) | |m34|/fw = 0.339 |
| (3) | f5/(−f1) = 3.171 |
| (4) | |m12|/fw = 1.723 |
| (5) | f5/f4 = 0.895 |
| (6) | f4/f2 = 2.307 |
| (7) | (r1 + r2)/(r1 − r2) = 1.975 |

Figure 2:
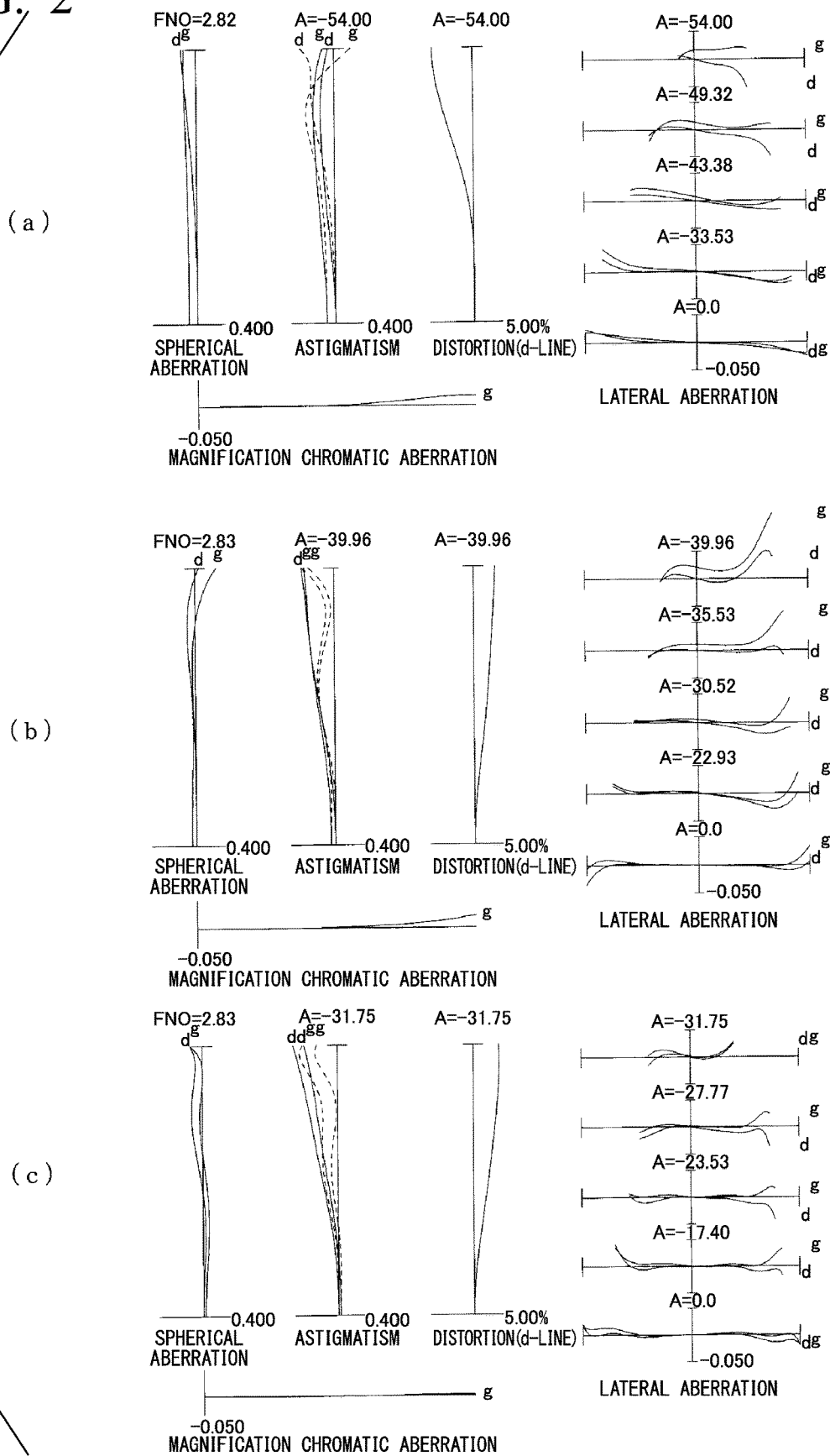
FIG. 2 shows graphs illustrating various aberrations of the zoom lens according to Example 1 upon focusing on an object at infinity, wherein parts (a), (b), and (c) are in the wide-angle end state, the intermediate focal length state, and the telephoto end state, respectively.

FIG. 2 shows graphs illustrating various aberrations of the zoom lens according to Example 1 upon focusing on an object at infinity, wherein parts (a), (b), and (d) are in the wide-angle end state, the intermediate focal length state, and the telephoto end state, respectively.

Figure 3:
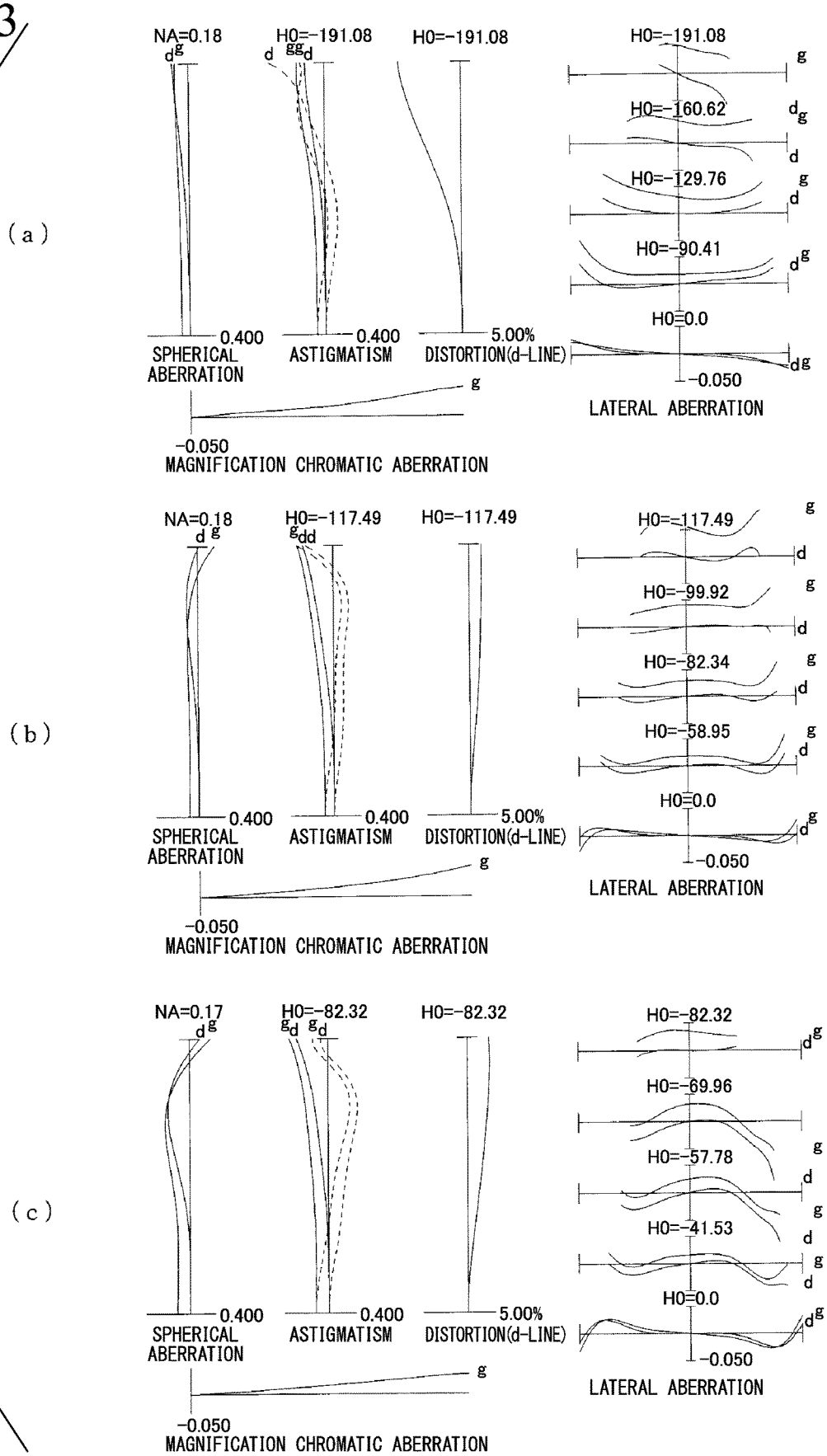
FIG. 3 shows graphs illustrating various aberrations of the zoom lens according to Example 1 upon focusing on an object at a close point, wherein parts (a), (b), and (c) are in the wide-angle end state, the intermediate focal length state, and the telephoto end state, respectively.

FIG. 3 shows graphs illustrating various aberrations of the zoom lens according to Example 1 upon focusing on an object at a close point, wherein parts (a), (b), and (d) are in the wide-angle end state, the intermediate focal length state, and the telephoto end state, respectively.

Figure 4:
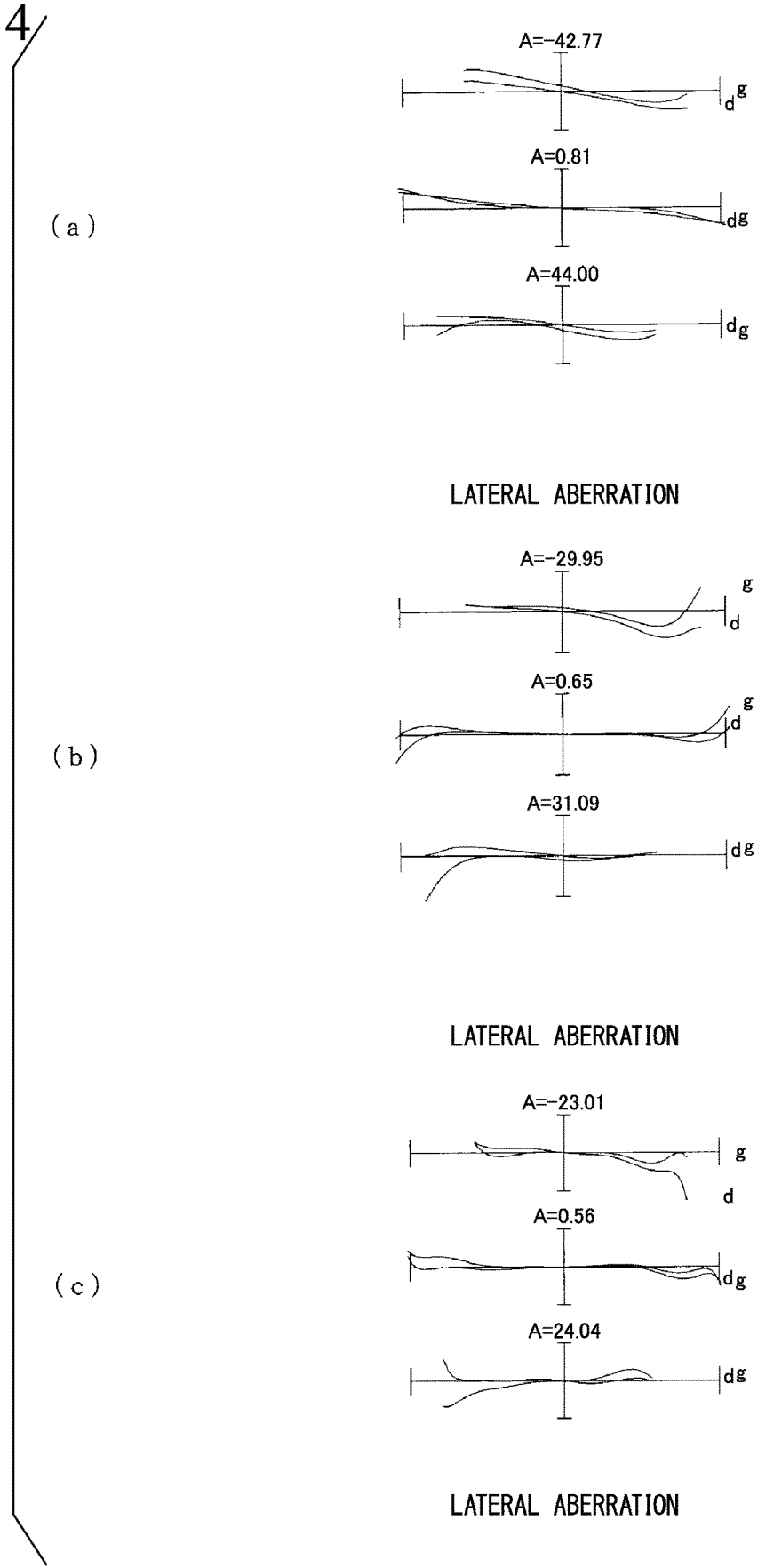
FIG. 4 shows graphs illustrating meridional lateral aberrations of the zoom lens according to Example 1 when vibration reduction is performed, wherein parts (a), (b), and (c) are in the wide-angle end state, the intermediate focal length state, and the telephoto end state, respectively.

FIG. 4 shows graphs illustrating meridional lateral aberrations of the zoom lens according to Example 1 when vibration reduction is performed, wherein parts (a), (b), and (d) are in the wide-angle end state, the intermediate focal length state, and the telephoto end state, respectively.

In the graphs illustrating respective aberrations, FNO indicates the F-number, A indicates an incidence angle of light (that is, a half-angle of view (unit: °)), NA indicates a numerical aperture, and H0 indicates an object height (unit: mm). In the drawings, d indicates the aberration curves at the d-line (wavelength: λ=587.6 nm), g indicates the aberration curves at the g-line (wavelength: λ=435.8 nm), and aberrations without these characters indicate aberration curves at the d-line. The spherical aberration graphs illustrate the F-number values corresponding to the maximum aperture. The astigmatism diagrams and the distortion diagrams illustrate the maximum values at the half-angle of view or the object height. The lateral aberration diagrams illustrate the values of each half-angle of view or each object height. In the astigmatism diagrams, a solid line indicates the sagittal image plane and a broken line indicates the meridional image plane. Moreover, the lateral aberration diagrams illustrate the meridional lateral aberration at the d-line and the g-line. The same reference symbols as in this example are used in the aberration graphs of respective examples to be described later.

It can be understood from the respective aberration diagrams that the zoom lens according to Example 1 can satisfactorily correct various aberrations in states ranging from the wide-angle end state to the telephoto end state and has an excellent optical performance upon vibration reduction.

Example 2

Figure 5:
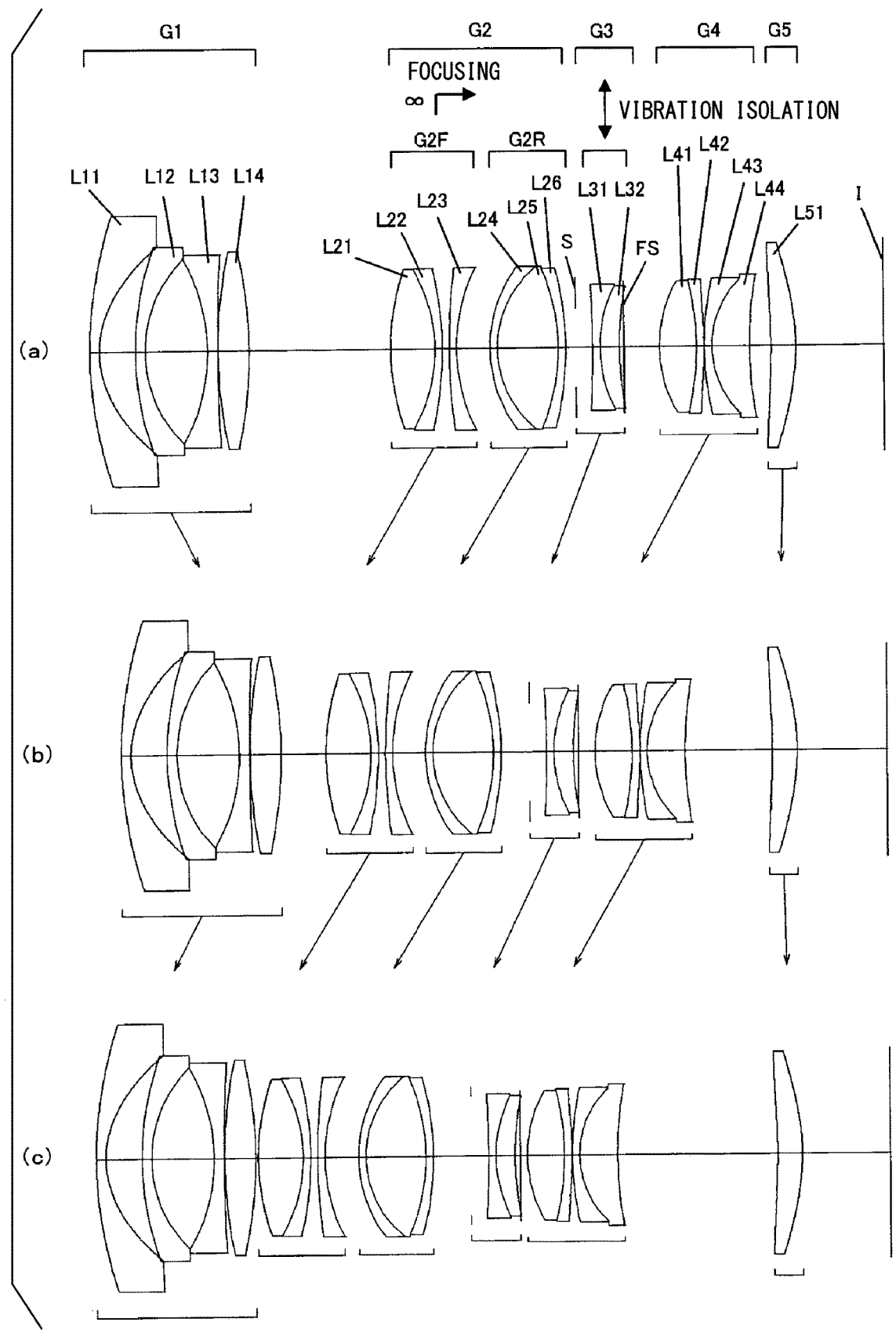
FIG. 5 is a are cross-sectional view of a zoom lens according to Example 2, wherein parts (a), (b), and (c) are in a wide-angle end state, an intermediate focal length state, and a telephoto end state, respectively.

FIG. 5 is a cross-sectional view of a zoom lens according to Example 2, wherein parts (a), (b), and (d) are, wherein parts (a), (b), and (d) are in a wide-angle end state, an intermediate focal length state, and a telephoto end state, respectively.

Arrows under each lens group in FIG. 5(a) indicate the moving directions of each lens group upon varying magnification from the wide-angle end state to the intermediate focal length state. Arrows under each lens group in FIG. 5(b) indicate the moving directions of each lens group upon varying magnification from the intermediate focal length state to the telephoto end state.

As illustrated in FIG. 5(a), a zoom lens according to this example is constituted by, in order from the object along the optical axis, a first lens group G1 having a negative refractive power, a second lens group G2 having a positive refractive power, a third lens group G3 having a negative refractive power, a fourth lens group G4 having a positive refractive power, and a fifth lens group G5 having a positive refractive power.

The first lens group G1 is constituted by, in order from the object along the optical axis, a negative meniscus lens L11 having a convex surface oriented toward the object side, a negative meniscus lens L12 having a convex surface oriented toward the object side, a biconcave lens L13, and a biconvex lens L14. The negative meniscus lens L11 is an aspherical lens of which the object-side lens surface and the image-side lens surface are aspherical surfaces.

The second lens group G2 is constituted by, in order from the object along the optical axis, a second F lens group G2F having a positive refractive power and a second R lens group G2R having a positive refractive power.

The second F lens group G2F is constituted by, in order from the object along the optical axis, a cemented lens including a biconvex lens L21 and a negative meniscus lens L22 having a concave surface oriented toward the object side and a negative meniscus lens L23 having a convex surface oriented toward the object side. The biconvex lens L21 is an aspherical lens of which the object-side lens surface is an aspherical surface.

The second R lens group G2R is constituted by, in order from the object along the optical axis, a cemented lens including a negative meniscus lens L24 having a convex surface oriented toward the object side, a biconvex lens L25, and a negative meniscus lens L26 having a concave surface oriented toward the object side.

The third lens group G3 is constituted by, in order from the object along the optical axis, an aperture stop S, a cemented lens including a biconcave lens L31 and a positive meniscus lens L32 having a convex surface oriented toward the object side, and a flare-cut diaphragm FS. The positive meniscus lens L32 is an aspherical lens of which the image-side lens surface is an aspherical surface.

The fourth lens group G4 is constituted by, in order from the object along the optical axis, a cemented lens including a biconvex lens L41 and a negative meniscus lens L42 having a concave surface oriented toward the object side and a cemented lens including a negative meniscus lens L43 having a convex surface oriented toward the object side and a positive meniscus lens L44 having a convex surface oriented toward the object side. The negative meniscus lens L42 is an aspherical lens of which the image-side lens surface is an aspherical surface.

The fifth lens group G5 is constituted by a positive meniscus lens L51 having a concave surface oriented toward the object side. The positive meniscus lens L51 is an aspherical lens of which the object-side lens surface and the image-side lens surface are aspherical surfaces.

An image sensor (not illustrated) configured as a CCD, CMOS, or the like is disposed at the image plane I.

In the zoom lens according to this example having the above-described configuration, when the zoom lens performs varying magnification from the wide-angle end state to the telephoto end state, the first lens group G1, the second lens group G2, the third lens group G3, the fourth lens group G4, and the fifth lens group G5 move along the optical axis in relation to the image plane I such that the distance between the first and second lens groups G1 and G2 decreases, the distance between the second and third lens groups G2 and G3 increases, the distance between the third and fourth lens groups G3 and G4 decreases, and the distance between the fourth and fifth lens groups G4 and G5 increases. Specifically, when the zoom lens performs varying magnification, the first lens group G1 is moved toward the image plane I and is then moved toward the object side, the second and fourth lens groups G2 and G4 are moved integrally toward the object side, the third lens group G3 is moved toward the object side, and the fifth lens group G5 is moved toward the object side and is then moved toward the image plane I.

The aperture stop S is disposed between the second and third lens groups G2 and G3 and is moved together with the third lens group G3 upon varying magnification from the wide-angle end state to the telephoto end state.

Moreover, the zoom lens according to this example performs focusing from an object at infinity to an object at a close distance by moving the second F lens group G2F toward the image plane I.

Moreover, the zoom lens according to this example performs image plane correction (that is, vibration reduction) when image blur occurs by moving the cemented lens of the third lens group G3 including the biconcave lens L31 and the positive meniscus lens L32 having a convex surface oriented toward the object side as a vibration-reduction lens group in such a direction as to include a component in the direction orthogonal to the optical axis.

Here, when the focal length of an entire system of the zoom lens according to this example is f and the ratio of a moving distance of an image on the image plane I with respect to a moving distance of the vibration-reduction lens group during blur correction is K, in order to correct rotation blur of angle θ, the vibration-reduction lens group may be shifted in the direction orthogonal to the optical axis by (f·tan θ)/K.

In the zoom lens according to this example, in the wide-angle end state, since the vibration reduction coefficient K is 0.56 and the focal length is 16.48 (mm) (see Table 3 below), the moving distance of the vibration-reduction lens group for correcting the rotation blur of 0.81° is 0.42 (mm). Moreover, in the intermediate focal length state, since the vibration reduction coefficient K is 0.70 and the focal length is 25.21 (mm) (see Table 3 below), the moving distance of the vibration-reduction lens group for correcting the rotation blur of 0.66° is 0.41 (mm). Moreover, in the telephoto end state, since the vibration reduction coefficient K is 0.87 and the focal length is 33.95 (mm) (see Table 3 below), the moving distance of the vibration-reduction lens group for correcting the rotation blur of 0.57° is 0.39 (mm).

Table 2 below illustrates the specification values of the zoom lens according to Example 2.

TABLE 2

Example 2

[Overall Specification]

| | W | M | T |
|---|---|---|---|
| f | 16.48 | 25.21 | 33.95 |
| FNO | 2.83 | 2.83 | 2.83 |
| ω | 54.0 | 39.9 | 31.7 |
| Y | 21.64 | 21.64 | 21.64 |
| TL | 162.369 | 156.568 | 162.359 |
| BF | 18.069 | 18.479 | 18.059 |

[Surface Data]

| Surface number | r | d | nd | νd |
|---|---|---|---|---|
| | Object plane | ∞ | | |
| 1) | 73.35843 | 2.000 | 1.85135 | 40.1 |
| *2) | 19.65231 | 7.423 | | |
| 3) | 60.85659 | 2.000 | 1.90043 | 37.4 |
| 4) | 26.46067 | 12.865 | | |
| 5) | −37.68469 | 2.000 | 1.49782 | 82.6 |
| 6) | 319.60622 | 0.150 | | |
| 7) | 98.35638 | 6.315 | 2.00100 | 29.1 |
| 8) | −91.84642 | (Variable) | | |
| *9) | 45.12179 | 9.169 | 1.58313 | 59.4 |
| 10) | −32.35918 | 1.500 | 1.65160 | 58.6 |
| 11) | −70.79534 | 1.426 | | |
| 12) | 116.36340 | 1.500 | 1.51742 | 52.2 |
| 13) | 36.40999 | (Variable) | | |
| 14) | 27.76490 | 1.500 | 1.84500 | 23.9 |
| 15) | 21.11208 | 12.352 | 1.48749 | 70.3 |
| 16) | −40.48676 | 1.500 | 1.79173 | 26.0 |
| 17) | −63.27082 | (Variable) | | |
| 18) | (Diaphragm) ∞ | 3.500 | | |
| 19) | −209.12746 | 1.500 | 1.74400 | 44.8 |
| 20) | 27.47317 | 3.887 | 1.80244 | 25.6 |
| *21) | 62.77212 | 1.000 | | |
| 22) | (FS) ∞ | (Variable) | | |
| 23) | 26.82011 | 7.501 | 1.49782 | 82.6 |
| 24) | −55.69746 | 1.500 | 1.88202 | 37.2 |
| *25) | −89.72149 | 0.150 | | |
| 26) | 63.20031 | 1.500 | 1.90043 | 37.4 |
| 27) | 19.07631 | 7.703 | 1.49782 | 82.6 |
| 28) | 80.36061 | (Variable) | | |
| *29) | −135.00000 | 5.077 | 1.77250 | 49.5 |
| *30) | −44.25947 | (BF) | | |
| | Image plane | ∞ | | |

[Lens Group Data]

| | Starting surface | Focal distance |
|---|---|---|
| G1 | 1 | −26.11 |
| G2 | 9 | 40.20 |
| G3 | 18 | −70.00 |
| G4 | 23 | 93.63 |
| G5 | 29 | 83.21 |

[Aspheric Data]

Surface number: 1

κ = 8.75000E−02
A4 = −2.78056E−06

TABLE 2-continued

| Example 2 |
|---|

A6 = 3.66529E−09
A8 = −2.32659E−12
A10 = 7.29739E−16
Surface number: 2

κ = 1.25600E−01
A4 = −1.66529E−06
A6 = 1.18889E−09
A8 = 5.12891E−12
A10 = −1.72885E−16
Surface number: 9

κ = 1.00000E+00
A4 = −3.12858E−06
A6 = −1.15459E−09
A8 = 5.52871E−12
A10 = −7.23502E−15
Surface number: 21

κ = 1.36390E+00
A4 = −1.54769E−07
A6 = −2.66171E−08
A8 = 2.07963E−10
A10 = −5.54299E−13
Surface number: 25

κ = 1.00000E+00
A4 = 1.15286E−05
A6 = 7.02471E−09
A8 = −1.60325E−11
A10 = −9.68792E−14
Surface number: 29

κ = 1.00000E+00
A4 = 1.12240E−05
A6 = −4.41692E−08
A8 = 1.19461E−10
A10 = −1.22999E−13
Surface number: 30

κ = 1.00000E+00
A4 = 1.62814E−05
A6 = −5.22346E−08
A8 = 1.25318E−10
A10 = −1.19716E−13

[Variable Distance Data]

| | W | M | T | W | M | T |
|---|---|---|---|---|---|---|
| | Infinity | Infinity | Infinity | Close point | Close point | Close point |
| d0 | ∞ | ∞ | ∞ | 110.00 | 115.79 | 110.00 |
| β | — | — | — | −0.1221 | −0.1814 | −0.2567 |
| f | 16.48 | 25.21 | 33.95 | — | — | — |
| d8 | 28.797 | 9.141 | 0.500 | 33.624 | 14.169 | 6.113 |
| d13 | 6.847 | 6.847 | 6.847 | 2.020 | 1.820 | 1.234 |
| d17 | 2.000 | 5.812 | 7.792 | 2.000 | 5.812 | 7.792 |
| d22 | 7.292 | 3.480 | 1.500 | 7.292 | 3.480 | 1.500 |
| d28 | 4.346 | 17.791 | 32.643 | 4.346 | 17.791 | 32.643 |
| BF | 18.069 | 18.479 | 18.059 | 18.154 | 18.667 | 18.434 |

[Conditional Expression Correspondence Values]

| (1) | (−f3)/fw = 4.248 |
| (2) | |m34|/fw = 0.351 |
| (3) | f5/(−f1) = 3.187 |
| (4) | |m12|/fw = 1.717 |
| (5) | f5/f4 = 0.889 |
| (6) | f4/f2 = 2.329 |
| (7) | (r1 + r2)/(r1 − r2) = 1.976 |

Figure 6:
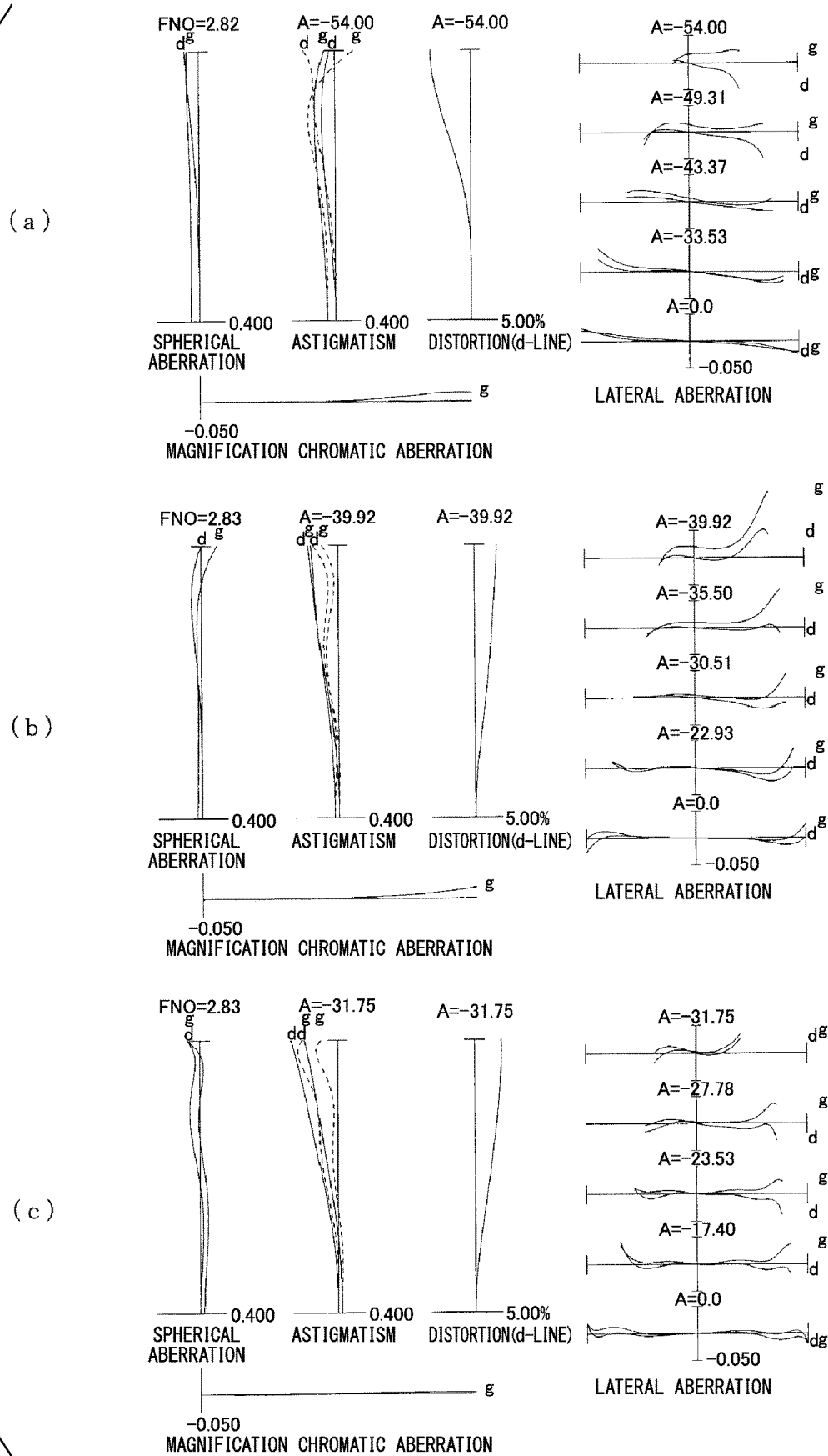
FIG. 6 shows graphs illustrating various aberrations of the zoom lens according to Example 2 upon focusing on an object at infinity, wherein parts (a), (b), and (c) are in the wide-angle end state, the intermediate focal length state, and the telephoto end state, respectively.

FIG. 6 shows graphs illustrating various aberrations of the zoom lens according to Example 2 upon focusing on an object at infinity, wherein parts (a), (b), and (d) are in the wide-angle end state, the intermediate focal length state, and the telephoto end state, respectively.

Figure 7:
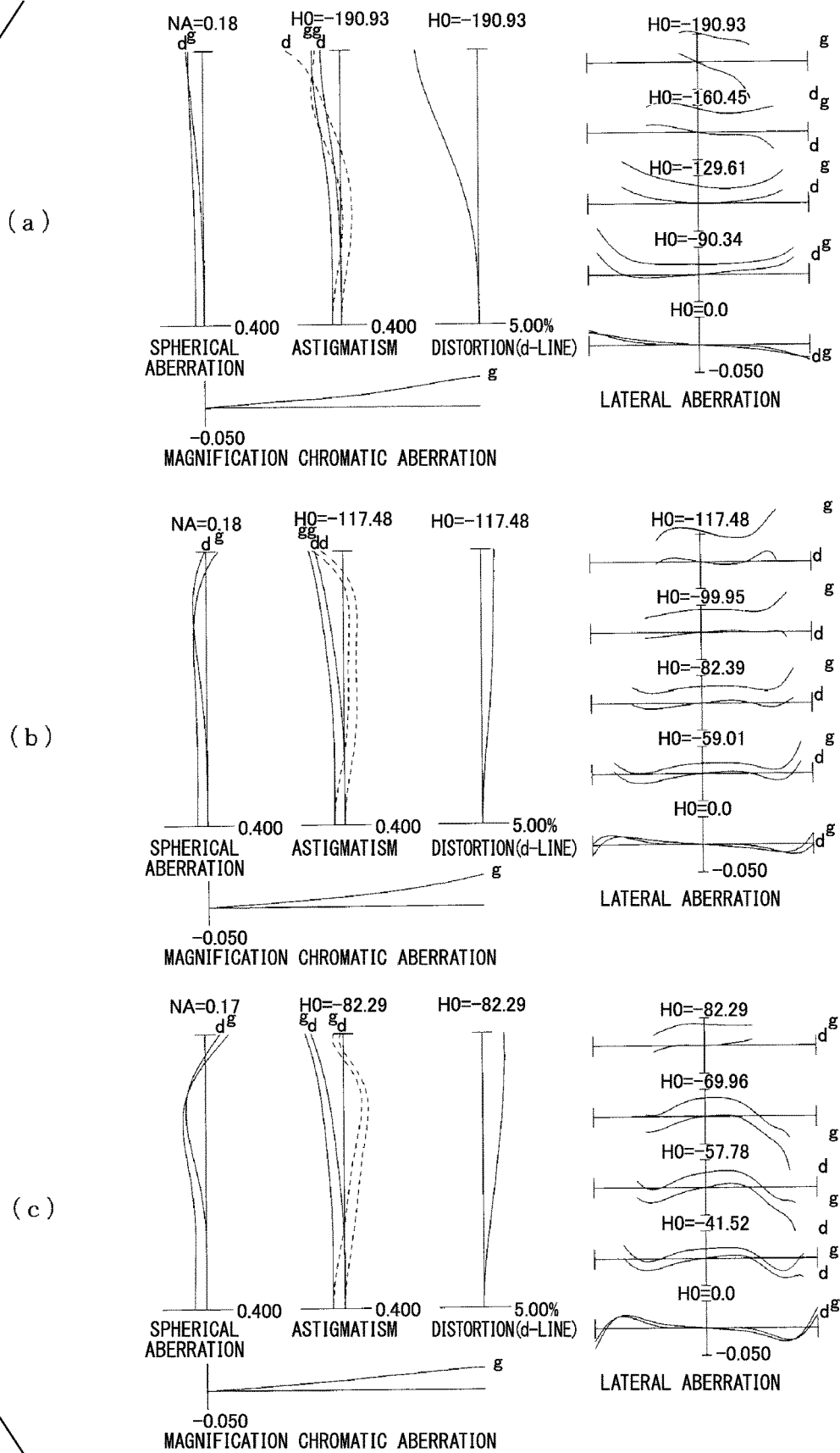
FIG. 7 shows graphs illustrating various aberrations of the zoom lens according to Example 2 upon focusing on an object at a close point, wherein parts (a), (b), and (c) are in the wide-angle end state, the intermediate focal length state, and the telephoto end state, respectively.

FIG. 7 shows graphs illustrating various aberrations of the zoom lens according to Example 2 upon focusing on an object at a close point, wherein parts (a), (b), and (d) are in the wide-angle end state, the intermediate focal length state, and the telephoto end state, respectively.

Figure 8:
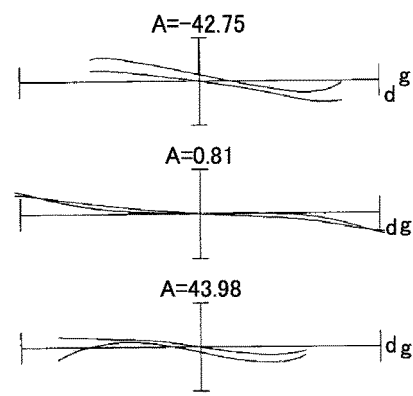
FIG. 8 shows graphs illustrating meridional lateral aberrations of the zoom lens according to Example 2 when vibration reduction is performed, wherein parts (a), (b), and (c) are in the wide-angle end state, the intermediate focal length state, and the telephoto end state, respectively.
Figure 8:
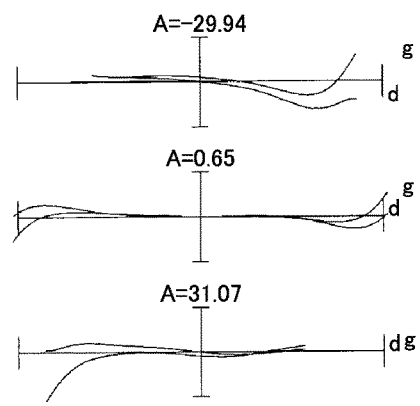
Figure 8:
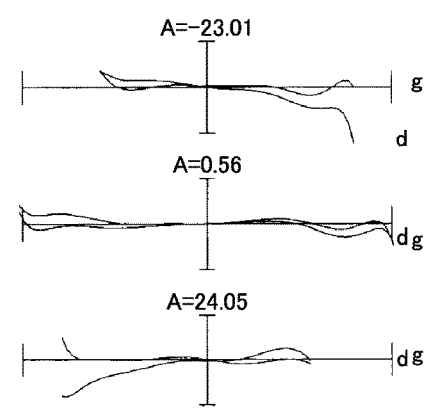

FIG. 8 shows graphs illustrating meridional lateral aberrations of the zoom lens according to Example 2 when vibration reduction is performed, wherein parts (a), (b), and (d) are in the wide-angle end state, the intermediate focal length state, and the telephoto end state, respectively.

It can be understood from the respective aberration diagrams that the zoom lens according to Example 2 can satisfactorily correct various aberrations in states ranging from the wide-angle end state to the telephoto end state and has an excellent optical performance upon vibration reduction.

Example 3

Figure 9:
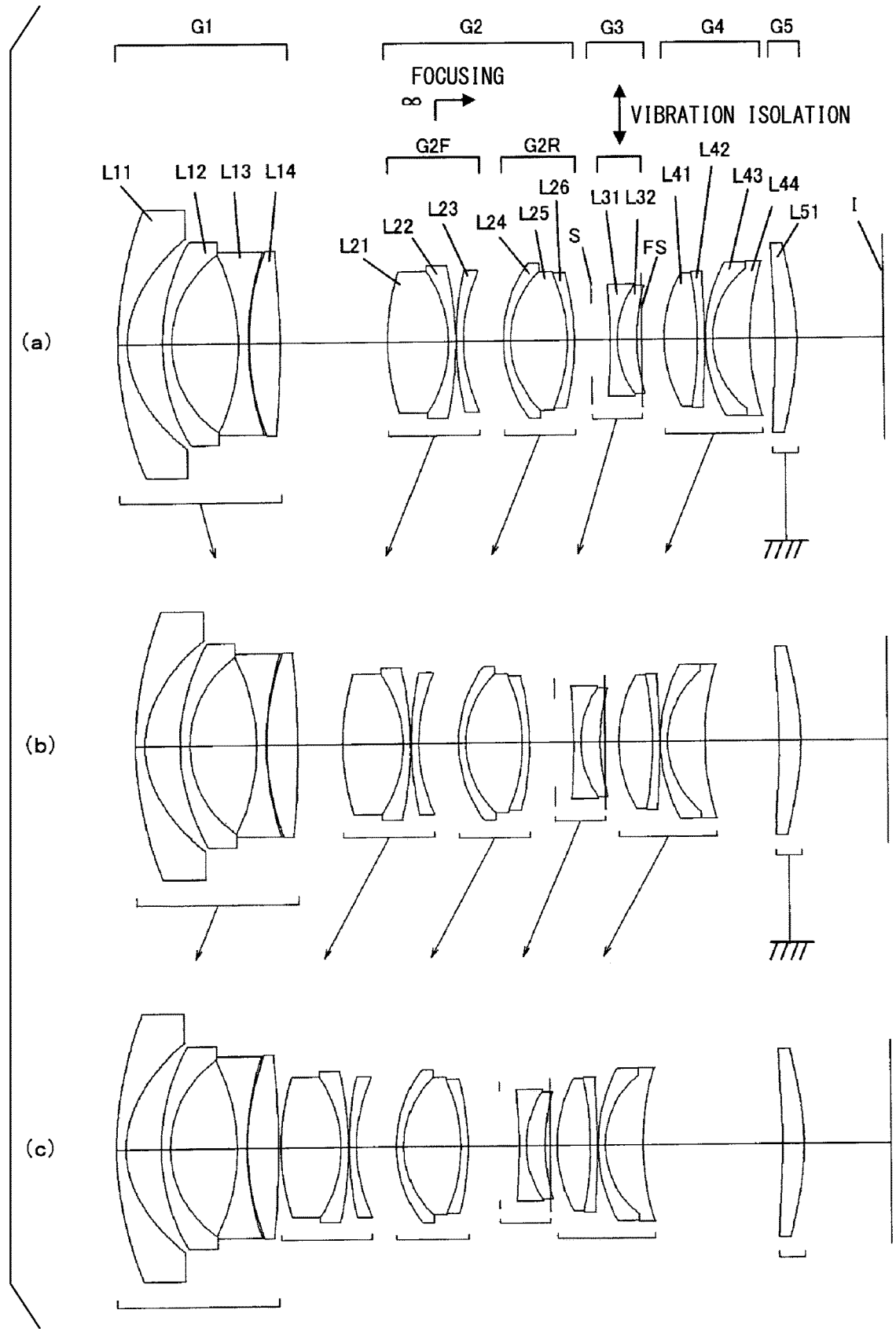
FIG. 9 is a cross-sectional view of a zoom lens according to Example 3, wherein parts (a), (b), and (c) are in a wide-angle end state, an intermediate focal length state, and a telephoto end state, respectively.

FIG. 9 is a cross-sectional view of a zoom lens according to Example 3, wherein parts (a), (b), and (d) are in a wide-angle end state, an intermediate focal length state, and a telephoto end state, respectively.

Arrows under each lens group in FIG. 9(*a*) indicate the moving directions of each lens group upon varying magnification from the wide-angle end state to the intermediate focal length state. Arrows under each lens group in FIG. 9(*b*) indicate the moving directions of each lens group upon varying magnification from the intermediate focal length state to the telephoto end state.

As illustrated in FIG. 9(*a*), a zoom lens according to this example is constituted by, in order from an object along an optical axis, a first lens group G1 having a negative refractive power, a second lens group G2 having a positive refractive power, a third lens group G3 having a negative refractive power, a fourth lens group G4 having a positive refractive power, and a fifth lens group G5 having a positive refractive power.

The first lens group G1 is constituted by, in order from the object along the optical axis, a negative meniscus lens L11 having a convex surface oriented toward the object side, a negative meniscus lens L12 having a convex surface oriented toward the object side, a biconcave lens L13, and a biconvex lens L14. The negative meniscus lens L11 is an aspherical lens of which the object-side lens surface and the image-side lens surface are aspherical surfaces.

The second lens group G2 is constituted by, in order from the object along the optical axis, a second F lens group G2F having a positive refractive power and a second R lens group G2R having a positive refractive power.

The second F lens group G2F is constituted by, in order from the object along the optical axis, a cemented lens including a biconvex lens L21 and a negative meniscus lens L22 having a concave surface oriented toward the object side and a negative meniscus lens L23 having a convex surface oriented toward the object side. The biconvex lens L21 is an aspherical lens of which the object-side lens surface is an aspherical surface.

The second R lens group G2R is constituted by, in order from the object along the optical axis, a cemented lens including a negative meniscus lens L24 having a convex surface oriented toward the object side, a biconvex lens L25, and a negative meniscus lens L26 having a concave surface oriented toward the object side.

The third lens group G3 is constituted by, in order from the object along the optical axis, an aperture stop S, a cemented lens including a biconcave lens L31 and a positive meniscus lens L32 having a convex surface oriented toward the object side, and a flare-cut diaphragm FS. The positive meniscus lens L32 is an aspherical lens of which the image-side lens surface is an aspherical surface.

The fourth lens group G4 is constituted by, in order from the object along the optical axis, a cemented lens including a biconvex lens L41 and a negative meniscus lens L42 having a concave surface oriented toward the object side and a cemented lens including a negative meniscus lens L43 having a convex surface oriented toward the object side and a positive meniscus lens L44 having a convex surface oriented toward the object side. The negative meniscus lens L42 is an aspherical lens of which the image-side lens surface is an aspherical surface.

The fifth lens group G5 is constituted by a positive meniscus lens L51 having a concave surface oriented toward the object side. The positive meniscus lens L51 is an aspherical lens of which the object-side lens surface and the image-side lens surface are aspherical surfaces.

An image sensor (not illustrated) configured as a CCD, CMOS, or the like is disposed at the image plane I.

In the zoom lens according to this example having the above-described configuration, when the zoom lens performs varying magnification from the wide-angle end state to the telephoto end state, the first lens group G1, the second lens group G2, the third lens group G3, and the fourth lens group G4 move along the optical axis in relation to the image plane I such that the distance between the first and second lens groups G1 and G2 decreases, the distance between the second and third lens groups G2 and G3 increases, the distance between the third and fourth lens groups G3 and G4 decreases, and the distance between the fourth and fifth lens groups G4 and G5 increases. Specifically, when the zoom lens performs varying magnification, the first lens group G1 is moved toward the image plane I and is then moved toward the object side, the second and fourth lens groups G2 and G4 are moved integrally toward the object side, the third lens group G3 is moved toward the object side, and the fifth lens group G5 is immovable in relation to the image plane I.

The aperture stop S is disposed between the second and third lens groups G2 and G3 and is moved together with the third lens group G3 upon varying magnification from the wide-angle end state to the telephoto end state.

Moreover, the zoom lens according to this example performs focusing from an object at infinity to an object at a close distance by moving the second F lens group G2F toward the image plane I.

Moreover, the zoom lens according to this example performs image plane correction (that is, vibration reduction) when image blur occurs by moving the cemented lens of the third lens group G3 including the biconcave lens L31 and the positive meniscus lens L32 having a convex surface oriented toward the object side in such a direction as to include a component in the direction orthogonal to the optical axis as a vibration-reduction lens group.

Here, when the focal length of an entire system of the zoom lens according to this example is f and the ratio of a moving distance of an image on the image plane I with respect to a moving distance of the vibration-reduction lens group during blur correction is K, in order to correct rotation blur of angle θ, the vibration-reduction lens group may be shifted in the direction orthogonal to the optical axis by (f·tan θ)/K.

In the zoom lens according to this example, in the wide-angle end state, since the vibration reduction coefficient K is 0.81 and the focal length is 18.54 (mm) (see Table 4 below), the moving distance of the vibration-reduction lens group for correcting the rotation blur of 0.77° is 0.30 (mm). Moreover, in the intermediate focal length state, since the vibration reduction coefficient K is 1.00 and the focal length is 25.21 (mm) (see Table 4 below), the moving distance of the vibration-reduction lens group for correcting the rotation blur of 0.66° is 0.29 (mm). Moreover, in the telephoto end state, since the vibration reduction coefficient K is 1.26 and the focal length is 33.95 (mm) (see Table 4 below), the moving distance of the vibration-reduction lens group for correcting the rotation blur of 0.57° is 0.27 (mm).

Table 3 below illustrates the specification values of the zoom lens according to Example 3.

TABLE 3

Example 3

[Overall Specification]

| | W | M | T |
|---|---|---|---|
| f | 18.54 | 25.21 | 33.95 |
| FNO | 2.83 | 2.83 | 2.83 |
| ω | 49.9 | 40.1 | 31.7 |
| Y | 21.64 | 21.64 | 21.64 |
| TL | 160.545 | 157.622 | 162.364 |
| BF | 18.069 | 18.074 | 18.064 |

[Surface Data]

| Surface number | r | d | nd | vd |
|---|---|---|---|---|
| | Object plane | ∞ | | |
| *1) | 64.13853 | 2.000 | 1.82080 | 42.7 |
| *2) | 20.52237 | 7.450 | | |
| 3) | 42.79628 | 2.000 | 1.84300 | 37.4 |
| 4) | 23.01367 | 14.005 | | |
| 5) | −42.12649 | 2.000 | 1.49782 | 82.6 |
| 6) | 60.80104 | 0.150 | | |
| 7) | 55.48158 | 6.486 | 2.00100 | 29.1 |
| 8) | −197.93506 | (Variable) | | |
| *9) | 46.12318 | 12.702 | 1.58313 | 59.4 |
| 10) | −26.66064 | 1.500 | 1.61772 | 49.8 |
| 11) | −71.59323 | 0.150 | | |
| 12) | 68.72530 | 1.500 | 1.51742 | 52.2 |
| 13) | 35.19343 | (Variable) | | |
| 14) | 27.39712 | 1.500 | 1.84666 | 23.8 |
| 15) | 20.26274 | 11.974 | 1.48749 | 70.3 |
| 16) | −34.96195 | 1.500 | 1.80000 | 25.6 |
| 17) | −55.58525 | (Variable) | | |
| 18) | (Diaphragm) | ∞ | 4.000 | |
| 19) | −144.55027 | 1.500 | 1.74400 | 44.8 |
| 20) | 20.23731 | 4.012 | 1.80244 | 25.6 |
| *21) | 40.54944 | 1.000 | | |
| 22) | (FS) | ∞ | (Variable) | |
| 23) | 29.62933 | 6.997 | 1.49782 | 82.6 |
| 24) | −75.50908 | 1.500 | 1.88202 | 37.2 |
| *25) | −112.41227 | 0.150 | | |
| 26) | 34.10106 | 1.500 | 1.90043 | 37.4 |
| 27) | 19.08383 | 7.811 | 1.49782 | 82.6 |
| 28) | 56.03390 | (Variable) | | |
| *29) | −135.00000 | 4.569 | 1.77250 | 49.5 |
| *30) | −51.50452 | (BF) | | |
| | Image plane | ∞ | | |

[Lens Group Data]

| | Starting surface | Focal distance |
|---|---|---|
| G1 | 1 | −26.00 |
| G2 | 9 | 38.17 |
| G3 | 18 | −45.00 |
| G4 | 23 | 54.97 |
| G5 | 29 | 105.29 |

[Aspheric Data]

Surface number: 1

κ = 1.97190E+00
A4 = −3.80899E−06
A6 = 3.65826E−09

TABLE 3-continued

Example 3

Surface number: 2

$\kappa = 8.82000E{-}02$
$A4 = -1.21936E{-}06$
$A6 = 2.60285E{-}09$
$A8 = 9.42881E{-}13$
$A10 = 3.22230E{-}15$ Surface number: 9

$\kappa = 1.00000E{+}00$
$A4 = -3.25645E{-}06$
$A6 = 5.35394E{-}10$
$A8 = 0.00000E{+}00$
$A10 = 0.00000E{+}00$ Surface number: 21

$\kappa = 4.59700E{-}01$
$A4 = -1.02727E{-}06$
$A6 = -1.01707E{-}08$
$A8 = 9.24484E{-}11$
$A10 = -2.40570E{-}13$ Surface number: 25

$\kappa = 1.00000E{+}00$
$A4 = 9.28617E{-}06$
$A6 = 1.98222E{-}09$
$A8 = 3.47233E{-}11$
$A10 = -1.62414E{-}13$ Surface number: 29

$\kappa = 1.00000E{+}00$
$A4 = 8.29178E{-}06$
$A6 = -3.50865E{-}08$
$A8 = 1.26307E{-}10$
$A10 = -1.60070E{-}13$ Surface number: 30

$\kappa = 1.00000E{+}00$
$A4 = 1.30379E{-}05$
$A6 = -4.40208E{-}08$
$A8 = 1.33306E{-}10$
$A10 = -1.56261E{-}13$ (also continued from previous page:)
$A8 = -2.38771E{-}12$
$A10 = 7.43869E{-}16$

[Variable Distance Data]

|     | W | M | T | W | M | T |
| --- | --- | --- | --- | --- | --- | --- |
|     | Infinity | Infinity | Infinity | Close point | Close point | Close point |
| d0  | ∞ | ∞ | ∞ | 111.82 | 114.75 | 110.00 |
| β   | — | — | — | −0.1327 | −0.1788 | −0.2514 |
| f   | 18.54 | 25.21 | 33.95 | — | — | — |
| d8  | 22.618 | 9.438 | 0.500 | 27.248 | 14.104 | 5.591 |
| d13 | 8.395 | 8.395 | 8.395 | 3.766 | 3.729 | 3.304 |
| d17 | 3.500 | 5.288 | 6.734 | 3.500 | 5.288 | 6.734 |
| d22 | 4.734 | 2.946 | 1.500 | 4.734 | 2.946 | 1.500 |
| d28 | 5.273 | 15.525 | 29.215 | 5.273 | 15.525 | 29.215 |
| BF  | 18.069 | 18.074 | 18.064 | 18.169 | 18.256 | 18.424 |

[Conditional Expression Correspondence Values]

| (1) | $(-f3)/fw = 2.427$ |
| (2) | $|m34|/fw = 0.174$ |
| (3) | $f5/(-f1) = 4.050$ |
| (4) | $|m12|/fw = 1.193$ |
| (5) | $f5/f4 = 1.915$ |
| (6) | $f4/f2 = 1.442$ |
| (7) | $(r1 + r2)/(r1 - r2) = 2.234$ |

Figure 10:
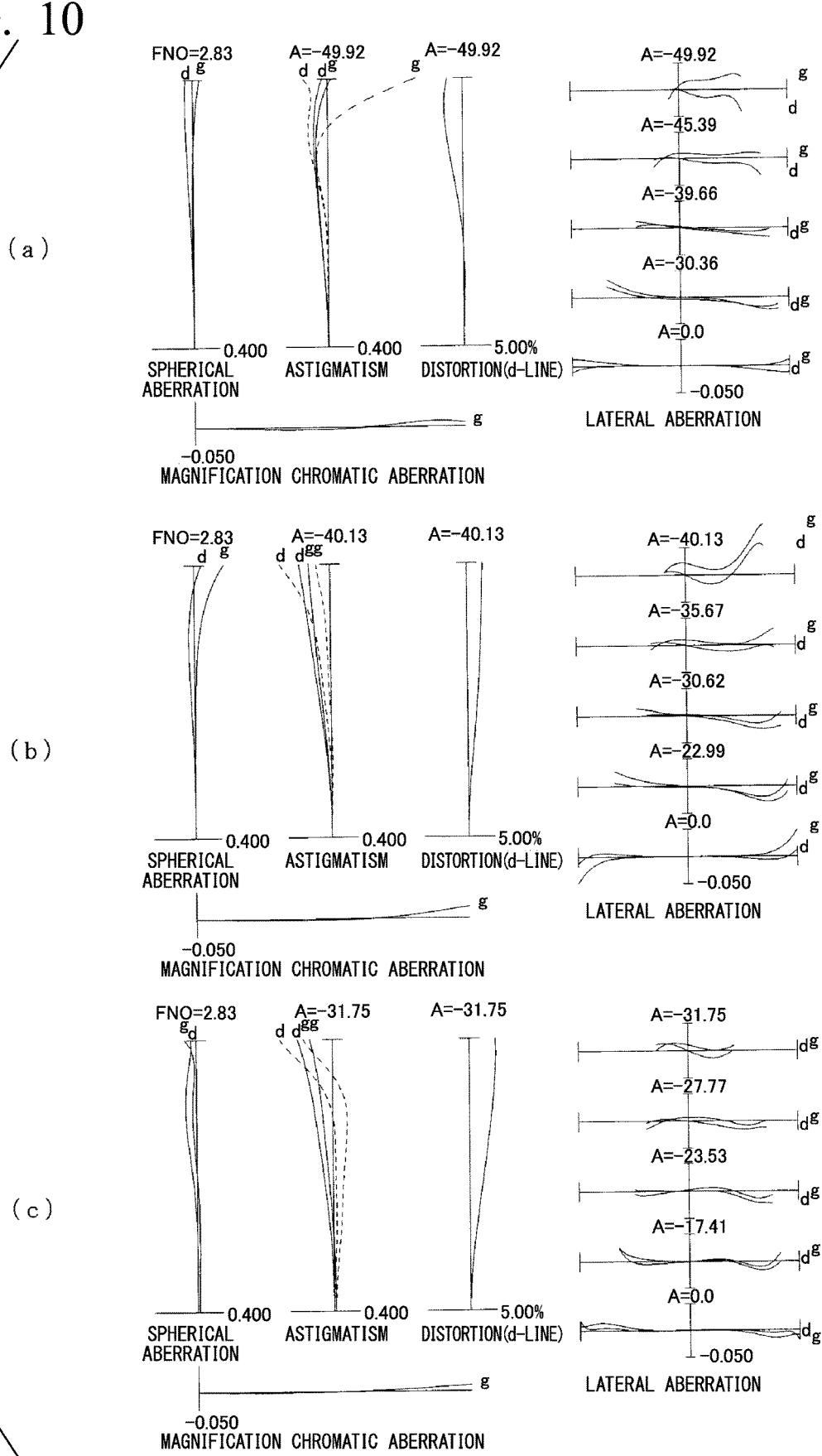
FIG. 10 shows graphs illustrating various aberrations of the zoom lens according to Example 3 upon focusing on an object at infinity, wherein parts (a), (b), and (c) are in the wide-angle end state, the intermediate focal length state, and the telephoto end state, respectively.

FIG. 10 shows graphs illustrating various aberrations of the zoom lens according to Example 3 upon focusing on an object at infinity, wherein parts (a), (b), and (d) are in the wide-angle end state, the intermediate focal length state, and the telephoto end state, respectively.

Figure 11:
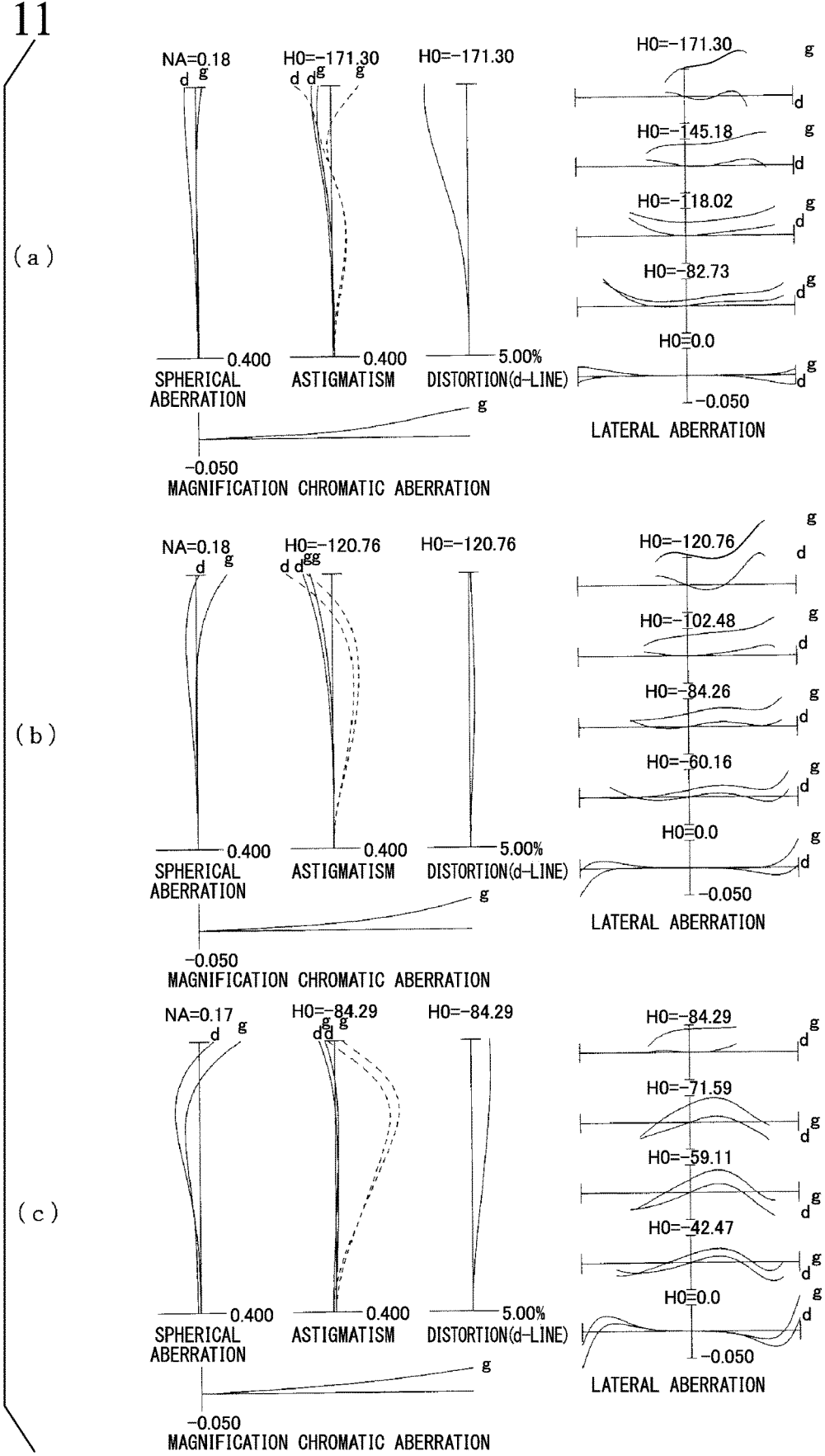
FIG. 11 shows graphs illustrating various aberrations of the zoom lens according to Example 3 upon focusing on an object at a close point, wherein parts (a), (b), and (c) are in the wide-angle end state, the intermediate focal length state, and the telephoto end state, respectively.

FIG. 11 shows graphs illustrating various aberrations of the zoom lens according to Example 3 upon focusing on an object at a close point, wherein parts (a), (b), and (d) are in the wide-angle end state, the intermediate focal length state, and the telephoto end state, respectively.

Figure 12:
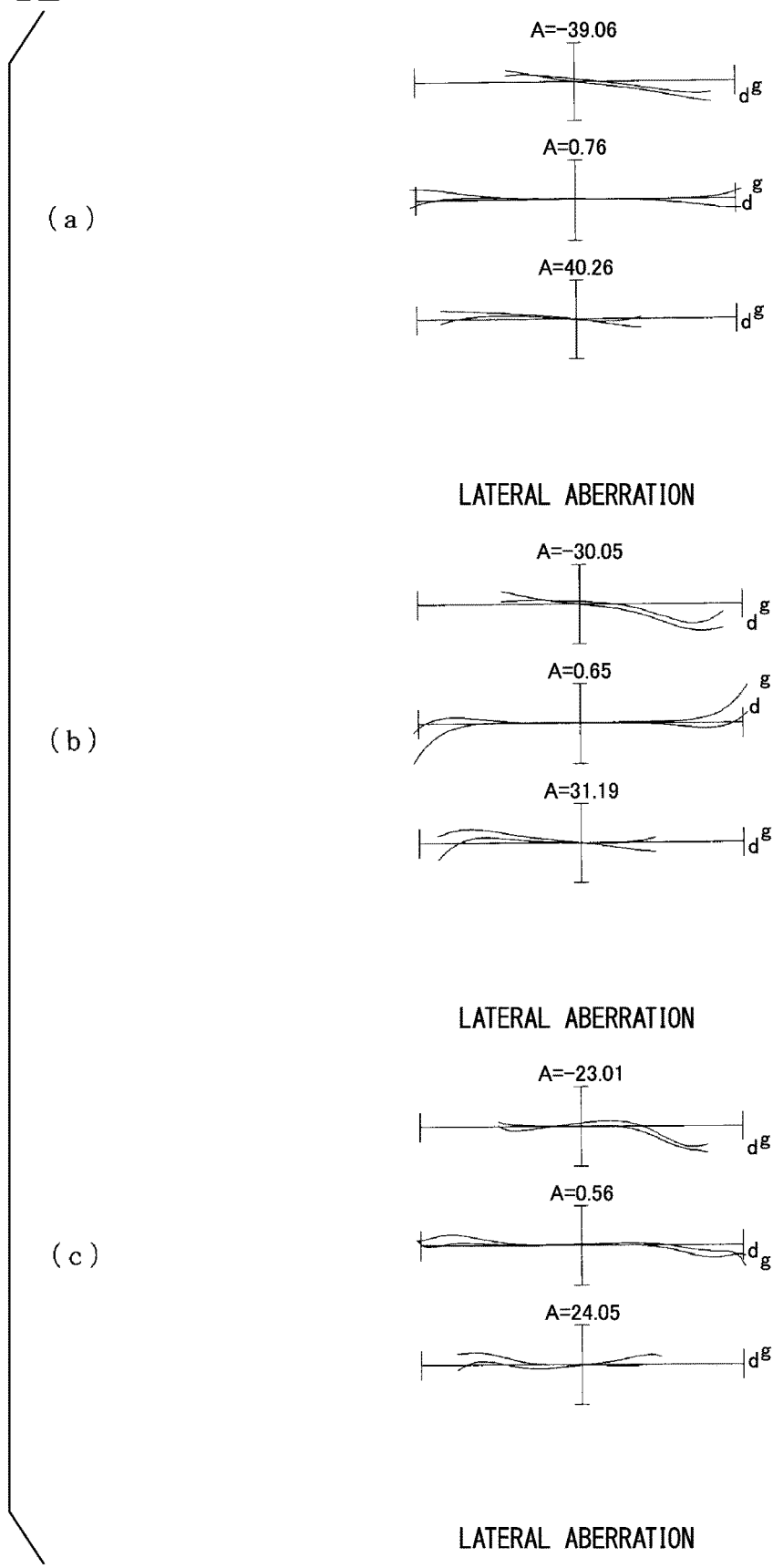
FIG. 12 shows graphs illustrating meridional lateral aberrations of the zoom lens according to Example 3 when vibration reduction is performed, wherein parts (a), (b), and (c) are in the wide-angle end state, the intermediate focal length state, and the telephoto end state, respectively.

FIG. 12 shows graphs illustrating meridional lateral aberrations of the zoom lens according to Example 3 when vibration reduction is performed, wherein parts (a), (b), and (d) are in the wide-angle end state, the intermediate focal length state, and the telephoto end state, respectively.

It can be understood from the respective aberration diagrams that the zoom lens according to Example 3 can satisfactorily correct various aberrations in states ranging from the wide-angle end state to the telephoto end state and has an excellent optical performance upon vibration reduction.

Example 4

Figure 13:
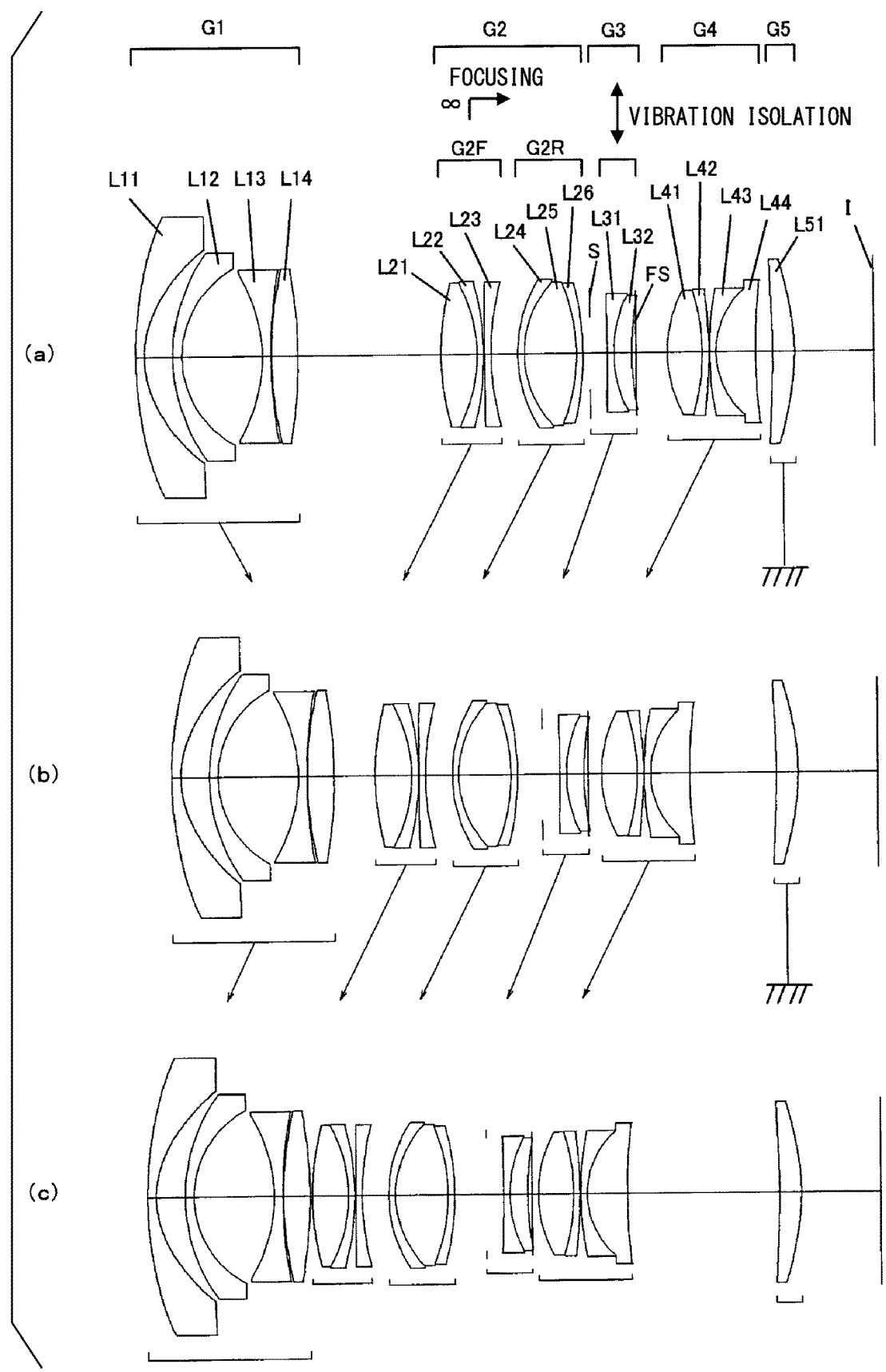
FIG. 13 is a cross-sectional view of a zoom lens according to Example 4, wherein parts (a), (b), and (c) are in a wide-angle end state, an intermediate focal length state, and a telephoto end state, respectively.

FIG. 13 is a cross-sectional view of a zoom lens according to Example 4, wherein parts (a), (b), and (d) are in a wide-angle end state, an intermediate focal length state, and a telephoto end state, respectively.

Arrows under each lens group in FIG. 13(a) indicate the moving directions of each lens group upon varying magnification from the wide-angle end state to the intermediate focal length state. Arrows under each lens group in FIG. 13(b) indicate the moving directions of each lens group upon varying magnification from the intermediate focal length state to the telephoto end state.

As illustrated in FIG. 13(a), a zoom lens according to this example is constituted by, in order from the object along the optical axis, a first lens group G1 having a negative refractive power, a second lens group G2 having a positive refractive power, a third lens group G3 having a negative refractive power, a fourth lens group G4 having a positive refractive power, and a fifth lens group G5 having a positive refractive power.

The first lens group G1 is constituted by, in order from the object along the optical axis, a negative meniscus lens L11 having a convex surface oriented toward the object side, a negative meniscus lens L12 having a convex surface oriented toward the object side, a biconcave lens L13, and a biconvex lens L14. The negative meniscus lens L11 is an aspherical lens of which the object-side lens surface and the image-side lens surface are aspherical surfaces.

The second lens group G2 is constituted by, in order from the object along the optical axis, a second F lens group G2F having a positive refractive power and a second R lens group G2R having a positive refractive power.

The second F lens group G2F is constituted by, in order from the object along the optical axis, a cemented lens including a biconvex lens L21 and a negative meniscus lens L22 having a concave surface oriented toward the object side and a negative meniscus lens L23 having a convex surface oriented toward the object side. The biconvex lens L21 is an aspherical lens of which the object-side lens surface is an aspherical surface.

The second R lens group G2R is constituted by, in order from the object along the optical axis, a cemented lens including a negative meniscus lens L24 having a convex surface oriented toward the object side, a biconvex lens L25, and a negative meniscus lens L26 having a concave surface oriented toward the object side.

The third lens group G3 is constituted by, in order from the object along the optical axis, an aperture stop S, a cemented lens including a biconcave lens L31 and a positive meniscus lens L32 having a convex surface oriented toward the object side, and a flare-cut diaphragm FS. The positive meniscus lens L32 is an aspherical lens of which the image-side lens surface is an aspherical surface.

The fourth lens group G4 is constituted by, in order from the object along the optical axis, a cemented lens including a biconvex lens L41 and a negative meniscus lens L42 having a concave surface oriented toward the object side and a cemented lens including a negative meniscus lens L43 having a convex surface oriented toward the object side and a positive meniscus lens L44 having a convex surface oriented toward the object side. The negative meniscus lens L42 is an aspherical lens of which the image-side lens surface is an aspherical surface.

The fifth lens group G5 is constituted by a positive meniscus lens L51 having a concave surface oriented toward the object side. The positive meniscus lens L51 is an aspherical lens of which the object-side lens surface and the image-side lens surface are aspherical surfaces.

An image sensor (not illustrated) configured as a CCD, CMOS, or the like is disposed at the image plane I.

In the zoom lens according to this example having the above-described configuration, when the zoom lens performs varying magnification from the wide-angle end state to the telephoto end state, the first lens group G1, the second lens group G2, the third lens group G3, and the fourth lens group G4 move along the optical axis in relation to the image plane I such that the distance between the first and second lens groups G1 and G2 decreases, the distance between the second and third lens groups G2 and G3 increases, the distance between the third and fourth lens groups G3 and G4 decreases, and the distance between the fourth and fifth lens groups G4 and G5 increases. Specifically, when the zoom lens performs varying magnification, the first lens group G1 is moved toward the image plane I and is then moved toward the object side, the second and fourth lens groups G2 and G4 are moved integrally toward the object side, the third lens group G3 is moved toward the object side, and the fifth lens group G5 is immovable in relation to the image plane I.

The aperture stop S is disposed between the second and third lens groups G2 and G3 and is moved together with the third lens group G3 upon varying magnification from the wide-angle end state to the telephoto end state.

Moreover, the zoom lens according to this example performs focusing from an object at infinity to an object at a close distance by moving the second F lens group G2F toward the image plane I.

Moreover, the zoom lens according to this example performs image plane correction (that is, vibration reduction) when image blur occurs by moving the cemented lens of the third lens group G3 including the biconcave lens L31 and the positive meniscus lens L32 having a convex surface oriented toward the object side in such a direction as to include a component in the direction orthogonal to the optical axis as a vibration-reduction lens group.

Here, when the focal length of an entire system of the zoom lens according to this example is f and the ratio of a moving distance of an image on the image plane I with respect to a moving distance of the vibration-reduction lens group during blur correction is K, in order to correct rotation blur of angle θ, the vibration-reduction lens group may be shifted in the direction orthogonal to the optical axis by (f·tan θ)/K.

In the zoom lens according to this example, in the wide-angle end state, since the vibration reduction coefficient K is 0.47 and the focal length is 15.45 (mm) (see Table below), the moving distance of the vibration-reduction lens group for correcting the rotation blur of 0.84° is 0.48 (mm). Moreover, in the intermediate focal length state, since the vibration reduction coefficient K is 0.61 and the focal length is 25.21 (mm) (see Table 5 below), the moving distance of the vibration-reduction lens group for correcting the rotation blur of 0.66° is 0.48 (mm). Moreover, in the telephoto end state, since the vibration reduction coefficient K is 0.76 and the focal length is 33.95 (mm) (see Table 5 below), the moving distance of the vibration-reduction lens group for correcting the rotation blur of 0.57° is 0.44 (mm).

Table 4 below illustrates the specification values of the zoom lens according to Example 4.

TABLE 4

Example 4

[Overall Specification]

|  | W | M | T |
|---|---|---|---|
| f | 15.45 | 25.21 | 33.95 |
| FNO | 2.83 | 2.83 | 2.83 |
| ω | 56.2 | 40.0 | 31.8 |
| Y | 21.64 | 21.64 | 21.64 |
| TL | 168.787 | 161.395 | 167.660 |
| BF | 18.067 | 18.070 | 18.058 |

[Surface Data]

| Surface number | r | d | nd | vd |
|---|---|---|---|---|
|  | Object plane | ∞ |  |  |
| *1) | 84.32721 | 2.000 | 1.82080 | 42.7 |
| *2) | 22.42250 | 6.533 |  |  |
| 3) | 40.43903 | 2.000 | 1.90043 | 37.4 |
| 4) | 22.79897 | 18.443 |  |  |
| 5) | −36.72174 | 2.000 | 1.49782 | 82.6 |
| 6) | 108.66132 | 0.150 |  |  |
| 7) | 86.07473 | 6.091 | 2.00100 | 29.1 |
| 8) | −113.52466 | (Variable) |  |  |
| *9) | 56.20536 | 8.334 | 1.58313 | 59.4 |
| 10) | −34.82724 | 1.500 | 1.62896 | 51.8 |
| 11) | −62.67282 | 0.150 |  |  |
| 12) | 1521.91690 | 1.500 | 1.51742 | 52.2 |
| 13) | 63.48881 | (Variable) |  |  |
| 14) | 32.18721 | 1.500 | 1.83207 | 24.9 |
| 15) | 23.97842 | 11.952 | 1.48749 | 70.3 |
| 16) | −42.36534 | 1.500 | 1.79889 | 25.4 |
| 17) | −64.06791 | (Variable) |  |  |
| 18) | (Diaphragm) | ∞ | 4.000 |  |
| 19) | −402.90754 | 1.500 | 1.74400 | 44.8 |
| 20) | 29.51707 | 4.016 | 1.80244 | 25.6 |
| *21) | 67.51202 | 1.000 |  |  |
| 22) | (FS) | ∞ | (Variable) |  |
| 23) | 30.01453 | 8.025 | 1.49782 | 82.6 |
| 24) | −48.32228 | 1.500 | 1.88202 | 37.2 |
| *25) | −80.74589 | 0.150 |  |  |
| 26) | 73.99805 | 1.500 | 1.90043 | 37.4 |
| 27) | 19.28578 | 8.991 | 1.49782 | 82.6 |
| 28) | 131.61654 | (Variable) |  |  |
| *29) | −135.00000 | 5.020 | 1.77250 | 49.5 |
| *30) | −45.90440 | (BF) |  |  |
|  | Image plane | ∞ |  |  |

[Lens Group Data]

|  | Starting surface | Focal distance |
|---|---|---|
| G1 | 1 | −26.00 |
| G2 | 9 | 40.61 |
| G3 | 18 | −85.00 |
| G4 | 23 | 113.40 |
| G5 | 29 | 87.88 |

[Aspheric Data]

Surface number: 1

$\kappa$ = 1.07450E+00
A4 = −1.57852E−06
A6 = 2.55869E−09
A8 = −1.24755E−12
A10 = 2.99043E−16

Surface number: 2

$\kappa$ = 2.82500E−01
A4 = −5.25879E−06
A6 = 2.99379E−09
A8 = −1.07006E−13
A10 = 2.38338E−15

Surface number: 9

$\kappa$ = 1.00000E+00
A4 = −3.44380E−06

TABLE 4-continued

Example 4

A6 = 6.36234E−10
A8 = 0.00000E+00
A10 = 0.00000E+00
Surface number: 21

κ = 5.97700E−01
A4 = −1.14555E−08
A6 = −6.90561E−09
A8 = 2.24606E−11
A10 = −2.11799E−15
Surface number: 25

κ = 1.00000E+00
A4 = 8.46457E−06
A6 = −1.83245E−09
A8 = 1.13124E−11
A10 = −6.67256E−14
Surface number: 29

κ = 1.00000E+00
A4 = 1.35371E−05
A6 = −4.85133E−08
A8 = 1.04081E−10
A10 = −9.31604E−14
Surface number: 30

κ = 1.00000E+00
A4 = 2.00382E−05
A6 = −5.78531E−08
A8 = 1.07159E−10
A10 = −8.91147E−14

[Variable Distance Data]

|  | W | M | T | W | M | T |
|---|---|---|---|---|---|---|
|  | Infinity | Infinity | Infinity | Close point | Close point | Close point |
| d0 | ∞ | ∞ | ∞ | 103.58 | 110.97 | 104.70 |
| β | — | — | — | −0.1177 | −0.1847 | −0.2625 |
| f | 15.45 | 25.21 | 33.95 | — | — | — |
| d8 | 32.660 | 9.394 | 0.500 | 37.602 | 14.284 | 5.903 |
| d13 | 6.126 | 6.126 | 6.126 | 1.184 | 1.237 | 0.724 |
| d17 | 1.500 | 5.658 | 7.190 | 1.500 | 5.658 | 7.190 |
| d22 | 7.190 | 3.032 | 1.500 | 7.190 | 3.032 | 1.500 |
| d28 | 3.889 | 19.760 | 34.930 | 3.889 | 19.760 | 34.930 |
| BF | 18.067 | 18.070 | 18.058 | 18.146 | 18.265 | 18.451 |

[Conditional Expression Correspondence Values]

| (1) | (−f3)/fw = 5.502 |
| (2) | /m34/fw = 0.368 |
| (3) | f5/(−f1) = 3.380 |
| (4) | |m 12|/fw = 2.082 |
| (5) | f5/f4 = 0.775 |
| (6) | f4/f2 = 2.792 |
| (7) | (r1 + r2)/(r1 − r2) = 2.030 |

Figure 14:
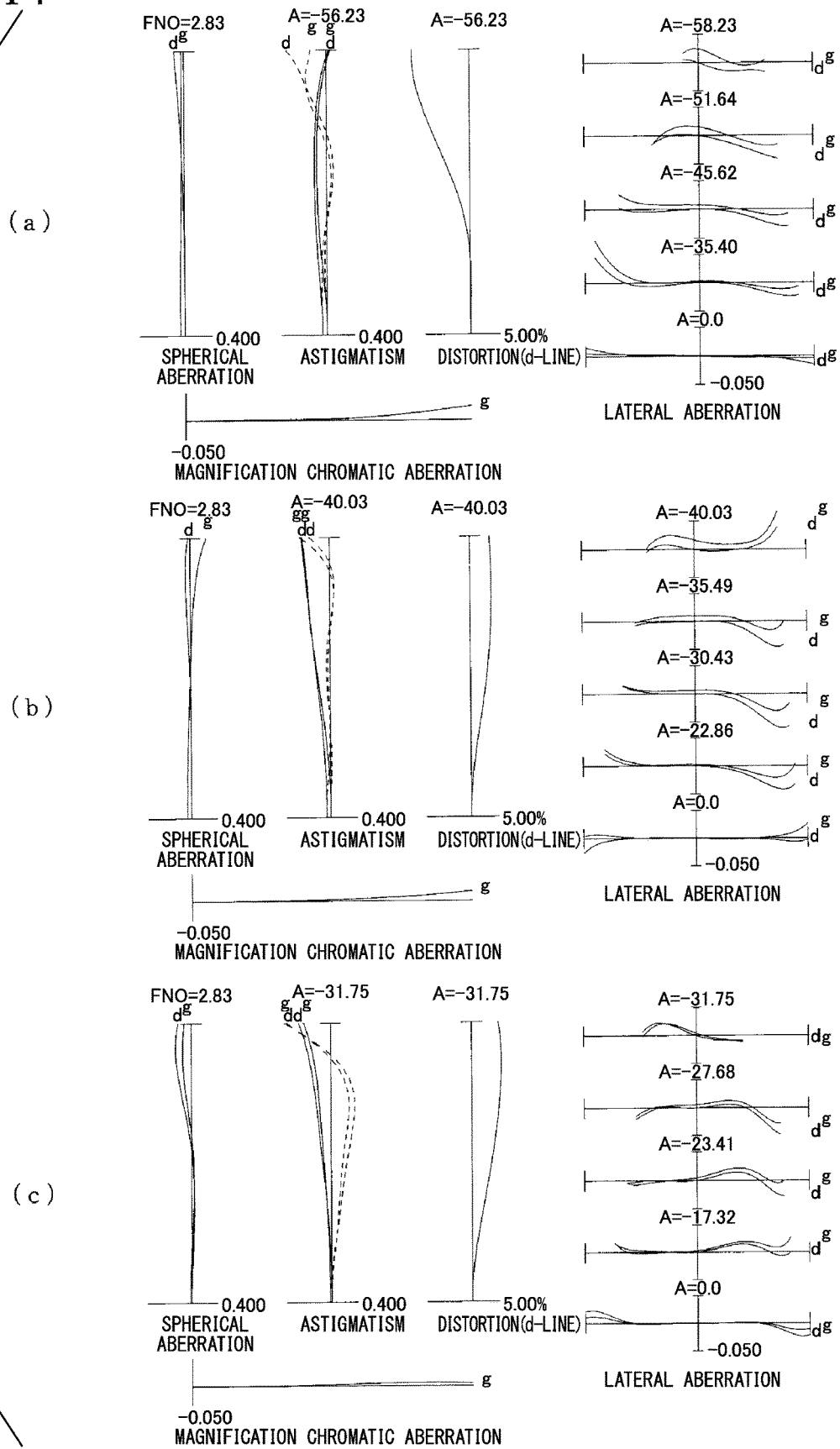
FIG. 14 shows graphs illustrating various aberrations of the zoom lens according to Example 4 upon focusing on an object at infinity, wherein parts (a), (b), and (c) are in the wide-angle end state, the intermediate focal length state, and the telephoto end state, respectively.

FIG. 14 shows graphs illustrating various aberrations of the zoom lens according to Example 4 upon focusing on an object at infinity, wherein parts (a), (b), and (d) are in the wide-angle end state, the intermediate focal length state, and the telephoto end state, respectively.

Figure 15:
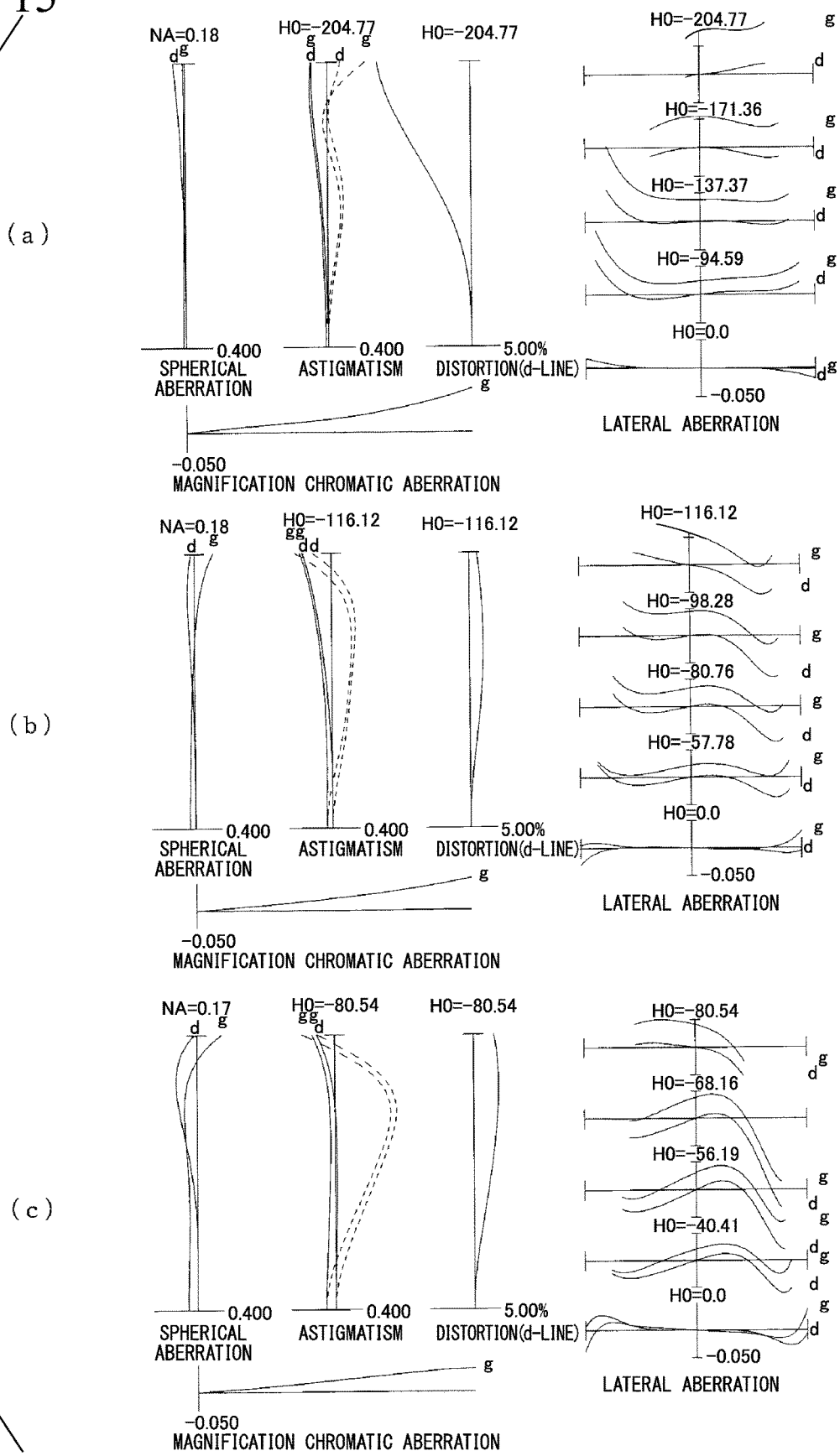
FIG. 15 shows graphs illustrating various aberrations of the zoom lens according to Example 4 upon focusing on an object at a close point, wherein parts (a), (b), and (c) are in the wide-angle end state, the intermediate focal length state, and the telephoto end state, respectively.

FIG. 15 shows graphs illustrating various aberrations of the zoom lens according to Example 4 upon focusing on an object at a close point, wherein parts (a), (b), and (d) are in the wide-angle end state, the intermediate focal length state, and the telephoto end state, respectively.

Figure 16:
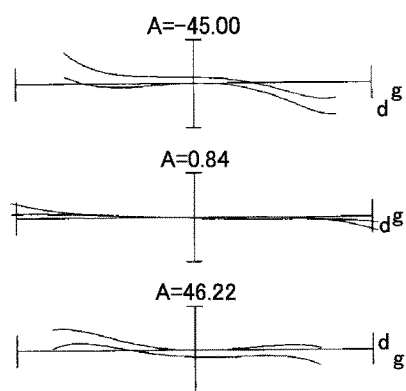
FIG. 16 shows graphs illustrating meridional lateral aberrations of the zoom lens according to Example 4 when vibration reduction is performed, wherein parts (a), (b), and (c) are in the wide-angle end state, the intermediate focal length state, and the telephoto end state, respectively.
Figure 16:
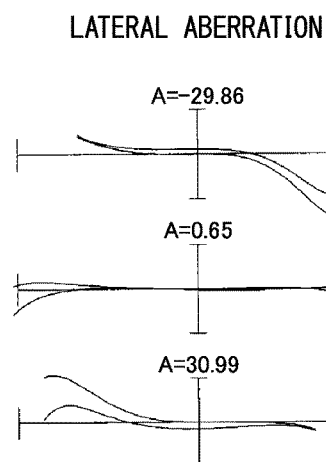
Figure 16:
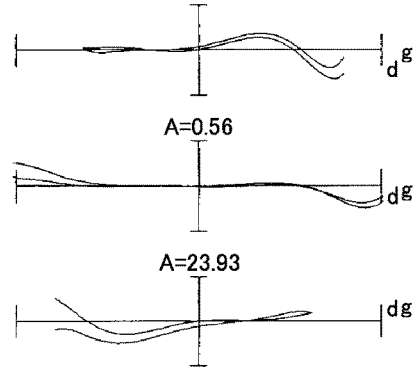

FIG. 16 shows graphs illustrating meridional lateral aberrations of the zoom lens according to Example 4 when vibration reduction is performed, wherein parts (a), (b), and (d) are in the wide-angle end state, the intermediate focal length state, and the telephoto end state, respectively.

It can be understood from the respective aberration diagrams that the zoom lens according to Example 4 can satisfactorily correct various aberrations in states ranging from the wide-angle end state to the telephoto end state and has an excellent optical performance upon vibration reduction.

Example 5

Figure 17:
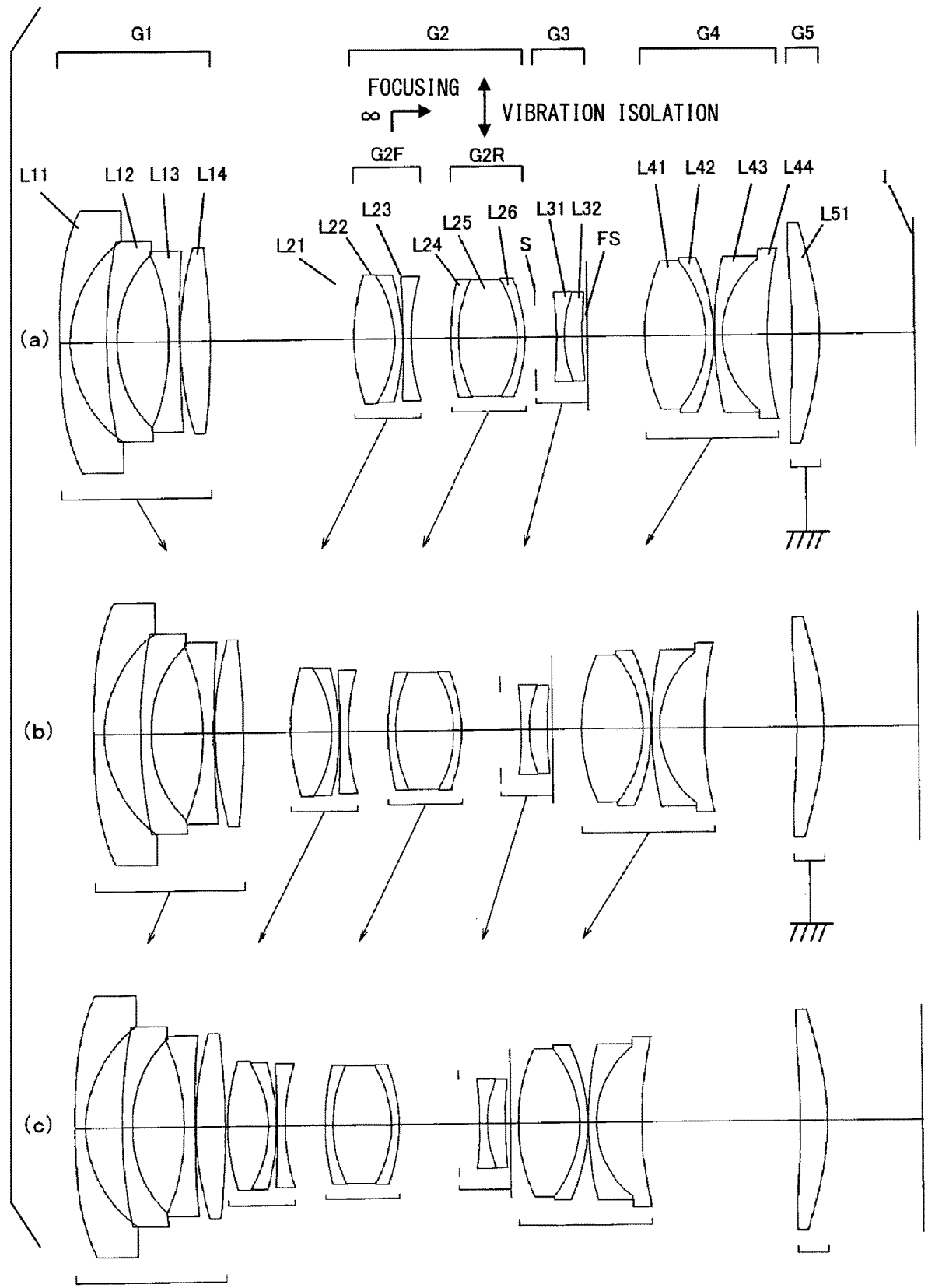
FIG. 17 is a cross-sectional views of a zoom lens according to Example 5, wherein parts (a), (b), and (c) are in a wide-angle end state, an intermediate focal length state, and a telephoto end state, respectively.

FIG. 17 is a cross-sectional view of a zoom lens according to Example 5, wherein parts (a), (b), and (d) are in a wide-angle end state, an intermediate focal length state, and a telephoto end state, respectively.

Arrows under each lens group in FIG. 17(a) indicate the moving directions of each lens group upon varying magnification from the wide-angle end state to the intermediate focal length state. Arrows under each lens group in FIG. 17(b) indicate the moving directions of each lens group upon varying magnification from the intermediate focal length state to the telephoto end state.

As illustrated in FIG. 17(a), a zoom lens according to this example is constituted by, in order from an object along an optical axis, a first lens group G1 having a negative refractive power, a second lens group G2 having a positive refractive power, a third lens group G3 having a negative refractive power, a fourth lens group G4 having a positive refractive power, and a fifth lens group G5 having a positive refractive power.

The first lens group G1 is constituted by, in order from the object along the optical axis, a negative meniscus lens L11 having a convex surface oriented toward the object side, a negative meniscus lens L12 having a convex surface oriented toward the object side, a biconcave lens L13, and a biconvex lens L14. The negative meniscus lens L11 is an aspherical lens of which the object-side lens surface and the image-side lens surface are aspherical surfaces. The negative meniscus lens L12 is an aspherical lens of which the image-side lens surface is an aspherical surface.

The second lens group G2 is constituted by, in order from the object along the optical axis, a second F lens group G2F having a positive refractive power and a second R lens group G2R having a positive refractive power.

The second F lens group G2F is constituted by, in order from the object along the optical axis, a cemented lens including a biconvex lens L21 and a negative meniscus lens L22 having a concave surface oriented toward the object side and a biconcave lens L23. The biconvex lens L21 is an aspherical lens of which the object-side lens surface is an aspherical surface.

The second R lens group G2R is constituted by, in order from the object along the optical axis, a cemented lens including a negative meniscus lens L24 having a convex surface oriented toward the object side, a biconvex lens L25, and a negative meniscus lens L26 having a concave surface oriented toward the object side. The negative meniscus lens L24 is an aspherical lens of which the object-side lens surface is an aspherical surface.

The third lens group G3 is constituted by, in order from the object along the optical axis, an aperture stop S, a cemented lens including a biconcave lens L31 and a positive meniscus lens L32 having a convex surface oriented toward the object side, and a flare-cut diaphragm FS.

The fourth lens group G4 is constituted by, in order from the object along the optical axis, a cemented lens including a biconvex lens L41 and a negative meniscus lens L42 having a concave surface oriented toward the object side and a cemented lens including a negative meniscus lens L43 having a convex surface oriented toward the object side and a positive meniscus lens L44 having a convex surface oriented toward the object side. The negative meniscus lens L42 is an aspherical lens of which the image-side lens surface is an aspherical surface.

The fifth lens group G5 is constituted by a positive meniscus lens L51 having a concave surface oriented toward the object side. The positive meniscus lens L51 is an aspherical lens of which the object-side lens surface and the image-side lens surface are aspherical surfaces.

An image sensor (not illustrated) configured as a CCD, CMOS, or the like is disposed at the image plane I.

In the zoom lens according to this example having the above-described configuration, when the zoom lens performs varying magnification from the wide-angle end state to the telephoto end state, the first lens group G1, the second lens group G2, the third lens group G3, and the fourth lens group G4 move along the optical axis in relation to the image plane I such that the distance between the first and second lens groups G1 and G2 decreases, the distance between the second and third lens groups G2 and G3 increases, the distance between the third and fourth lens groups G3 and G4 decreases, and the distance between the fourth and fifth lens groups G4 and G5 increases. Specifically, when the zoom lens performs varying magnification, the first lens group G1 is moved toward the image plane I and is then moved toward the object side, the second and fourth lens groups G2 and G4 are moved integrally toward the object side, the third lens group G3 is moved toward the object side, and the fifth lens group G5 is immovable in relation to the image plane I.

The aperture stop S is disposed between the second and third lens groups G2 and G3 and is moved together with the third lens group G3 upon varying magnification from the wide-angle end state to the telephoto end state.

Moreover, the zoom lens according to this example performs focusing from an object at infinity to an object at a close distance by moving the second F lens group G2F toward the image plane I.

Moreover, the zoom lens according to this example performs image plane correction (that is, vibration reduction) when image blur occurs by moving the second R lens group G2R in such a direction as to include a component in the direction orthogonal to the optical axis as a vibration-reduction lens group.

Here, when the focal length of an entire system of the zoom lens according to this example is f and the ratio of a moving distance of an image on the image plane I with respect to a moving distance of the vibration-reduction lens group during blur correction is K, in order to correct rotation blur of angle θ, the vibration-reduction lens group may be shifted in the direction orthogonal to the optical axis by (f·tan θ)/K.

In the zoom lens according to this example, in the wide-angle end state, since the vibration reduction coefficient K is 1.07 and the focal length is 16.48 (mm) (see Table 6 below), the moving distance of the vibration-reduction lens group for correcting the rotation blur of 0.81° is 0.22 (mm). Moreover, in the intermediate focal length state, since the vibration reduction coefficient K is 1.37 and the focal length is 25.21 (mm) (see Table 6 below), the moving distance of the vibration-reduction lens group for correcting the rotation blur of 0.66° is 0.21 (mm). Moreover, in the telephoto end state, since the vibration reduction coefficient K is 1.67 and the focal length is 33.95 (mm) (see Table 6 below), the moving distance of the vibration-reduction lens group for correcting the rotation blur of 0.57° is 0.20 (mm).

Table 5 below illustrates the specification values of the zoom lens according to Example 5.

TABLE 5

Example 5

[Overall Specification]

| | W | M | T |
|---|---|---|---|
| f | 16.48 | 25.21 | 33.95 |
| FNO | 4.00 | 4.00 | 4.00 |
| ω | 54.1 | 39.8 | 31.7 |
| Y | 21.64 | 21.64 | 21.64 |
| TL | 162.369 | 156.678 | 160.978 |
| B | 18.069 | 18.064 | 18.074 |

[Surface Data]

| Surface number | r | d | nd | νd |
|---|---|---|---|---|
| | Object plane | ∞ | | |
| *1) | 180.13769 | 2.000 | 1.82080 | 42.7 |
| *2) | 19.96088 | 6.970 | | |
| 3) | 94.52854 | 2.000 | 1.90043 | 37.4 |
| *4) | 28.44278 | 9.857 | | |
| 5) | −42.62350 | 2.000 | 1.49782 | 82.6 |
| 6) | 244.08326 | 0.150 | | |
| 7) | 61.25466 | 5.605 | 2.00100 | 29.1 |
| 8) | −150.06559 | (Variable) | | |
| *9) | 36.24721 | 7.764 | 1.58313 | 59.4 |
| 10) | −22.60689 | 1.500 | 1.65844 | 50.8 |
| 11) | −43.72965 | 0.151 | | |
| 12) | −207.94715 | 1.500 | 1.51742 | 52.2 |
| 13) | 40.03120 | (Variable) | | |
| *14) | 43.25649 | 1.500 | 1.79504 | 28.7 |
| 15) | 26.23995 | 11.085 | 1.48749 | 70.3 |
| 16) | −21.42752 | 1.500 | 1.68893 | 31.2 |
| 17) | −29.56586 | (Variable) | | |
| 18) | (Diaphragm) | ∞ | 4.000 | |
| 19) | −74.75529 | 1.500 | 1.74400 | 44.8 |
| 20) | 22.57348 | 3.362 | 1.80244 | 25.6 |
| 21) | 84.92681 | 1.000 | | |
| 22) | (FS) | ∞ | (Variable) | |
| 23) | 34.18409 | 11.631 | 1.49782 | 82.6 |
| 24) | −22.09869 | 1.500 | 1.88202 | 37.2 |
| *25) | −35.01463 | 0.150 | | |
| 26) | 64.77675 | 1.500 | 1.90043 | 37.4 |
| 27) | 18.18435 | 8.523 | 1.49782 | 82.6 |
| 28) | 70.17847 | (Variable) | | |
| *29) | −135.00000 | 5.121 | 1.77250 | 49.5 |
| *30) | −46.54146 | (BF) | | |
| | Image plane | | | |

[Lens Group Data]

| | Starting surface | Focal distance |
|---|---|---|
| G1 | 1 | −23.15 |
| G2 | 9 | 37.14 |
| G3 | 18 | −58.82 |
| G4 | 23 | 86.56 |
| G5 | 29 | 89.68 |

[Aspheric Data]

Surface number: 1

κ = 2.00000E+00
A4 = 7.91245E−06
A6 = −3.69643E−09
A8 = 1.11415E−12
A10 = −2.04281E−16

Surface number: 2

κ = 1.05500E−01
A4 = −1.07575E−05
A6 = 4.04887E−08
A8 = −2.80099E−11
A10 = 8.02396E−14

Surface number: 4

κ = 1.00000E+00
A4 = 2.14895E−05
A6 = 5.07570E−09

TABLE 5-continued

Example 5

κ = 1.00000E+00
A8 = −8.70469E−11
A10 = 9.89182E−14
Surface number: 9

κ = 1.00000E+00
A4 = −5.58940E−06
A6 = −6.24739E−09
A8 = 0.00000E+00
A10 = 0.00000E+00
Surface number: 14

κ = 1.00000E+00
A4 = −4.10738E−06
A6 = 2.26991E−09
A8 = −1.27958E−11
A10 = 2.28497E−14
Surface number: 25

κ = 1.00000E+00
A4 = 6.63910E−06
A6 = −2.70332E−09
A8 = −1.14938E−11
A10 = −3.86980E−14
Surface number: 29

κ = 1.00000E+00
A4 = 2.96724E−06
A6 = −7.37447E−10
A8 = 4.28602E−11
A10 = −7.07831E−14
Surface number: 30

κ = 1.00000E+00
A4 = 5.46618E−06
A6 = −9.05640E−09
A8 = 6.16567E−11
A10 = −8.57111E−14

[Variable Distance Data]

|     | W | M | T | W | M | T |
| --- | --- | --- | --- | --- | --- | --- |
|     | Infinity | Infinity | Infinity | Close point | Close point | Close point |
| d0 | ∞ | ∞ | ∞ | 110.00 | 115.69 | 111.40 |
| β | — | — | — | −0.1243 | −0.1848 | −0.2589 |
| f | 16.48 | 25.21 | 33.95 | — | — | — |
| d8 | 27.344 | 8.875 | 0.500 | 31.204 | 12.826 | 4.873 |
| d13 | 7.541 | 7.541 | 7.541 | 3.681 | 3.590 | 3.168 |
| d17 | 2.000 | 7.319 | 11.342 | 2.000 | 7.319 | 11.342 |
| d22 | 10.842 | 5.524 | 1.500 | 10.842 | 5.524 | 1.500 |
| d28 | 4.704 | 17.488 | 30.153 | 4.704 | 17.488 | 30.158 |
| BF | 18.069 | 18.064 | 18.074 | 18.157 | 18.259 | 18.456 |

[Conditional Expression Correspondence Values]

| (1) | (−f3)/fw = 3.569 |
| (2) | |m34|/fw = 0.567 |
| (3) | f5/(−f1) = 3.873 |
| (4) | |m12|/fw = 1.629 |
| (5) | f5/f4 = 1.036 |
| (6) | f4/f2 = 2.330 |
| (7) | (r1 + r2)/(r1 − r2) = 2.052 |

Figure 18:
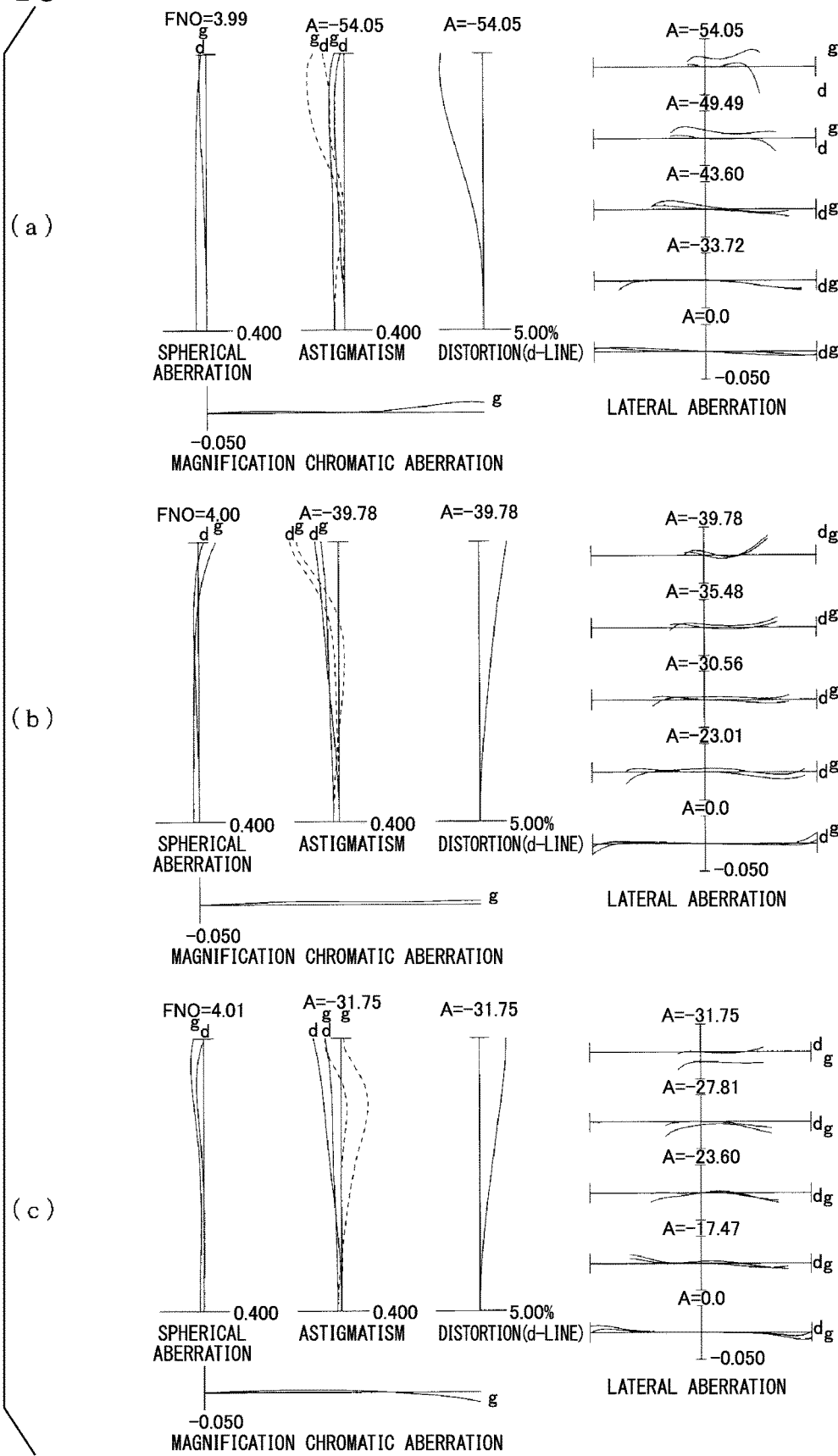
FIG. 18 shows graphs illustrating various aberrations of the zoom lens according to Example 5 upon focusing on an object at infinity, wherein parts (a), (b), and (c) are in the wide-angle end state, the intermediate focal length state, and the telephoto end state, respectively.

FIG. 18 shows graphs illustrating various aberrations of the zoom lens according to Example 5 upon focusing on an object at infinity, wherein parts (a), (b), and (d) are in the wide-angle end state, the intermediate focal length state, and the telephoto end state, respectively.

Figure 19:
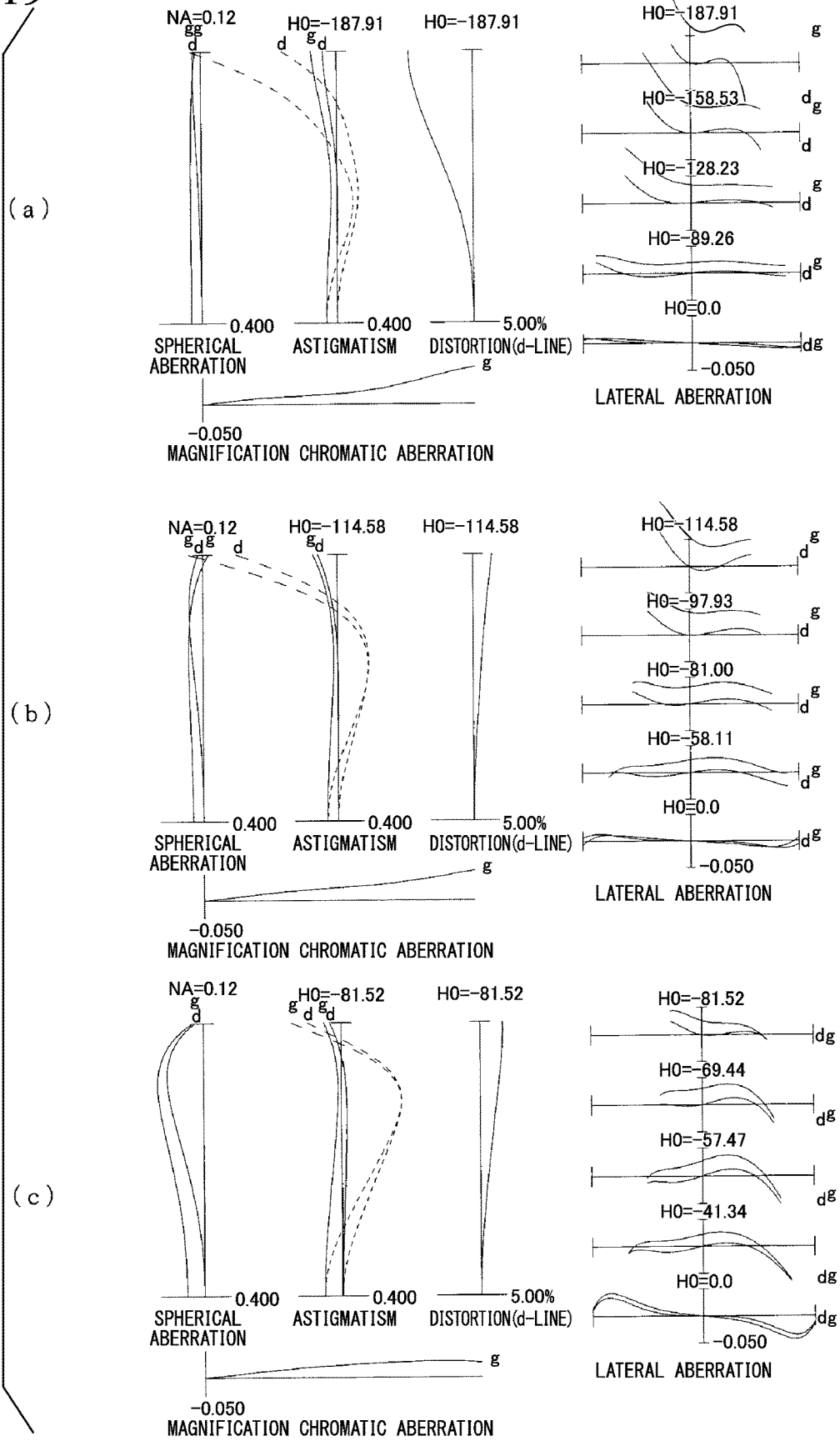
FIG. 19 shows graphs illustrating various aberrations of the zoom lens according to Example 5 upon focusing on an object at a close point, wherein parts (a), (b), and (c) are in the wide-angle end state, the intermediate focal length state, and the telephoto end state, respectively.

FIG. 19 shows graphs illustrating various aberrations of the zoom lens according to Example 5 upon focusing on an object at a close point, wherein parts (a), (b), and (d) are in the wide-angle end state, the intermediate focal length state, and the telephoto end state, respectively.

Figure 20:
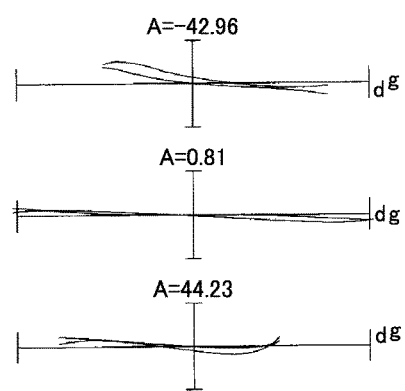
FIG. 20 shows graphs illustrating meridional lateral aberrations of the zoom lens according to Example 5 when vibration reduction is performed, wherein parts (a), (b), and (c) are in the wide-angle end state, the intermediate focal length state, and the telephoto end state, respectively.
Figure 20:
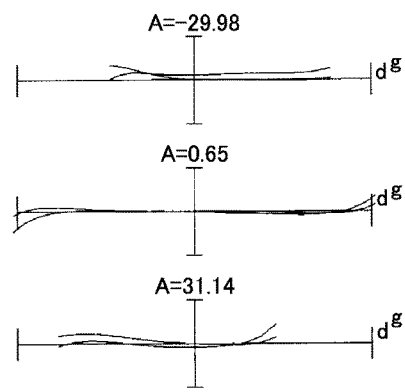
Figure 20:
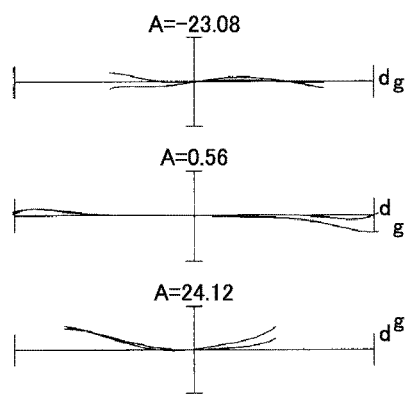

FIG. 20 shows graphs illustrating meridional lateral aberrations of the zoom lens according to Example 5 when vibration reduction is performed, wherein parts (a), (b), and (d) are in the wide-angle end state, the intermediate focal length state, and the telephoto end state, respectively.

It can be understood from the respective aberration diagrams that the zoom lens according to Example 5 can satisfactorily correct various aberrations in states ranging from the wide-angle end state to the telephoto end state and has an excellent optical performance upon vibration reduction.

Example 6

Figure 21:
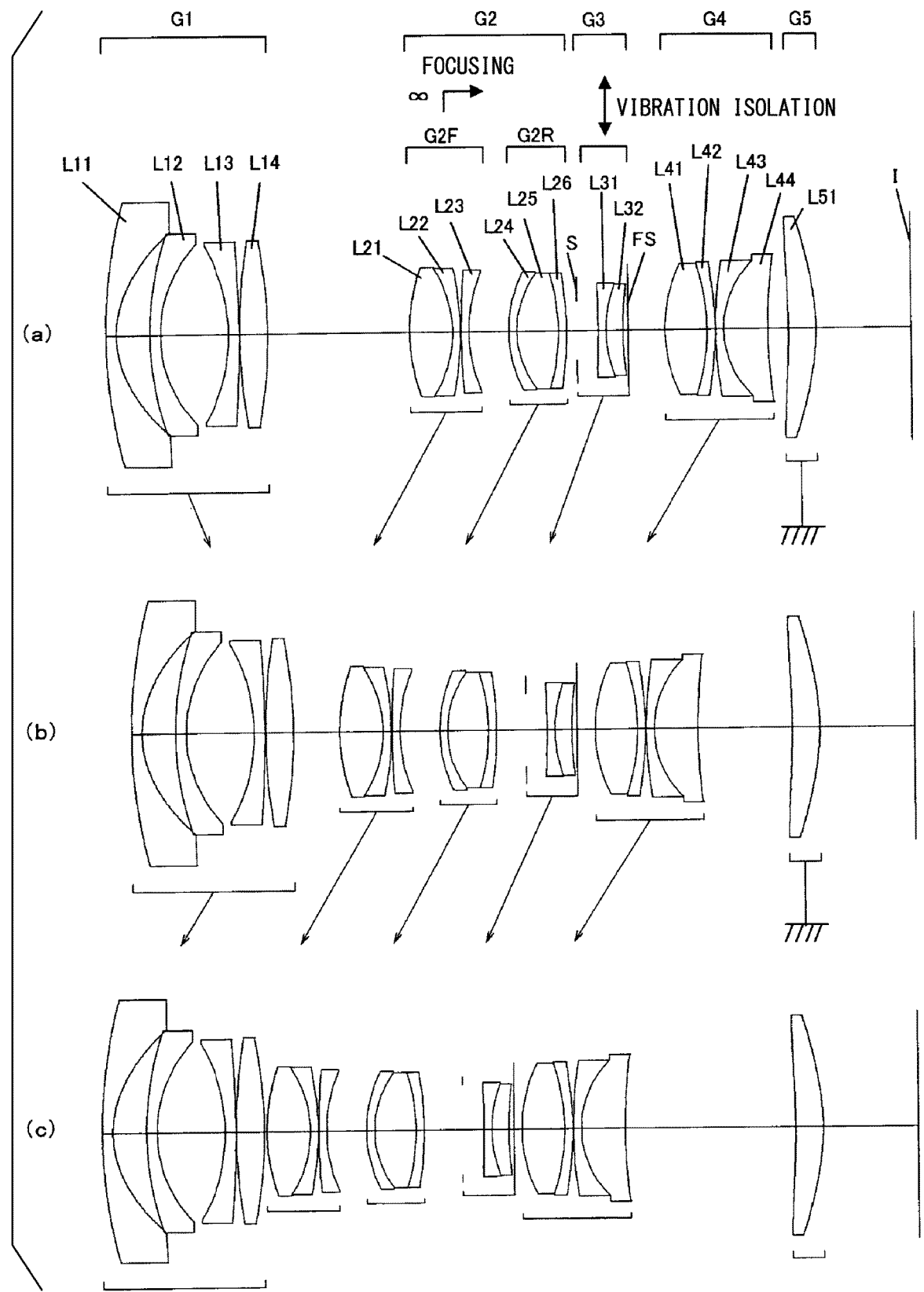
FIG. 21 is a cross-sectional views of a zoom lens according to Example 6, wherein parts (a), (b), and (c) are in a wide-angle end state, an intermediate focal length state, and a telephoto end state, respectively.

FIG. 21 is a cross-sectional view of a zoom lens according to Example 6 in a wide-angle end state, an intermediate focal length state, and a telephoto end state, respectively.

Arrows under each lens group in FIG. 21(a) indicate the moving directions of each lens group upon varying magnification from the wide-angle end state to the intermediate focal length state. Arrows under each lens group in FIG. 21(b) indicate the moving directions of each lens group upon varying magnification from the intermediate focal length state to the telephoto end state.

As illustrated in FIG. 21(a), a zoom lens according to this example is constituted by, in order from an object along an optical axis, a first lens group G1 having a negative refractive power, a second lens group G2 having a positive refractive power, a third lens group G3 having a negative refractive power, a fourth lens group G4 having a positive refractive power, and a fifth lens group G5 having a positive refractive power.

The first lens group G1 is constituted by, in order from the object along the optical axis, a negative meniscus lens L11 having a convex surface oriented toward the object side, a negative meniscus lens L12 having a convex surface oriented toward the object side, a negative meniscus lens L13 having a concave surface oriented toward the object side, and a biconvex lens L14. The negative meniscus lens L11 is an aspherical lens of which the object-side lens surface and the image-side lens surface are aspherical surfaces.

The second lens group G2 is constituted by, in order from the object along the optical axis, a second F lens group G2F having a positive refractive power and a second R lens group G2R having a positive refractive power.

The second F lens group G2F is constituted by, in order from the object along the optical axis, a cemented lens including a biconvex lens L21 and a negative meniscus lens L22 having a concave surface oriented toward the object side and a negative meniscus lens L23 having a convex surface oriented toward the object side. The biconvex lens L21 is an aspherical lens of which the object-side lens surface is an aspherical surface.

The second R lens group G2R is constituted by, in order from the object along the optical axis, a cemented lens including a negative meniscus lens L24 having a convex surface oriented toward the object side, a biconvex lens L25, and a negative meniscus lens L26 having a concave surface oriented toward the object side.

The third lens group G3 is constituted by, in order from the object along the optical axis, an aperture stop S, a cemented lens including a biconcave lens L31 and a positive meniscus lens L32 having a convex surface oriented toward the object side, and a flare-cut diaphragm FS. The positive meniscus lens L32 is an aspherical lens of which the image-side lens surface is an aspherical surface.

The fourth lens group G4 is constituted by, in order from the object along the optical axis, a cemented lens including a biconvex lens L41 and a negative meniscus lens L42 having a concave surface oriented toward the object side and a cemented lens including a negative meniscus lens L43 having a convex surface oriented toward the object side and a positive meniscus lens L44 having a convex surface oriented toward the object side. The negative meniscus lens L42 is an aspherical lens of which the image-side lens surface is an aspherical surface.

The fifth lens group G5 is constituted by a positive meniscus lens L51 having a concave surface oriented toward the object side. The positive meniscus lens L51 is an aspherical lens of which the object-side lens surface and the image-side lens surface are aspherical surfaces.

An image sensor (not illustrated) configured as a CCD, CMOS, or the like is disposed at the image plane I.

In the zoom lens according to this example having the above-described configuration, when the zoom lens performs varying magnification from the wide-angle end state to the telephoto end state, the first lens group G1, the second lens group G2, the third lens group G3, and the fourth lens group G4 move along the optical axis in relation to the image plane I such that the distance between the first and second lens groups G1 and G2 decreases, the distance between the second and third lens groups G2 and G3 increases, the distance between the third and fourth lens groups G3 and G4 decreases, and the distance between the fourth and fifth lens groups G4 and G5 increases. Specifically, when the zoom lens performs varying magnification, the first lens group G1 is moved toward the image plane I and is then moved toward the object side, the second and fourth lens groups G2 and G4 are moved integrally toward the object side, the third lens group G3 is moved toward the object side, and the fifth lens group G5 is immovable in relation to the image plane I.

The aperture stop S is disposed between the second and third lens groups G2 and G3 and is moved together with the third lens group G3 upon varying magnification from the wide-angle end state to the telephoto end state.

Moreover, the zoom lens according to this example performs focusing from an object at infinity to an object at a close distance by moving the second F lens group G2F toward the image plane I.

Moreover, the zoom lens according to this example performs image plane correction (that is, vibration reduction) when image blur occurs by moving the cemented lens of the third lens group G3 including the biconcave lens L31 and the positive meniscus lens L32 having a convex surface oriented toward the object side in such a direction as to include a component in the direction orthogonal to the optical axis as a vibration-reduction lens group.

Here, when the focal length of an entire system of the zoom lens according to this example is f and the ratio of a moving distance of an image on the image plane I with respect to a moving distance of the vibration-reduction lens group during blur correction is K, in order to correct rotation blur of angle θ, the vibration-reduction lens group may be shifted in the direction orthogonal to the optical axis by (f·tan θ)/K.

In the zoom lens according to this example, in the wide-angle end state, since the vibration reduction coefficient K is 0.56 and the focal length is 16.48 (mm) (see Table 7 below), the moving distance of the vibration-reduction lens group for correcting the rotation blur of 0.81° is 0.42 (mm). Moreover, in the intermediate focal length state, since the vibration reduction coefficient K is 0.70 and the focal length is 25.21 (mm) (see Table 7 below), the moving distance of the vibration-reduction lens group for correcting the rotation blur of 0.66° is 0.41 (mm). Moreover, in the telephoto end state, since the vibration reduction coefficient K is 0.87 and the focal length is 33.95 (mm) (see Table 7 below), the moving distance of the vibration-reduction lens group for correcting the rotation blur of 0.57° is 0.39 (mm).

Table 6 below illustrates the specification values of the zoom lens according to Example 6.

TABLE 6

Example 6

[Overall Specification]

|  | W | M | T |
|---|---|---|---|
| f | 16.48 | 25.21 | 33.95 |
| FNO | 4.00 | 4.00 | 4.00 |
| ω | 54.0 | 39.8 | 31.8 |
| Y | 21.64 | 21.64 | 21.64 |
| TL | 152.197 | 148.076 | 154.253 |
| BF | 18.060 | 18.054 | 18.063 |

[Surface Data]

| Surface number | r | d | nd | νd |
|---|---|---|---|---|
|  | Object plane | ∞ |  |  |
| *1) | 89.63662 | 2.000 | 1.82080 | 42.7 |
| *2) | 19.03463 | 6.400 |  |  |
| 3) | 59.00594 | 2.000 | 1.90043 | 37.4 |
| 4) | 25.04291 | 12.879 |  |  |
| 5) | −34.42001 | 2.000 | 1.49782 | 82.6 |
| 6) | −220.10809 | 0.150 |  |  |
| 7) | 110.12188 | 5.234 | 2.00100 | 29.1 |
| 8) | −94.03704 | (Variable) |  |  |
| *9) | 34.70954 | 8.195 | 1.58313 |  |
| 10) | −22.32702 | 1.500 | 1.64013 | 58.3 |
| 11) | −56.97811 | 0.150 |  |  |
| 12) | 143.57014 | 1.500 | 1.51742 | 52.2 |
| 13) | 29.47978 | (Variable) |  |  |
| 14) | 25.69484 | 1.500 | 1.79504 | 28.7 |
| 15) | 18.31640 | 7.768 | 1.48749 | 70.3 |
| 16) | −37.27717 | 1.500 | 1.73708 | 28.4 |
| 17) | −69.75583 | (Variable) |  |  |
| 18) | (Diaphragm) | ∞ | 4.000 |  |
| 19) | −172.99604 | 1.500 | 1.74400 | 44.8 |
| 20) | 25.25276 | 3.145 | 1.80244 | 25.6 |
| *21) | 65.66381 | 1.000 |  |  |
| 22) | (FS) | ∞ | (Variable) |  |
| 23) | 28.13736 | 7.994 | 1.49782 | 82.6 |
| 24) | −39.84408 | 1.500 | 1.88202 | 37.2 |
| *25) | −55.75469 | 0.150 |  |  |
| 26) | 79.86144 | 1.500 | 1.90043 | 37.4 |
| 27) | 18.03173 | 8.303 | 1.49782 | 82.6 |
| 28) | 109.39627 | (Variable) |  |  |
| *29) | −135.00000 | 5.201 | 1.77250 | 49.5 |
| *30) | −43.87168 | (BF) |  |  |
|  | Image plane | ∞ |  |  |

[Lens Group Data]

|  | Starting surface | Focal distance |
|---|---|---|
| G1 | 1 | −25.31 |
| G2 | 9 | 38.11 |
| G3 | 18 | −70.00 |
| G4 | 23 | 97.42 |
| G5 | 29 | 82.09 |

[Aspheric Data]

Surface number: 1

κ = 0.00000E+00
A4 = −1.65798E+06

TABLE 6-continued

| Example 6 |
|---|
| A6 = 2.891887E−09 |
| A8 = −2.10545E−12 |
| A10 = 1.01969E−15 |
| Surface number: 2 |
| |
| κ = 1.52100E−01 |
| A4 = −3.98735E−06 |
| A6 = 1.20818E−08 |
| A8 = −2.50960E−11 |
| A10 = 4.32957E−14 |
| Surface number: 9 |
| |
| κ = 1.00000E+00 |
| A4 = −5.15908E−06 |
| A6 = 1.64281E−09 |
| A8 = 0.00000E+00 |
| A10 = 0.00000E+00 |
| Surface number: 21 |
| |
| κ = 1.89270E+00 |
| A4 = −3.35320E−07 |
| A6 = −5.17749E−08 |
| A8 = 8.91765E−10 |
| A10 = −5.73216E−12 |
| Surface number: 25 |
| |
| κ = 1.00000E+00 |
| A4 = 1.10647E−05 |
| A6 = 2.12638E−08 |
| A8 = −1.45298E−10 |
| A10 = 1.80548E−13 |
| Surface number: 29 |
| |
| κ = 1.00000E+00 |
| A4 = 9.54720E−06 |
| A6 = −3.28939E−08 |
| A8 = 9.31216E−11 |
| A10 = −9.94866E−14 |
| Surface number: 30 |
| |
| κ = 1.00000E+00 |
| A4 = 1.57892E−05 |
| A6 = −4.68421E−08 |
| A8 = 1.10504E−10 |
| A10 = −1.06766E−13 |

[Variable Distance Data]

| | W Infinity | M Infinity | T Infinity | W Close point | M Close point | T Close point |
|---|---|---|---|---|---|---|
| d0 | ∞ | ∞ | ∞ | 120.16 | 124.28 | 118.11 |
| β | — | — | — | −0.1141 | −0.1719 | −0.2434 |
| f | 16.48 | 25.21 | 33.95 | — | — | — |
| d8 | 26.758 | 8.756 | 0.500 | 31.009 | 13.089 | 5.283 |
| d13 | 7.532 | 7.532 | 7.532 | 3.280 | 3.198 | 2.749 |
| d17 | 2.000 | 5.495 | 7.430 | 2.000 | 5.495 | 7.430 |
| d22 | 6.930 | 3.434 | 1.500 | 6.930 | 3.434 | 1.500 |
| d28 | 3.850 | 17.737 | 32.161 | 3.850 | 17.737 | 32.161 |
| BF | 18.060 | 18.054 | 18.063 | 18.135 | 18.223 | 18.401 |

[Conditional Expression Correspondence Values]

(1) (−f3)/fw = 4.248
(2) |m34|/fw = 0.329
(3) f5/(−f1) = 3.244
(4) |m12|/fw = 1.593
(5) f5/f4 = 0.843
(6) f4/f2 = 2.556
(7) (r1 + r2)/(r1 − r2) = 1.963

Figure 22:
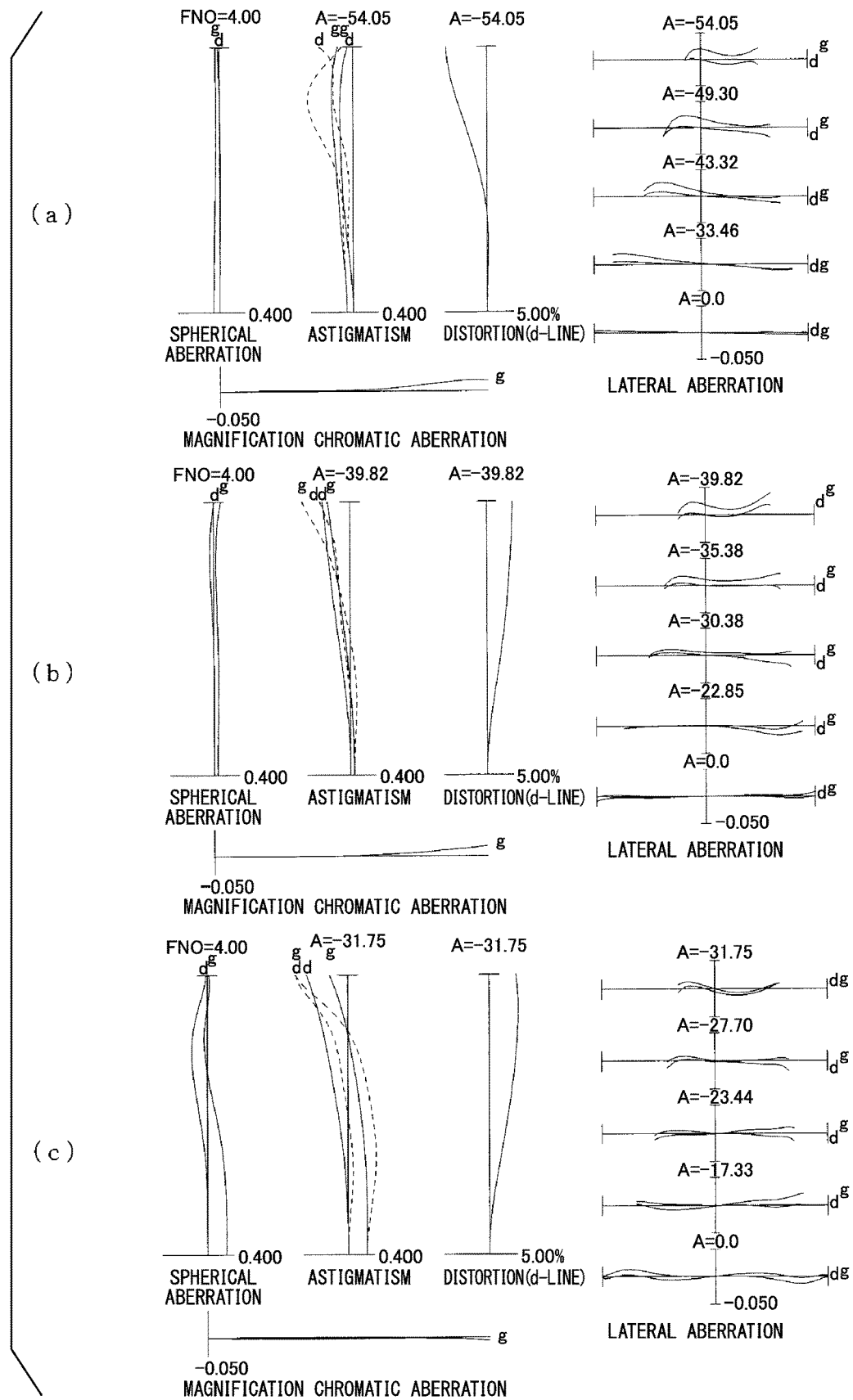
FIG. 22 shows graphs illustrating various aberrations of the zoom lens according to Example 6 upon focusing on an object at infinity, wherein parts (a), (b), and (c) are in the wide-angle end state, the intermediate focal length state, and the telephoto end state, respectively.

FIG. 22 shows graphs illustrating various aberrations of the zoom lens according to Example 6 upon focusing on an object at infinity, wherein parts (a), (b), and (d) are in the wide-angle end state, the intermediate focal length state, and the telephoto end state, respectively.

Figure 23:
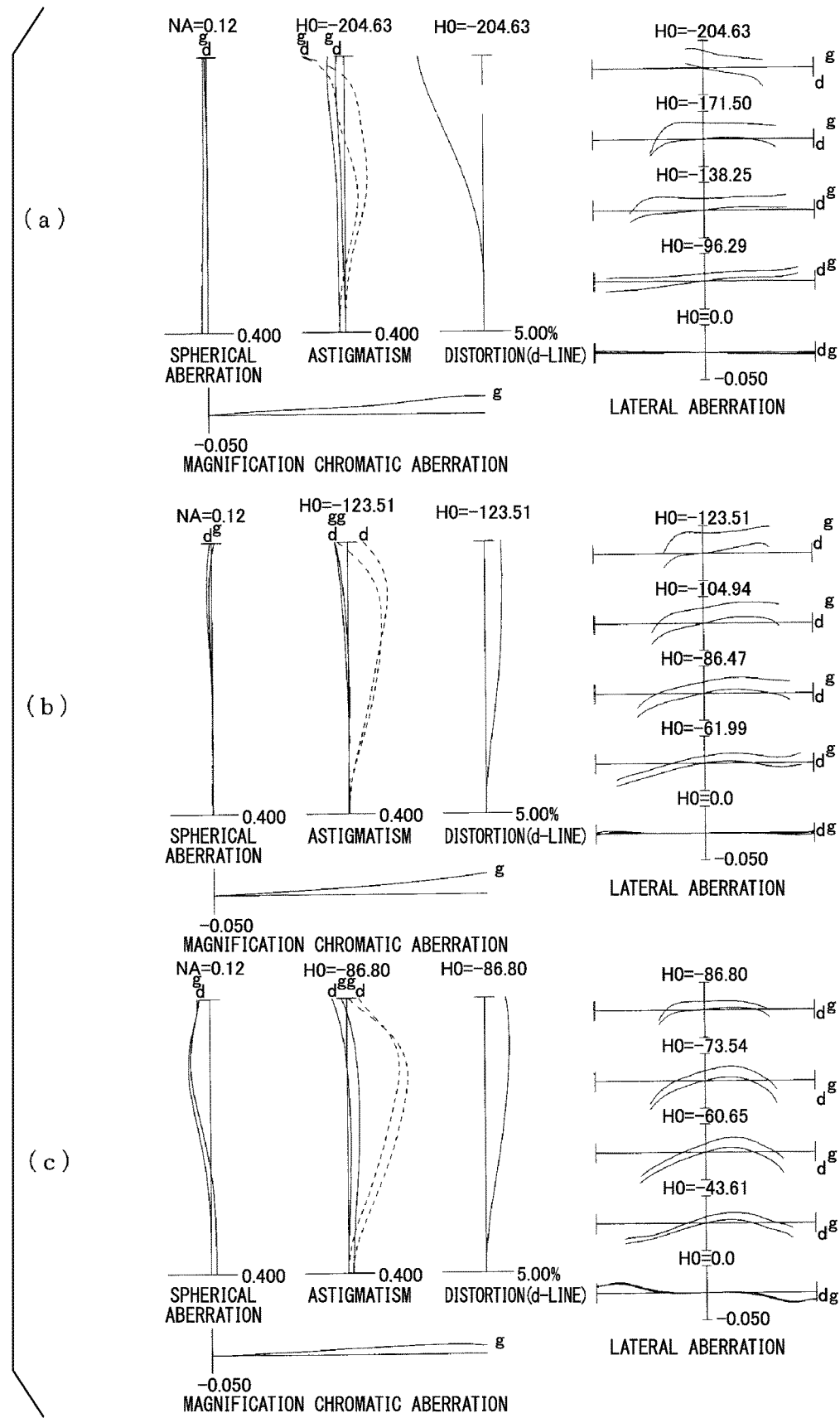
FIG. 23 shows graphs illustrating various aberrations of the zoom lens according to Example 6 upon focusing on an object at a close point, wherein parts (a), (b), and (c) are in the wide-angle end state, the intermediate focal length state, and the telephoto end state, respectively.

FIG. 23 shows graphs illustrating various aberrations of the zoom lens according to Example 6 upon focusing on an object at a close point, wherein parts (a), (b), and (d) are in the wide-angle end state, the intermediate focal length state, and the telephoto end state, respectively.

Figure 24:
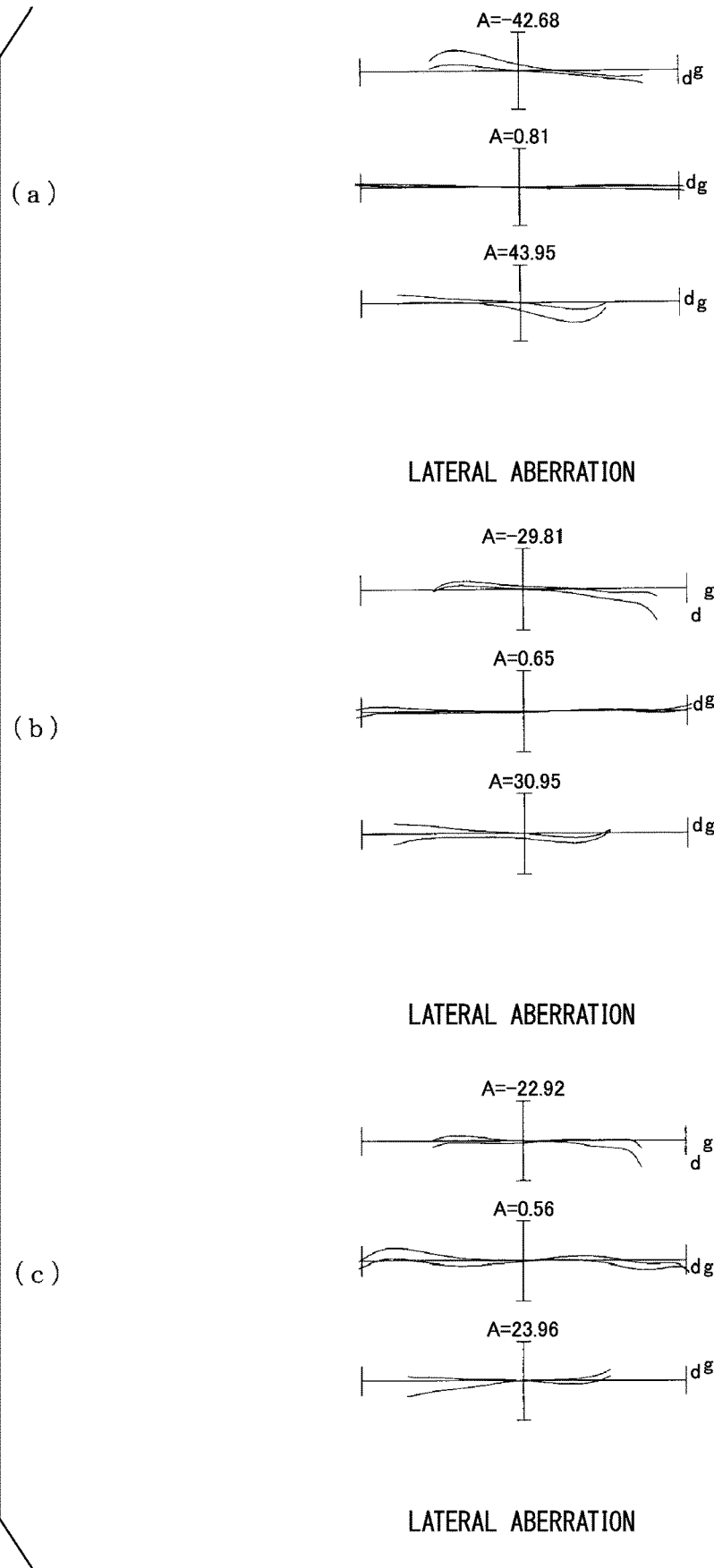
FIG. 24 shows graphs illustrating meridional lateral aberrations of the zoom lens according to Example 6 when vibration reduction is performed, wherein parts (a), (b), and (c) are in the wide-angle end state, the intermediate focal length state, and the telephoto end state, respectively.

FIG. 24 shows graphs illustrating meridional lateral aberrations of the zoom lens according to Example 6 when vibration reduction is performed, wherein parts (a), (b), and (d) are in the wide-angle end state, the intermediate focal length state, and the telephoto end state, respectively.

It can be understood from the respective aberration diagrams that the zoom lens according to Example 6 can satisfactorily correct various aberrations in states ranging from the wide-angle end state to the telephoto end state and has an excellent optical performance upon vibration reduction.

Example 7

Figure 25:
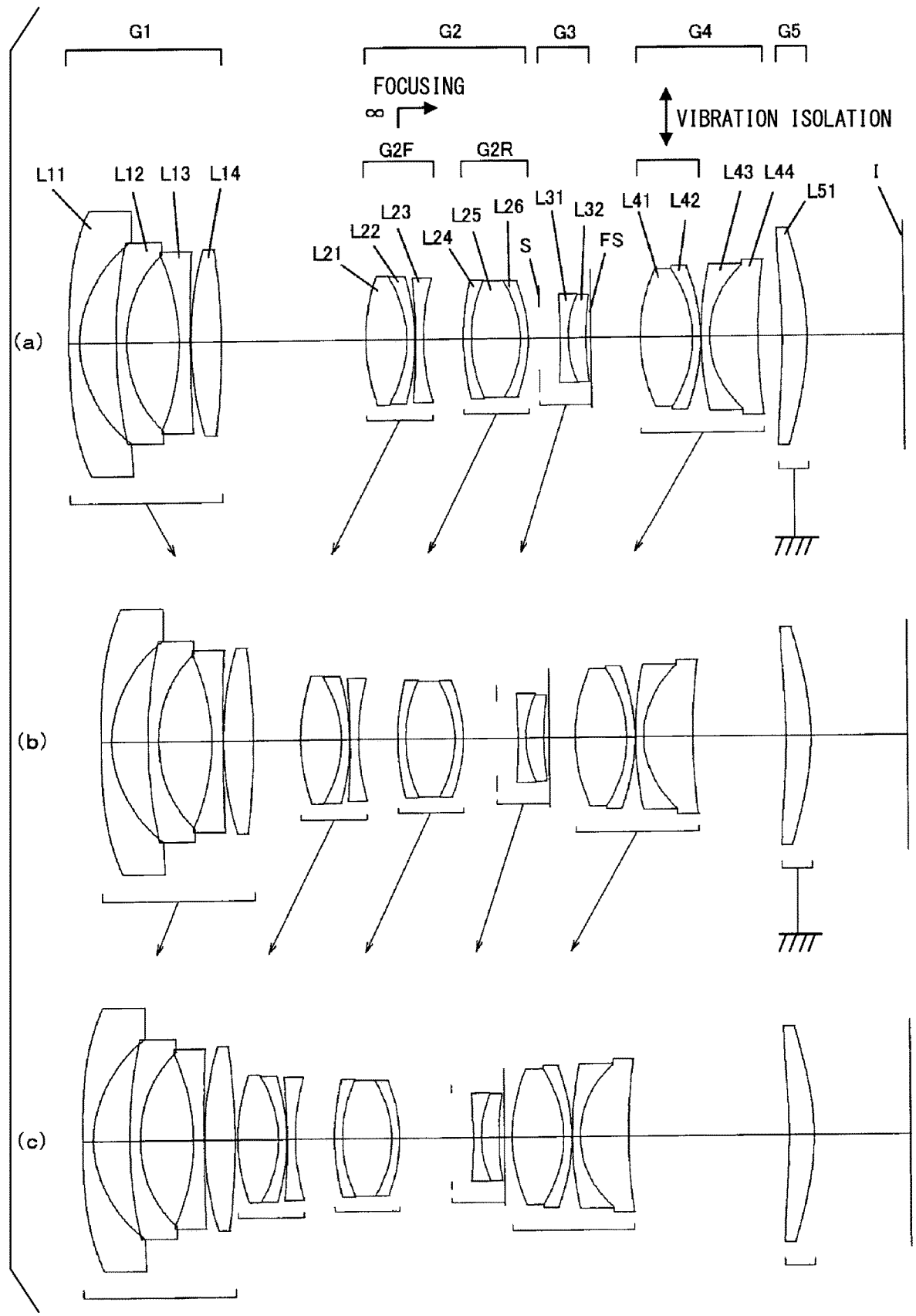
FIG. 25 is a cross-sectional view of a zoom lens according to Example 7, wherein parts (a), (b), and (c) are in a wide-angle end state, an intermediate focal length state, and a telephoto end state, respectively.

FIG. 25 is a cross-sectional view of a zoom lens according to Example 7, wherein parts (a), (b), and (d) are in a wide-angle end state, an intermediate focal length state, and a telephoto end state, respectively.

Arrows under each lens group in FIG. 25(a) indicate the moving directions of each lens group upon varying magnification from the wide-angle end state to the intermediate focal length state. Arrows under each lens group in FIG. 25(b) indicate the moving directions of each lens group upon varying magnification from the intermediate focal length state to the telephoto end state.

As illustrated in FIG. 25(a), a zoom lens according to this example is constituted by, in order from an object along an optical axis, a first lens group G1 having a negative refractive power, a second lens group G2 having a positive refractive power, a third lens group G3 having a negative refractive power, a fourth lens group G4 having a positive refractive power, and a fifth lens group G5 having a positive refractive power.

The first lens group G1 is constituted by, in order from the object along the optical axis, a negative meniscus lens L11 having a convex surface oriented toward the object side, a negative meniscus lens L12 having a convex surface oriented toward the object side, a biconcave lens L13, and a biconvex lens L14. The negative meniscus lens L11 is an aspherical lens of which the object-side lens surface and the image-side lens surface are aspherical surfaces. The negative meniscus lens L12 is an aspherical lens of which the image-side lens surface is an aspherical surface.

The second lens group G2 is constituted by, in order from the object along the optical axis, a second F lens group G2F having a positive refractive power and a second R lens group G2R having a positive refractive power.

The second F lens group G2F is constituted by, in order from the object along the optical axis, a cemented lens including a biconvex lens L21 and a negative meniscus lens L22 having a concave surface oriented toward the object side and a biconcave lens L23. The biconvex lens L21 is an aspherical lens of which the object-side lens surface is an aspherical surface.

The second R lens group G2R is constituted by, in order from the object along the optical axis, a cemented lens including a negative meniscus lens L24 having a convex surface oriented toward the object side, a biconvex lens L25, and a negative meniscus lens L26 having a concave surface oriented toward the object side. The negative meniscus lens L24 is an aspherical lens of which the object-side lens surface is an aspherical surface.

The third lens group G3 is constituted by, in order from the object along the optical axis, an aperture stop S, a cemented lens including a biconcave lens L31 and a positive meniscus lens L32 having a convex surface oriented toward the object side, and a flare-cut diaphragm FS.

The fourth lens group G4 is constituted by, in order from the object along the optical axis, a cemented lens including a biconvex lens L41 and a negative meniscus lens L42 having a concave surface oriented toward the object side and a cemented lens including a negative meniscus lens L43 having a convex surface oriented toward the object side and a positive meniscus lens L44 having a convex surface oriented toward the object side. The negative meniscus lens L42 is an aspherical lens of which the image-side lens surface is an aspherical surface.

The fifth lens group G5 is constituted by a positive meniscus lens L51 having a concave surface oriented toward the object side. The positive meniscus lens L51 is an aspherical lens of which the object-side lens surface and the image-side lens surface are aspherical surfaces.

An image sensor (not illustrated) configured as a CCD, CMOS, or the like is disposed at the image plane I.

In the zoom lens according to this example having the above-described configuration, when the zoom lens performs varying magnification from the wide-angle end state to the telephoto end state, the first lens group G1, the second lens group G2, the third lens group G3, and the fourth lens group G4 move along the optical axis in relation to the image plane I such that the distance between the first and second lens groups G1 and G2 decreases, the distance between the second and third lens groups G2 and G3 increases, the distance between the third and fourth lens groups G3 and G4 decreases, and the distance between the fourth and fifth lens groups G4 and G5 increases. Specifically, when the zoom lens performs varying magnification, the first lens group G1 is moved toward the image plane I and is then moved toward the object side, the second and fourth lens groups G2 and G4 are moved integrally toward the object side, the third lens group G3 is moved toward the object side, and the fifth lens group G5 is immovable in relation to the image plane I.

The aperture stop S is disposed between the second and third lens groups G2 and G3 and is moved together with the third lens group G3 upon varying magnification from the wide-angle end state to the telephoto end state.

Moreover, the zoom lens according to this example performs focusing from an object at infinity to an object at a close distance by moving the second F lens group G2F toward the image plane I.

Moreover, the zoom lens according to this example performs image plane correction (that is, vibration reduction) when image blur occurs by moving the cemented lens of the fourth lens group G4 including the biconvex lens L41 and the negative meniscus lens L42 having a concave surface oriented toward the object side in such a direction as to include a component in the direction orthogonal to the optical axis as a vibration-reduction lens group.

Here, when the focal length of an entire system of the zoom lens according to this example is f and the ratio of a moving distance of an image on the image plane I with respect to a moving distance of the vibration-reduction lens group during blur correction is K, in order to correct rotation blur of angle θ, the vibration-reduction lens group may be shifted in the direction orthogonal to the optical axis by (f·tan θ)/K.

In the zoom lens according to this example, in the wide-angle end state, since the vibration reduction coefficient K is 0.84 and the focal length is 16.48 (mm) (see Table 8 below), the moving distance of the vibration-reduction lens group for correcting the rotation blur of 0.81° is 0.28 (mm). Moreover, in the intermediate focal length state, since the vibration reduction coefficient K is 1.12 and the focal length is 25.21 (mm) (see Table 8 below), the moving distance of the vibration-reduction lens group for correcting the rotation blur of 0.66° is 0.26 (mm). Moreover, in the telephoto end state, since the vibration reduction coefficient K is 1.39 and the focal length is 33.94 (mm) (see Table 8 below), the moving distance of the vibration-reduction lens group for correcting the rotation blur of 0.57° is 0.24 (mm).

Table 7 below illustrates the specification values of the zoom lens according to Example 7.

TABLE 7

Example 7

[Overall Specification]

|  | W | M | T |
|---|---|---|---|
| f | 16.48 | 25.21 | 33.94 |
| FNO | 4.00 | 4.00 | 4.00 |
| ω | 54.1 | 40.0 | 31.8 |
| Y | 21.64 | 21.64 | 21.64 |
| TL | 156.155 | 150.831 | 154.903 |
| BF | 18.066 | 18.053 | 18.060 |

[Surface Data]

| Surface number | r | d | nd | νd |
|---|---|---|---|---|
|  | Object plane | ∞ |  |  |
| *1) | 193.58721 | 2.000 | 1.82080 | 42.7 |
| *2) | 20.02145 | 6.905 |  |  |
| 3) | 90.01817 | 2.000 | 1.90043 | 37.4 |
| *4) | 27.89307 | 9.933 |  |  |
| 5) | −41.38646 | 2.000 | 1.49782 | 82.6 |
| 6) | 388.04959 | 0.150 |  |  |
| 7) | 63.78120 | 5.582 | 2.00100 | 29.1 |
| 8) | −140.47475 | (Variable) |  |  |
| *9) | 34.11887 | 7.683 | 1.58313 | 59.4 |
| 10) | −23.19093 | 1.500 | 1.65844 | 50.8 |
| 11) | −43.34847 | 0.150 |  |  |
| 12) | −133.64479 | 1.500 | 1.51742 | 52.2 |
| 13) | 43.43678 | (Variable) |  |  |
| *14) | 43.27875 | 1.500 | 1.79504 | 28.7 |
| 15) | 26.75575 | 9.166 | 1.48749 | 70.3 |
| 16) | −21.47016 | 1.500 | 1.68893 | 31.2 |
| 17) | −29.83058 | (Variable) |  |  |
| 18) | (Diaphragm) | ∞ | 4.000 |  |
| 19) | −117.95737 | 1.500 | 1.74400 | 44.8 |
| 20) | 20.54277 | 3.285 | 1.80244 | 25.6 |
| 21) | 54.89929 | 1.000 |  |  |
| 22) | (FS) | ∞ | (Variable) |  |
| 23) | 32.72024 | 9.645 | 1.49782 | 82.6 |
| 24) | −23.86366 | 1.500 | 1.88202 | 37.2 |
| *25) | −34.86203 | 0.150 |  |  |
| 26) | 69.62430 | 1.500 | 1.90043 | 37.4 |
| 27) | 18.05008 | 9.020 | 1.49782 | 82.6 |
| 28) | 104.94552 | (Variable) |  |  |
| *29) | −135.00000 | 4.710 | 1.77250 | 49.5 |
| *30) | −48.92153 | (BF) |  |  |
|  | Image plane | ∞ |  |  |

[Lens Group Data]

|  | Starting surface | Focal distance |
|---|---|---|
| G1 | 1 | −23.31 |
| G2 | 9 | 35.87 |
| G3 | 18 | −54.84 |
| G4 | 23 | 83.18 |
| G5 | 29 | 97.01 |

[Aspheric Data]

Surface number: 1

$\kappa$ = 2.00000E+00
A4 = 7.90218E−06

TABLE 7-continued

| Example 7 |
|---|
| A6 = −3.67128E−09 |
| A8 = 1.11425E−12 |
| A10 = −3.22487E−16 |
| Surface number: 2 |

| κ = 9.06000E−02 |
|---|
| A4 = −1.10492E−05 |
| A6 = 4.18700E−08 |
| A8 = −2.82799E−11 |
| A10 = 8.48422E−14 |
| Surface number: 4 |

| κ = 1.00000E+00 |
|---|
| A4 = 2.06544E−05 |
| A6 = 1.14896E−09 |
| A8 = −9.32488E−11 |
| A10 = 1.06908E−13 |
| Surface number: 9 |

| κ = 1.00000E+00 |
|---|
| A4 = −5.99537E−06 |
| A6 = −8.64207E−09 |
| A8 = 0.00000E+00 |
| A10 = 0.00000E+00 |
| Surface number: 14 |

| κ = 1.00000E+00 |
|---|
| A4 = −5.24252E−06 |
| A6 = 3.78138E−09 |
| A8 = −1.26184E−11 |
| A10 = −1.01048E−14 |
| Surface number: 25 |

| κ = 1.00000E+00 |
|---|
| A4 = 5.70046E−06 |
| A6 = −3.54520E−09 |
| A8 = 1.13461E−11 |
| A10 = −1.29870E−13 |
| Surface number: 29 |

| κ = 1.00000E+00 |
|---|
| A4 = 2.14047E−06 |
| A6 = −2.58918E−09 |
| A8 = 4.54444E−11 |
| A10 = −7.04486E−14 |
| Surface number: 30 |

| κ = 1.00000E+00 |
|---|
| A4 = 5.01764E−06 |
| A6 = −9.55833E−09 |
| A8 = 5.69307E−11 |
| A10 = −7.79067E−14 |

[Variable Distance Data]

|  | W Infinity | M Infinity | T Infinity | W Close point | M Close point | T Close point |
|---|---|---|---|---|---|---|
| d0 | ∞ | ∞ | ∞ | 116.21 | 121.52 | 117.46 |
| β | — | — | — | −0.1183 | −0.1768 | −0.2470 |
| f | 16.48 | 25.21 | 33.94 | — | — | — |
| d8 | 27.092 | 8.876 | 0.500 | 30.852 | 12.622 | 4.589 |
| d13 | 7.348 | 7.348 | 7.348 | 3.588 | 3.603 | 3.259 |
| d17 | 2.000 | 6.293 | 9.740 | 2.000 | 6.293 | 9.740 |
| d22 | 9.240 | 4.947 | 1.500 | 9.240 | 4.947 | 1.500 |
| d28 | 4.528 | 17.433 | 29.874 | 4.528 | 17.433 | 29.874 |
| BF | 18.066 | 18.053 | 18.060 | 18.146 | 18.232 | 18.406 |

[Conditional Expression Correspondence Values]

(1) $(-f3)/fw = 3.329$
(2) $|m34|/fw = 0.470$
(3) $f5/(-f1) = 4.162$
(4) $|m12|/fw = 1.614$

TABLE 7-continued

Example 7

(5) f5/f4 = 1.166
(6) f4/f2 = 2.319
(7) (r1 + r2)/(r1 − r2) = 2.137

Figure 26:
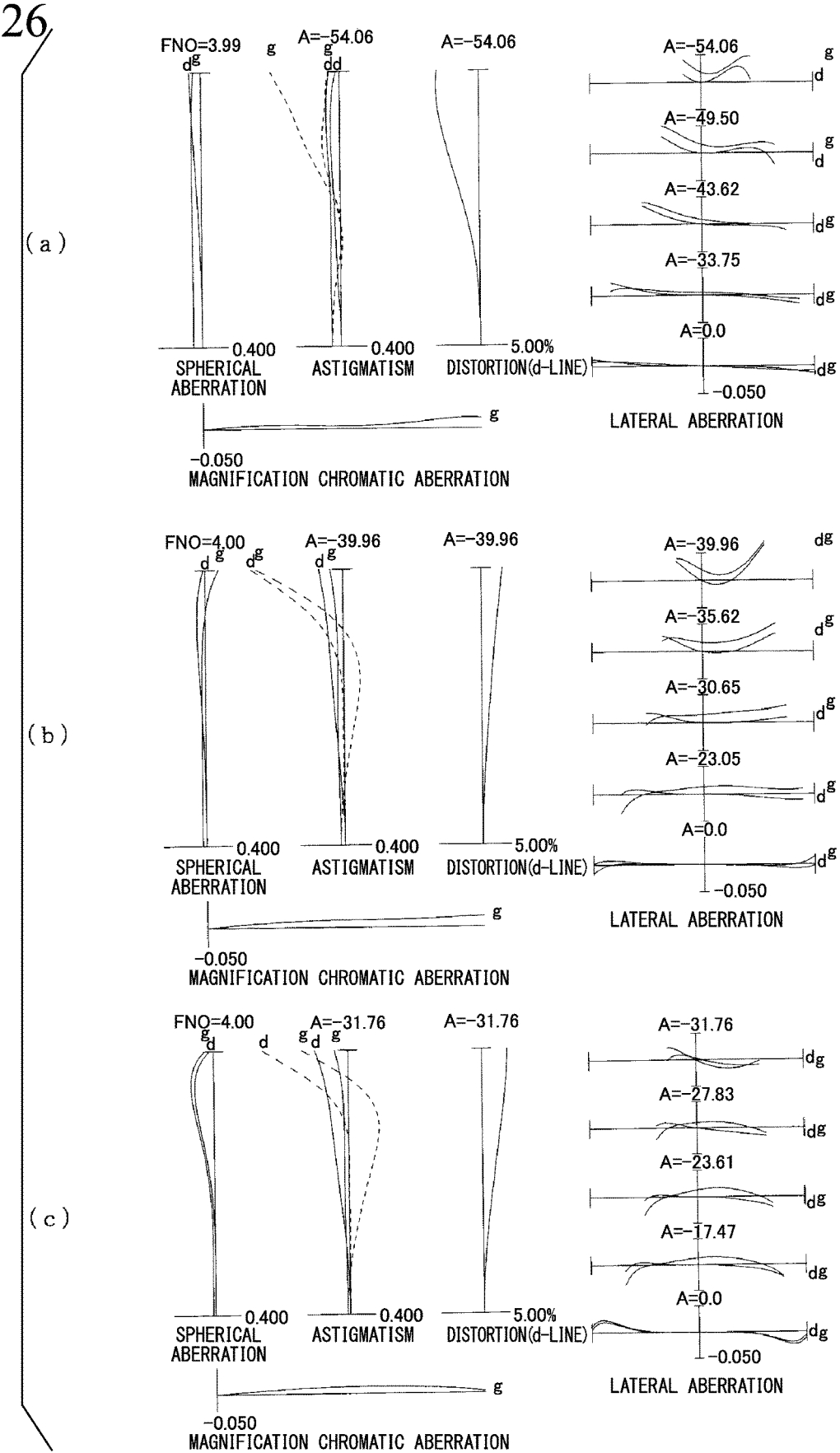
FIG. 26 shows graphs illustrating various aberrations of the zoom lens according to Example 7 upon focusing on an object at infinity, wherein parts (a), (b), and (c) are in the wide-angle end state, the intermediate focal length state, and the telephoto end state, respectively.

FIG. 26 shows graphs illustrating various aberrations of the zoom lens according to Example 7 upon focusing on an object at infinity, wherein parts (a), (b), and (d) are in the wide-angle end state, the intermediate focal length state, and the telephoto end state, respectively.

Figure 27:
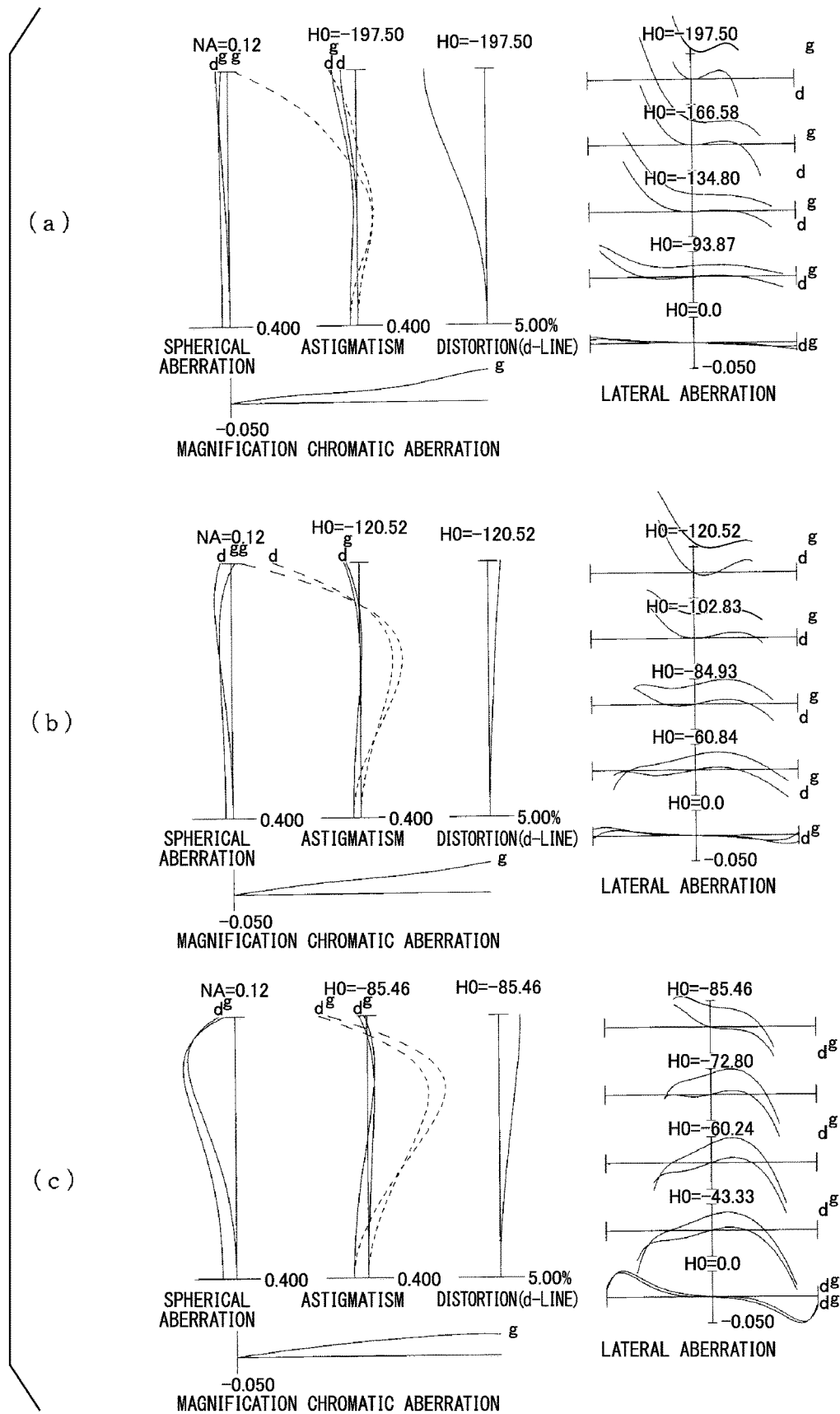
FIG. 27 shows graphs illustrating various aberrations of the zoom lens according to Example 7 upon focusing on an object at a close point, wherein parts (a), (b), and (c) are in the wide-angle end state, the intermediate focal length state, and the telephoto end state, respectively.

FIG. 27 shows graphs illustrating various aberrations of the zoom lens according to Example 7 upon focusing on an object at a close point, wherein parts (a), (b), and (d) are in the wide-angle end state, the intermediate focal length state, and the telephoto end state, respectively.

Figure 28:
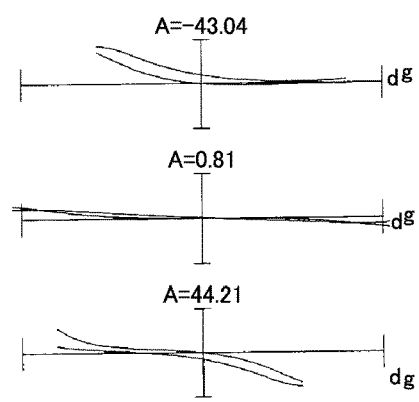
FIG. 28 shows graphs illustrating meridional lateral aberrations of the zoom lens according to Example 7 when vibration reduction is performed, wherein parts (a), (b), and (c) are in the wide-angle end state, the intermediate focal length state, and the telephoto end state, respectively.
Figure 28:
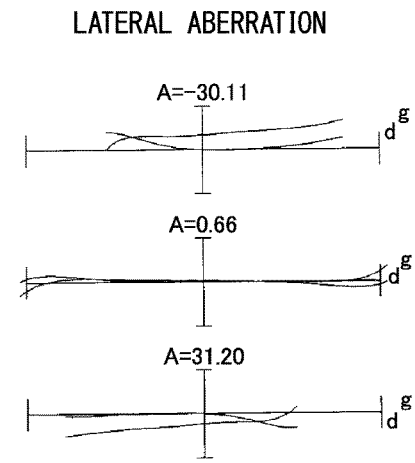
Figure 28:
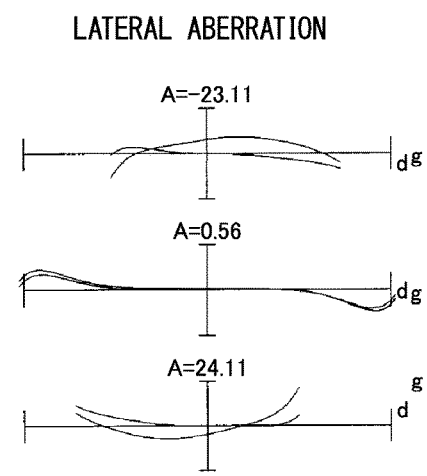

FIG. 28 shows graphs illustrating meridional lateral aberrations of the zoom lens according to Example 7 when vibration reduction is performed, wherein parts (a), (b), and (d) are in the wide-angle end state, the intermediate focal length state, and the telephoto end state, respectively.

It can be understood from the respective aberration diagrams that the zoom lens according to Example 7 can satisfactorily correct various aberrations in states ranging from the wide-angle end state to the telephoto end state and has an excellent optical performance upon vibration reduction.

Example 8

Figure 29:
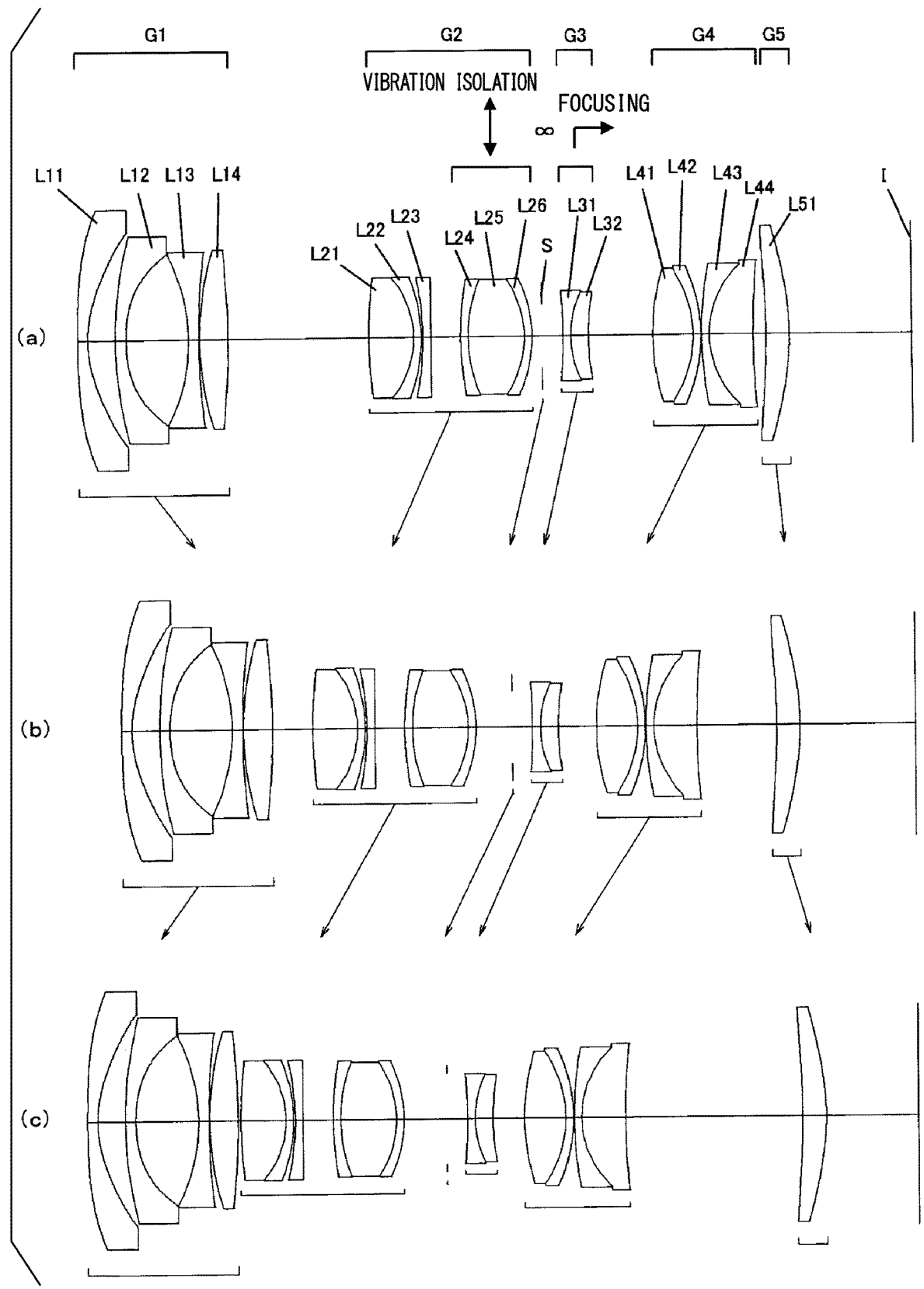
FIG. 29 is a cross-sectional view of a zoom lens according to Example 8, wherein parts (a), (b), and (c) are in a wide-angle end state, an intermediate focal length state, and a telephoto end state, respectively.

FIG. 29 is a cross-sectional view of a zoom lens according to Example 8, wherein parts (a), (b), and (d) are in a wide-angle end state, an intermediate focal length state, and a telephoto end state, respectively.

Arrows under each lens group in FIG. 29(a) indicate the moving directions of each lens group upon varying magnification from the wide-angle end state to the intermediate focal length state. Arrows under each lens group in FIG. 29(b) indicate the moving directions of each lens group upon varying magnification from the intermediate focal length state to the telephoto end state.

As illustrated in FIG. 29(a), a zoom lens according to this example is constituted by, in order from an object along an optical axis, a first lens group G1 having a negative refractive power, a second lens group G2 having a positive refractive power, an aperture stop S, a third lens group G3 having a negative refractive power, a fourth lens group G4 having a positive refractive power, and a fifth lens group G5 having a positive refractive power.

The first lens group G1 is constituted by, in order from the object along the optical axis, a negative meniscus lens L11 having a convex surface oriented toward the object side, a negative meniscus lens L12 having a convex surface oriented toward the object side, a biconcave lens L13, and a biconvex lens L14. The negative meniscus lens L11 is an aspherical lens of which the object-side lens surface and the image-side lens surface are aspherical surfaces. The negative meniscus lens L12 is an aspherical lens of which the image-side lens surface is an aspherical surface.

The second lens group G2 is constituted by, in order from the object along the optical axis, a cemented lens including a biconvex lens L21 and a negative meniscus lens L22 having a concave surface oriented toward the object side, a biconcave lens L23, and a cemented lens including a negative meniscus lens L24 having a convex surface oriented toward the object side, a biconvex lens L25, and a negative meniscus lens L26 having a concave surface oriented toward the object side. The biconvex lens L21 is an aspherical lens of which the object-side lens surface is an aspherical surface. The negative meniscus lens L24 is an aspherical lens of which the object-side lens surface is an aspherical surface.

The third lens group G3 is constituted by a cemented lens including a biconcave lens L31 and a positive meniscus lens L32 having a convex surface oriented toward the object side.

The fourth lens group G4 is constituted by, in order from the object along the optical axis, a cemented lens including a biconvex lens L41 and a negative meniscus lens L42 having a concave surface oriented toward the object side and a cemented lens including a negative meniscus lens L43 having a convex surface oriented toward the object side and a positive meniscus lens L44 having a convex surface oriented toward the object side. The negative meniscus lens L42 is an aspherical lens of which the image-side lens surface is an aspherical surface.

The fifth lens group G5 is constituted by a positive meniscus lens L51 having a concave surface oriented toward the object side. The positive meniscus lens L51 is an aspherical lens of which the object-side lens surface and the image-side lens surface are aspherical surfaces.

An image sensor (not illustrated) configured as a CCD, CMOS, or the like is disposed at the image plane I.

In the zoom lens according to this example having the above-described configuration, when the zoom lens performs varying magnification from the wide-angle end state to the telephoto end state, the first lens group G1, the second lens group G2, the third lens group G3, the fourth lens group G4, and the fifth lens group G5 move along the optical axis in relation to the image plane I such that the distance between the first and second lens groups G1 and G2 decreases, the distance between the second and third lens groups G2 and G3 increases, the distance between the third and fourth lens groups G3 and G4 decreases, and the distance between the fourth and fifth lens groups G4 and G5 increases. Specifically, when the zoom lens performs varying magnification, the first lens group G1 is moved toward the image plane I and is then moved toward the object side, the second and fourth lens groups G2 and G4 are moved integrally toward the object side, the third lens group G3 is moved toward the object side, and the fifth lens group G5 is moved toward the image plane I.

The aperture stop S is disposed between the second and third lens groups G2 and G3 and is moved integrally with the third lens group G3 upon varying magnification from the wide-angle end state to the telephoto end state.

Moreover, the zoom lens according to this example performs focusing from an object at infinity to an object at a close distance by moving the third lens group G3 toward the image plane I.

Moreover, the zoom lens according to this example performs image plane correction (that is, vibration reduction)

when image blur occurs by moving the cemented lens of the second lens group G2 including the negative meniscus lens L24 having a convex surface oriented toward the object side, the biconvex lens L25, and the negative meniscus lens L26 having a concave surface oriented toward the object side in such a direction as to include a component in the direction orthogonal to the optical axis as a vibration-reduction lens group.

Here, when the focal length of an entire system of the zoom lens according to this example is f and the ratio of a moving distance of an image on the image plane I with respect to a moving distance of the vibration-reduction lens group during blur correction is K, in order to correct rotation blur of angle θ, the vibration-reduction lens group may be shifted in the direction orthogonal to the optical axis by (f·tan θ)/K.

In the zoom lens according to this example, in the wide-angle end state, since the vibration reduction coefficient K is 1.06 and the focal length is 16.48 (mm) (see Table 9 below), the moving distance of the vibration-reduction lens group for correcting the rotation blur of 0.81° is 0.22 (mm). Moreover, in the intermediate focal length state, since the vibration reduction coefficient K is 1.32 and the focal length is 25.21 (mm) (see Table 9 below), the moving distance of the vibration-reduction lens group for correcting the rotation blur of 0.66° is 0.22 (mm). Moreover, in the telephoto end state, since the vibration reduction coefficient K is 1.64 and the focal length is 33.95 (mm) (see Table 9 below), the moving distance of the vibration-reduction lens group for correcting the rotation blur of 0.57° is 0.20 (mm).

Table 8 below illustrates the specification values of the zoom lens according to Example 8.

TABLE 8

Example 8

[Overall Specification]

| | W | M | T |
|---|---|---|---|
| f | 16.48 | 25.21 | 33.95 |
| FNO | 4.00 | 4.00 | 4.00 |
| ω | 54.0 | 39.4 | 31.8 |
| Y | 21.64 | 21.64 | 21.64 |
| TL | 162.365 | 154.491 | 161.772 |
| BF | 23.901 | 22.523 | 18.067 |

[Surface Data]

| Surface number | r | d | nd | νd |
|---|---|---|---|---|
| | Object plane | ∞ | | |
| *1) | 206.62948 | 2.000 | 1.82080 | 42.7 |
| *2) | 22.78595 | 5.394 | | |
| 3) | 79.60930 | 2.000 | 1.90043 | 37.4 |
| *4) | 28.62293 | 12.227 | | |
| 5) | −36.79633 | 2.000 | 1.49782 | 82.6 |
| 6) | 138.93269 | 0.150 | | |
| 7) | 59.13309 | 5.614 | 2.00100 | 29.1 |
| 8) | −157.09491 | (Variable) | | |
| *9) | 78.52593 | 8.740 | 1.58313 | 59.4 |
| 10) | −18.33622 | 1.500 | 1.65844 | 50.8 |
| 11) | −31.62205 | 0.320 | | |
| 12) | −53.95141 | 1.500 | 1.51742 | 52.2 |
| 13) | 1642.72200 | 5.830 | | |
| *14) | 56.55132 | 1.500 | 1.79504 | 28.7 |
| 15) | 30.04155 | 10.867 | 1.48749 | 70.3 |
| 16) | −20.18962 | 1.500 | 1.68893 | 31.2 |
| 17) | −26.35355 | (Variable) | | |
| 18) | (Diaphragm) | ∞ | (Variable) | |
| 19) | −107.45547 | 1.500 | 1.74400 | 44.8 |
| 20) | 19.22984 | 3.482 | 1.80244 | 25.6 |
| 21) | 51.40293 | (Variable) | | |
| 22) | 43.71137 | 7.983 | 1.49782 | 82.6 |
| 23) | −23.27350 | 1.500 | 1.88202 | 37.2 |
| *24) | −31.21137 | 0.150 | | |
| 25) | 71.81959 | 1.500 | 1.90043 | 37.4 |
| 26) | 18.76437 | 8.473 | 1.49782 | 82.6 |
| 27) | 145.88740 | (Variable) | | |
| *28) | −135.00000 | 4.550 | 1.77250 | 49.5 |
| *29) | −52.15640 | (BF) | | |
| | Image plane | ∞ | | |

[Lens Group Data]

| | Starting surface | Focal distance |
|---|---|---|
| G1 | 1 | −24.38 |
| G2 | 9 | 34.96 |
| G3 | 19 | −50.79 |

TABLE 8-continued

Example 8

| | | |
|---|---|---|
| G4 | 22 | 84.06 |
| G5 | 28 | 107.45 |

[Aspheric Data]

Surface number: 1

$\kappa$ = 0.00000E+00
A4 = 7.49847E−06
A6 = −4.72101E−09
A8 = 1.34426E−12
A10 = 7.77327E−16

Surface number: 2

$\kappa$ = 1.11000E−02
A4 = −2.39129E−05
A6 = 4.34446E−08
A8 = −4.32137E−11
A10 = 3.44930E−14

Surface number: 4

$\kappa$ = 1.00000E+00
A4 = 3.53137E−05
A6 = 6.78430E−09
A8 = −4.22471E−11
A10 = 4.95919E−14

Surface number: 9

$\kappa$ = 1.00000E+00
A4 = −4.89433E−06
A6 = −9.35308E−09
A8 = 0.00000E+00
A10 = 0.00000E+00

Surface number: 14

$\kappa$ = 1.00000E+00
A4 = −6.54457E−06
A6 = 5.07738E−09
A8 = −5.16352E−11
A10 = 2.09233E−13

Surface number: 24

$\kappa$ = 1.00000E+00
A4 = 2.08758E−06
A6 = 1.15759E−08
A8 = −7.29250E−11
A10 = 1.18188E−13

Surface number: 28

$\kappa$ = 1.00000E+00
A4 = 2.27203E−06
A6 = 1.20614E−09
A8 = 2.01555E−11
A10 = −4.02390E−14

Surface number: 29

$\kappa$ = 1.00000E+00
A4 = 6.10900E−06
A6 = −4.88513E−09
A8 = 2.18415E−11
A10 = −3.91619E−14

[Variable Distance Data]

| | W Infinity | M Infinity | T Infinity | W Close point | M Close point | T Close point |
|---|---|---|---|---|---|---|
| d0 | ∞ | ∞ | ∞ | 110.00 | 117.87 | 110.60 |
| β | — | — | — | −0.1310 | −0.1947 | −0.2863 |
| f | 16.48 | 25.21 | 33.95 | — | — | — |
| d8 | 27.288 | 7.805 | 0.500 | 27.288 | 7.805 | 0.500 |
| d17 | 2.000 | 7.042 | 8.304 | 2.000 | 7.042 | 8.304 |
| d18 | 4.000 | 4.000 | 4.000 | 5.664 | 7.386 | 9.288 |
| d21 | 12.429 | 7.386 | 6.125 | 10.765 | 4.000 | 0.837 |
| d27 | 2.468 | 15.455 | 34.496 | 2.468 | 15.455 | 34.496 |
| BF | 23.901 | 22.523 | 18.067 | 23.999 | 22.740 | 18.534 |

TABLE 8-continued

Example 8

[Conditional Expression Correspondence Values]

(1) $(-f3)/fw = 3.082$
(2) $|m34|/fw = 0.383$
(3) $f5/(-f1) = 4.408$
(4) $|m12|/fw = 1.626$
(5) $f5/f4 = 1.278$
(6) $f4/f2 = 2.405$
(7) $(r1 + r2)/(r1 - r2) = 2.259$

Figure 30:
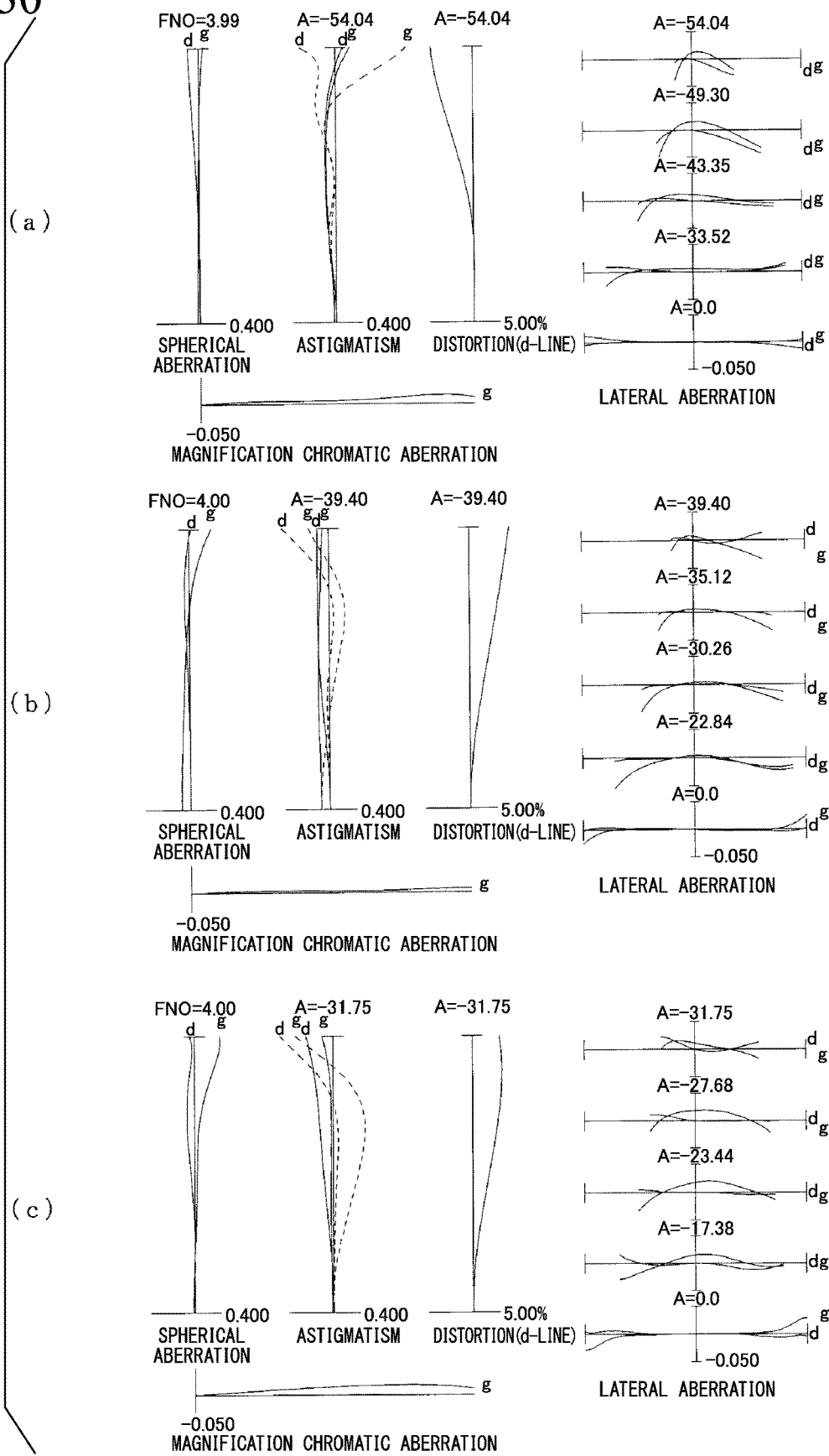
FIG. 30 shows graphs illustrating various aberrations of the zoom lens according to Example 8 upon focusing on an object at infinity, wherein parts (a), (b), and (c) are in the wide-angle end state, the intermediate focal length state, and the telephoto end state, respectively.

FIG. 30 shows graphs illustrating various aberrations of the zoom lens according to Example 8 upon focusing on an object at infinity in, wherein parts (a), (b), and (d) are the wide-angle end state, the intermediate focal length state, and the telephoto end state, respectively.

Figure 31:
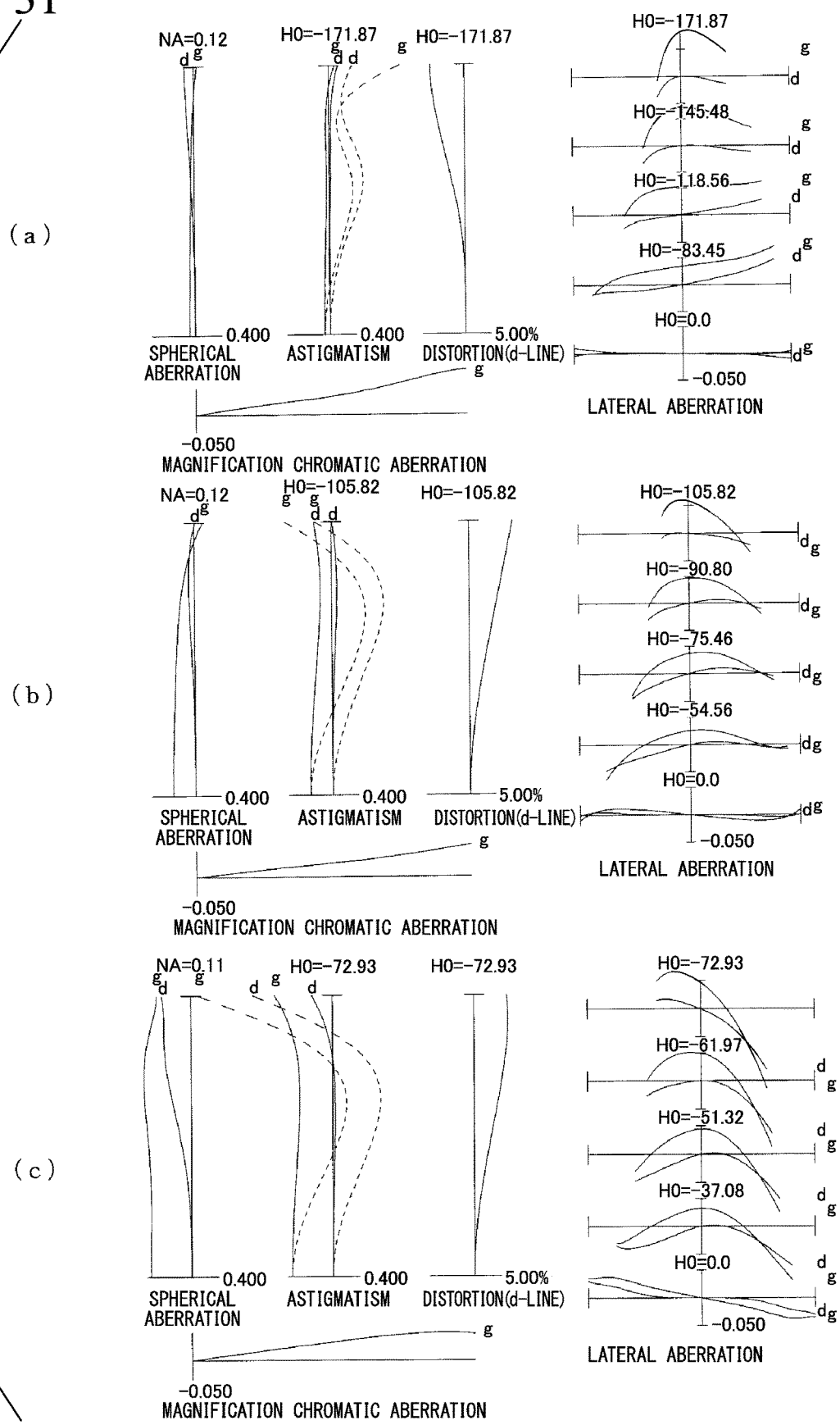
FIG. 31 shows graphs illustrating various aberrations of the zoom lens according to Example 8 upon focusing on an object at a close point, wherein parts (a), (b), and (c) are in the wide-angle end state, the intermediate focal length state, and the telephoto end state, respectively.

FIG. 31 shows graphs illustrating various aberrations of the zoom lens according to Example 8 upon focusing on an object at a close point, wherein parts (a), (b), and (d) are in the wide-angle end state, the intermediate focal length state, and the telephoto end state, respectively.

Figure 32:
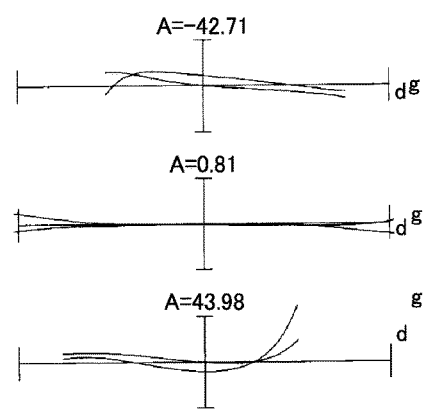
FIG. 32 shows graphs illustrating meridional lateral aberrations of the zoom lens according to Example 8 when vibration reduction is performed, wherein parts (a), (b), and (c) are in the wide-angle end state, the intermediate focal length state, and the telephoto end state, respectively.
Figure 32:
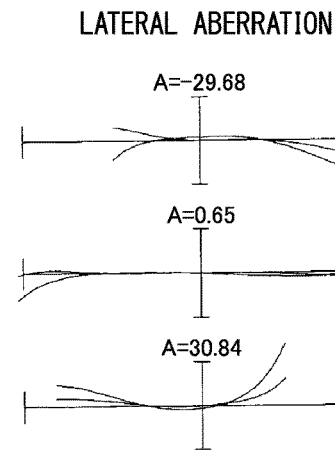
Figure 32:
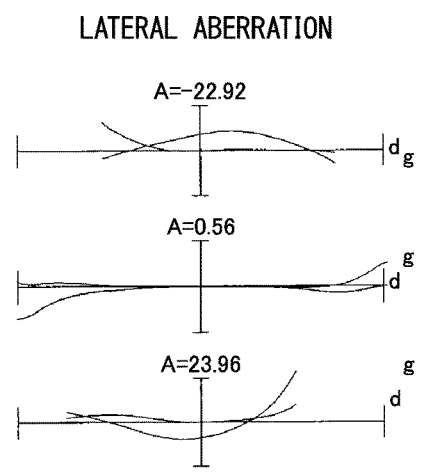

FIG. 32 shows graphs illustrating meridional lateral aberrations of the zoom lens according to Example 8 when vibration reduction is performed, wherein parts (a), (b), and (d) are in the wide-angle end state, the intermediate focal length state, and the telephoto end state, respectively.

It can be understood from the respective aberration diagrams that the zoom lens according to Example 8 can satisfactorily correct various aberrations in states ranging from the wide-angle end state to the telephoto end state and has an excellent optical performance upon vibration reduction.

Example 9

Figure 33:
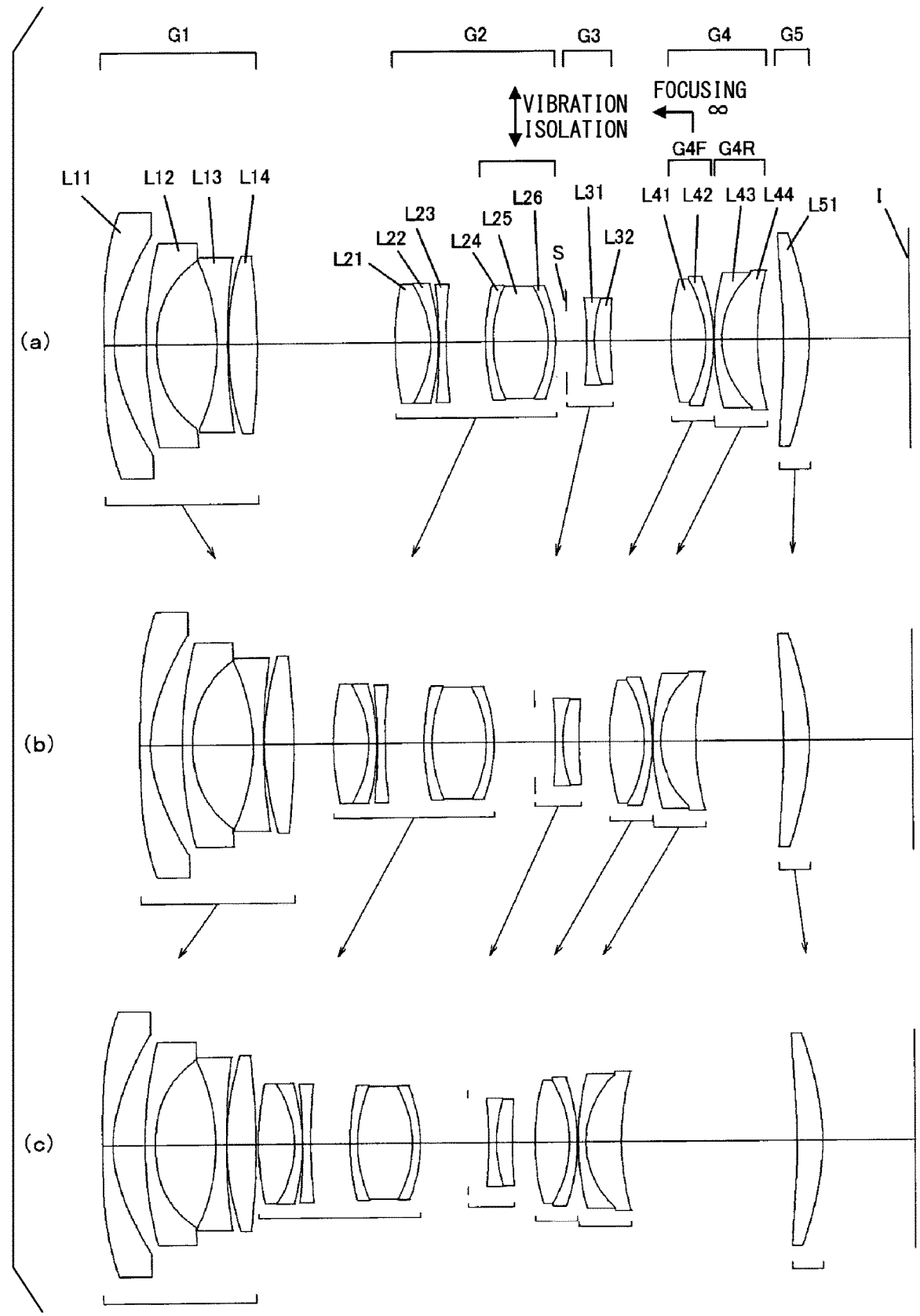
FIG. 33 is a cross-sectional view of a zoom lens according to Example 9, wherein parts (a), (b), and (c) are in a wide-angle end state, an intermediate focal length state, and a telephoto end state, respectively.

FIG. 33 is a cross-sectional view of a zoom lens according to Example 9, wherein parts (a), (b), and (d) are in a wide-angle end state, an intermediate focal length state, and a telephoto end state, respectively.

Arrows under each lens group in FIG. 33(a) indicate the moving directions of each lens group upon varying magnification from the wide-angle end state to the intermediate focal length state. Arrows under each lens group in FIG. 33(b) indicate the moving directions of each lens group upon varying magnification from the intermediate focal length state to the telephoto end state.

As illustrated in FIG. 33(a), a zoom lens according to this example is constituted by, in order from an object along an optical axis, a first lens group G1 having a negative refractive power, a second lens group G2 having a positive refractive power, a third lens group G3 having a negative refractive power, a fourth lens group G4 having a positive refractive power, and a fifth lens group G5 having a positive refractive power.

The first lens group G1 is constituted by, in order from the object along the optical axis, a negative meniscus lens L11 having a convex surface oriented toward the object side, a negative meniscus lens L12 having a convex surface oriented toward the object side, a biconcave lens L13, and a biconvex lens L14. The negative meniscus lens L11 is an aspherical lens of which the object-side lens surface and the image-side lens surface are aspherical surfaces. The negative meniscus lens L12 is an aspherical lens of which the image-side lens surface is an aspherical surface.

The second lens group G2 is constituted by, in order from the object along the optical axis, a cemented lens including a biconvex lens L21 and a negative meniscus lens L22 having a concave surface oriented toward the object side, a biconcave lens L23, and a cemented lens including a negative meniscus lens L24 having a convex surface oriented toward the object side, a biconvex lens L25, and a negative meniscus lens L26 having a concave surface oriented toward the object side. The biconvex lens L21 is an aspherical lens of which the object-side lens surface is an aspherical surface. The negative meniscus lens L24 is an aspherical lens of which the object-side lens surface is an aspherical surface.

The third lens group G3 is constituted by, in order from the object along the optical axis, an aperture stop S and a cemented lens including a biconcave lens L31 and a positive meniscus lens L32 having a convex surface oriented toward the object side.

The fourth lens group G4 is constituted by, in order from the object along the optical axis, a fourth F lens group G4F having a positive refractive power and a fourth R lens group G4R having a negative refractive power.

The fourth F lens group G4F is constituted by a cemented lens including a biconvex lens L41 and a negative meniscus lens L42 having a concave surface oriented toward the object side. The negative meniscus lens L42 is an aspherical lens of which the image-side lens surface is an aspherical surface.

The fourth R lens group G4R is constituted by a cemented lens including a negative meniscus lens L43 having a convex surface oriented toward the object side and a positive meniscus lens L44 having a convex surface oriented toward the object side.

The fifth lens group G5 is constituted by a positive meniscus lens L51 having a concave surface oriented toward the object side. The positive meniscus lens L51 is an aspherical lens of which the object-side lens surface and the image-side lens surface are aspherical surfaces.

An image sensor (not illustrated) configured as a CCD, CMOS, or the like is disposed at the image plane I.

In the zoom lens according to this example having the above-described configuration, when the zoom lens performs varying magnification from the wide-angle end state to the telephoto end state, the first lens group G1, the second lens group G2, the third lens group G3, the fourth lens group G4, and the fifth lens group G5 move along the optical axis in relation to the image plane I such that the distance between the first and second lens groups G1 and G2 decreases, the distance between the second and third lens groups G2 and G3 increases, the distance between the third and fourth lens groups G3 and G4 decreases, and the distance between the fourth and fifth lens groups G4 and G5 increases. Specifically, when the zoom lens performs varying magnification, the first lens group G1 is moved toward the image plane I and is then moved toward the object side, the second and fourth lens groups G2 and G4 are moved integrally toward the object side, the third lens group G3 is moved toward the object side, and the fifth lens group G5 is moved toward the object side and is then moved toward the image plane I.

The aperture stop S is disposed between the second and third lens groups G2 and G3 and is moved together with the third lens group G3 upon varying magnification from the wide-angle end state to the telephoto end state.

Moreover, the zoom lens according to this example performs focusing from an object at infinity to an object at a close distance by moving the fourth F lens group G4F toward the object side.

Moreover, the zoom lens according to this example performs image plane correction (that is, vibration reduction) when image blur occurs by moving the cemented lens of the second lens group G2 including the negative meniscus lens L24 having a convex surface oriented toward the object side, the biconvex lens L25, and the negative meniscus lens L26 having a concave surface oriented toward the object side in such a direction as to include a component in the direction orthogonal to the optical axis as a vibration-reduction lens group.

Here, when the focal length of an entire system of the zoom lens according to this example is f and the ratio of a moving distance of an image on the image plane I with respect to a moving distance of the vibration-reduction lens group during blur correction is K, in order to correct rotation blur of angle θ, the vibration-reduction lens group may be shifted in the direction orthogonal to the optical axis by (f·tan θ)/K.

In the zoom lens according to this example, in the wide-angle end state, since the vibration reduction coefficient K is 1.01 and the focal length is 16.48 (mm) (see Table below), the moving distance of the vibration-reduction lens group for correcting the rotation blur of 0.81° is 0.23 (mm). Moreover, in the intermediate focal length state, since the vibration reduction coefficient K is 1.28 and the focal length is 25.22 (mm) (see Table 10 below), the moving distance of the vibration-reduction lens group for correcting the rotation blur of 0.66° is 0.23 (mm). Moreover, in the telephoto end state, since the vibration reduction coefficient K is 1.58 and the focal length is 33.95 (mm) (see Table 10 below), the moving distance of the vibration-reduction lens group for correcting the rotation blur of 0.57° is 0.21 (mm).

Table 9 below illustrates the specification values of the zoom lens according to Example 9.

TABLE 9

Example 9

[Overall Specification]

|   | W | M | T |
|---|---|---|---|
| f | 16.48 | 25.22 | 33.95 |
| FNO | 4.00 | 4.00 | 4.00 |
| ω | 54.0 | 39.5 | 31.8 |
| Y | 21.64 | 21.64 | 21.64 |
| TL | 157.040 | 150.577 | 158.386 |
| BF | 19.612 | 20.204 | 18.091 |

[Surface Data]

| Surface number | r | d | nd | νd |
|---|---|---|---|---|
|  | Object plane | ∞ |  |  |
| *1) | 748.12416 | 2.000 | 1.82080 | 42.7 |
| *2) | 24.27981 | 6.249 |  |  |
| 3) | 82.72688 | 2.000 | 1.90043 | 37.4 |
| *4) | 29.19843 | 11.941 |  |  |
| 5) | −38.35396 | 2.000 | 1.49782 | 82.6 |
| 6) | 123.88139 | 0.150 |  |  |
| 7) | 58.33566 | 5.662 | 2.00100 | 29.1 |
| 8) | −157.62198 | (Variable) |  |  |
| *9) | 53.58324 | 6.922 | 1.58313 | 59.4 |
| 10) | −22.47903 | 1.500 | 1.65454 | 55.0 |
| 11) | −43.36840 | 0.150 |  |  |
| 12) | −111.21206 | 1.500 | 1.51742 | 52.2 |
| 13) | 108.52980 | 7.626 |  |  |
| *14) | 45.76109 | 1.500 | 1.82227 | 25.8 |
| 15) | 27.94575 | 10.712 | 1.48749 | 70.3 |
| 16) | −23.08227 | 1.500 | 1.68893 | 31.2 |
| 17) | −31.09319 | (Variable) |  |  |
| 18) | (Diaphragm) | ∞ | 4.000 |  |
| 19) | −95.69123 | 1.500 | 1.74400 | 44.8 |
| 20) | 28.24642 | 3.135 | 1.80244 | 25.6 |
| 21) | 114.16154 | (Variable) |  |  |
| 22) | 45.66871 | 6.767 | 1.49782 | 82.6 |
| 23) | −24.10121 | 1.500 | 1.88202 | 37.2 |
| *24) | −36.88706 | (Variable) |  |  |
| 25) | 51.43628 | 1.500 | 1.90043 | 37.4 |
| 26) | 17.97428 | 6.908 | 1.49782 | 82.6 |
| 27) | 53.78862 | (Variable) |  |  |

TABLE 9-continued

| | Example 9 | | | |
|---|---|---|---|---|
| *28) | −135.00000 | 4.998 | 1.77250 | 49.5 |
| *29) | −46.24500 | (BF) | | |
| | Image plane | ∞ | | |

[Lens Group Data]

| | Starting surface | Focal distance |
|---|---|---|
| G1 | 1 | −24.13 |
| G2 | 9 | 36.72 |
| G3 | 18 | −77.89 |
| G4 | 22 | 151.54 |
| G5 | 28 | 88.87 |

[Aspheric Data]

Surface number: 1

$\kappa$ = 0.00000E+00
A4 = 9.52593E−06
A6 = −6.95106E−09
A8 = 1.81770E−12
A10 = 4.34677E−16

Surface number: 2

$\kappa$ = 1.04000E−01
A4 = −2.28424E−05
A6 = 3.85220E−08
A8 = −4.02855E−11
A10 = 2.50646E−14

Surface number: 4

$\kappa$ = 1.00000E+00
A4 = 3.45313E−05
A6 = 2.43926E−08
A8 = −5.26585E−11
A10 = −1.44105E−14

Surface number: 9

$\kappa$ = 1.00000E+00
A4 = −3.39462E−06
A6 = −4.52751E−09
A8 = 0.00000E+00
A10 = 0.00000E+00

Surface number: 14

$\kappa$ = 1.00000E+00
A4 = −3.99540E−06
A6 = 6.90128E−09
A8 = −7.15162E−11
A10 = 2.30252E−13

Surface number: 24

$\kappa$ = 1.00000E+00
A4 = 2.95224E−06
A6 = 6.31531E−09
A8 = −6.95778E−11
A10 = 9.58472E−14

Surface number: 28

$\kappa$ = 1.00000E+00
A4 = 3.07452E−06
A6 = 6.73524E−10
A8 = 1.35472E−11
A10 = −3.33968E−14

Surface number: 29

$\kappa$ = 1.00000E+00
A4 = 7.09095E−06
A6 = −3.53806E−09
A8 = 1.19967E−11
A10 = −2.88780E−14

TABLE 9-continued

Example 9

[Variable Distance Data]

|  | W Infinity | M Infinity | T Infinity | W Close point | M Close point | T Close point |
| --- | --- | --- | --- | --- | --- | --- |
| d0 | ∞ | ∞ | ∞ | 115.33 | 121.81 | 114.01 |
| β | — | — | — | −0.1237 | −0.1846 | −0.2688 |
| f | 16.48 | 25.22 | 33.95 | — | — | — |
| d8 | 26.754 | 7.684 | 0.500 | 26.754 | 7.684 | 0.500 |
| d17 | 2.000 | 7.900 | 9.425 | 2.000 | 7.900 | 9.425 |
| d21 | 11.786 | 5.887 | 4.361 | 10.002 | 2.909 | 0.209 |
| d24 | 0.150 | 0.150 | 0.150 | 1.935 | 3.128 | 4.301 |
| d27 | 5.019 | 17.035 | 34.140 | 5.019 | 17.035 | 34.140 |
| BF | 19.612 | 20.204 | 18.091 | 19.700 | 20.399 | 18.504 |

[Conditional Expression Correspondence Values]

(1) $(-f3)/fw = 4.726$
(2) $|m34|/fw = 0.451$
(3) $f5/(-f1) = 3.682$
(4) $|m12|/fw = 1.593$
(5) $f5/f4 = 0.586$
(6) $f4/f2 = 4.127$
(7) $(r1 + r2)/(r1 - r2) = 2.042$

Figure 34:
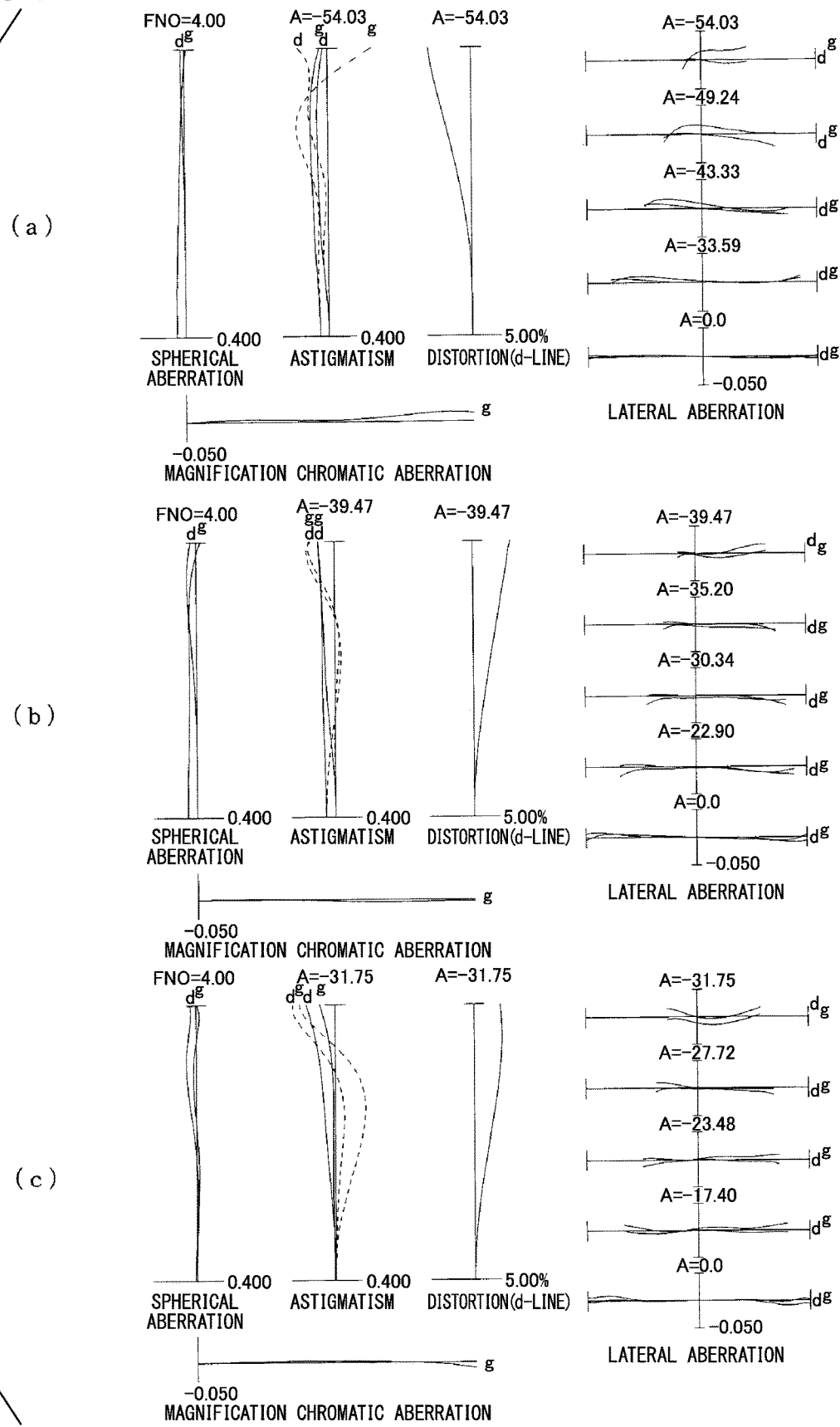
FIG. 34 shows graphs illustrating various aberrations of the zoom lens according to Example 9 upon focusing on an object at infinity, wherein parts (a), (b), and (c) are in the wide-angle end state, the intermediate focal length state, and the telephoto end state, respectively.

FIG. 34 shows graphs illustrating various aberrations of the zoom lens according to Example 9 upon focusing on an object at infinity, wherein parts (a), (b), and (d) are in the wide-angle end state, the intermediate focal length state, and the telephoto end state, respectively.

Figure 35:
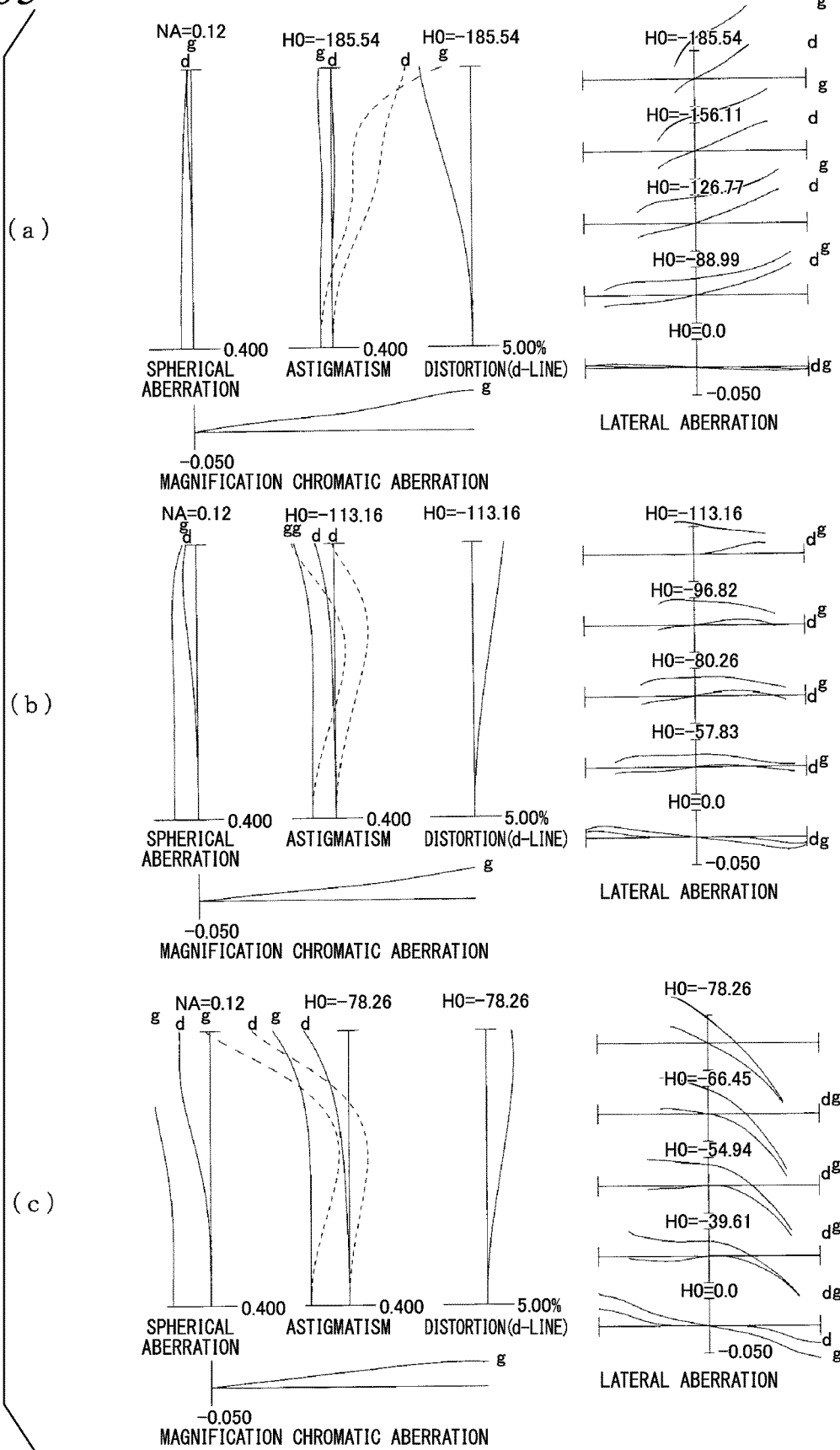
FIG. 35 shows graphs illustrating various aberrations of the zoom lens according to Example 9 upon focusing on an object at a close point, wherein parts (a), (b), and (c) are in the wide-angle end state, the intermediate focal length state, and the telephoto end state, respectively.

FIG. 35 shows graphs illustrating various aberrations of the zoom lens according to Example 9 upon focusing on an object at a close point, wherein parts (a), (b), and (d) are in the wide-angle end state, the intermediate focal length state, and the telephoto end state, respectively.

Figure 36:
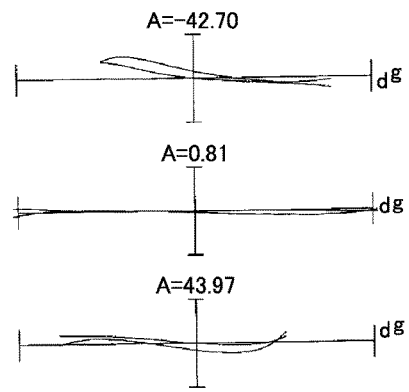
FIG. 36 shows graphs illustrating meridional lateral aberrations of the zoom lens according to Example 9 when vibration reduction is performed, wherein parts (a), (b), and (c) are in the wide-angle end state, the intermediate focal length state, and the telephoto end state, respectively.
Figure 36:
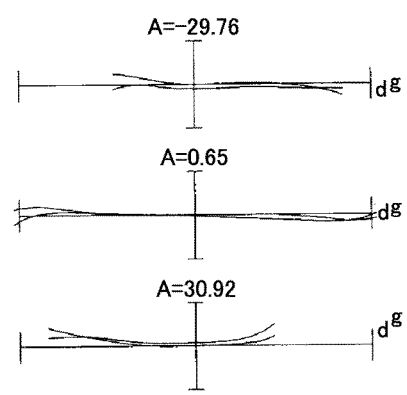
Figure 36:
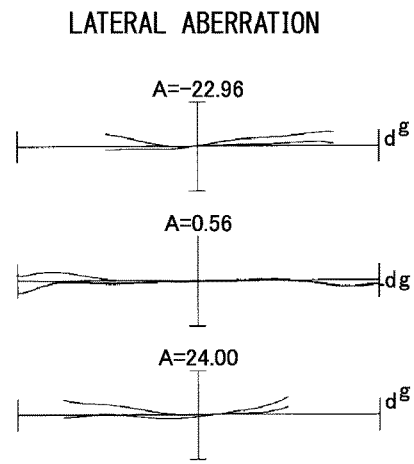

FIG. 36 shows graphs illustrating meridional lateral aberrations of the zoom lens according to Example 9 when vibration reduction is performed, wherein parts (a), (b), and (d) are in the wide-angle end state, the intermediate focal length state, and the telephoto end state, respectively.

It can be understood from the respective aberration diagrams that the zoom lens according to Example 9 can satisfactorily correct various aberrations in states ranging from the wide-angle end state to the telephoto end state and has an excellent optical performance upon vibration reduction.

Example 10

Figure 37:
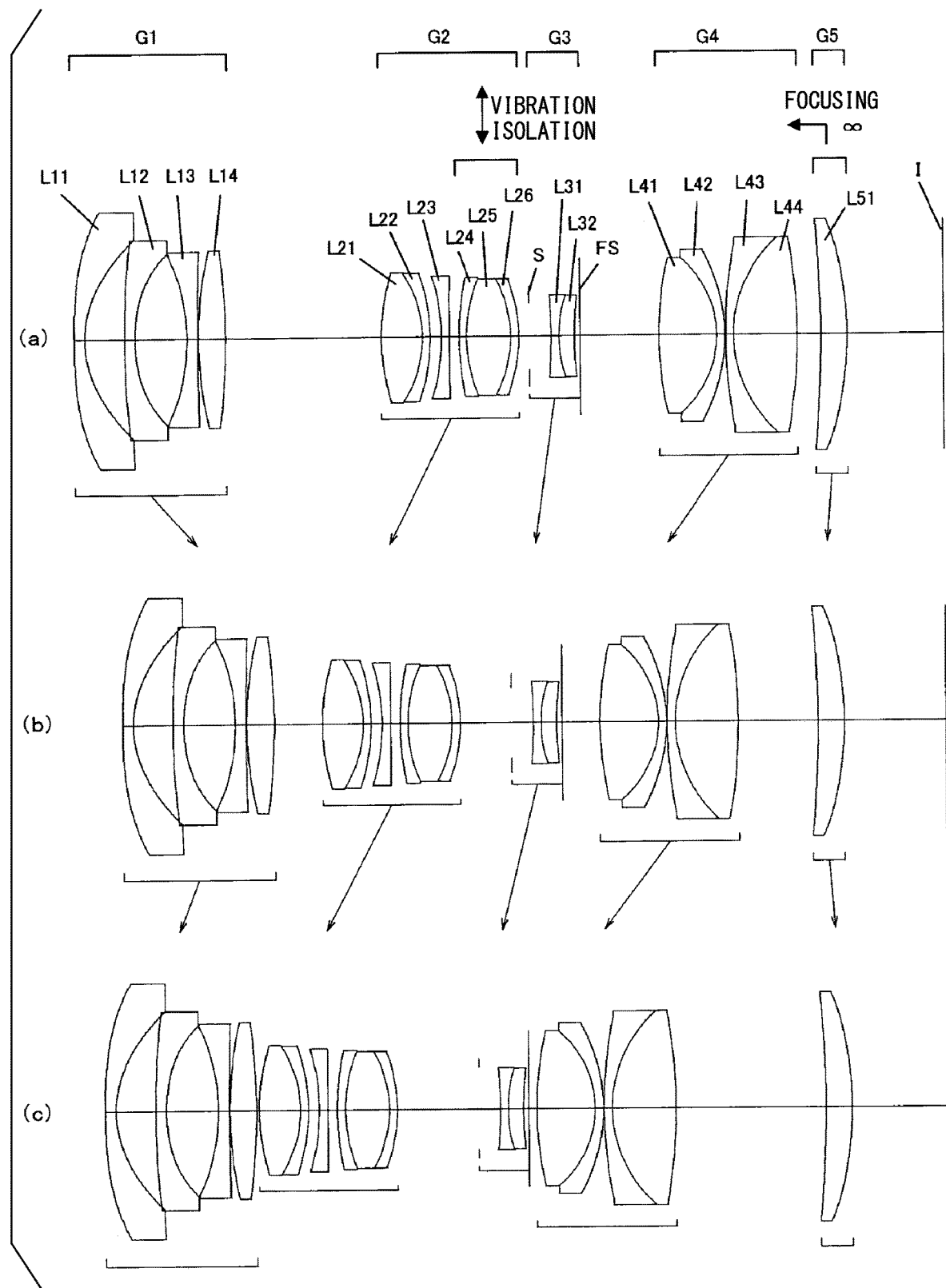
FIG. 37 is a cross-sectional views of a zoom lens according to Example 10, wherein parts (a), (b), and (c) are in a wide-angle end state, an intermediate focal length state, and a telephoto end state, respectively.

FIG. 37 is a cross-sectional view of a zoom lens according to Example 10, wherein parts (a), (b), and (d) are in a wide-angle end state, an intermediate focal length state, and a telephoto end state, respectively.

Arrows under each lens group in FIG. 37(*a*) indicate the moving directions of each lens group upon varying magnification from the wide-angle end state to the intermediate focal length state. Arrows under each lens group in FIG. 37(*b*) indicate the moving directions of each lens group upon varying magnification from the intermediate focal length state to the telephoto end state.

As illustrated in FIG. 37(*a*), a zoom lens according to this example is constituted by, in order from an object along an optical axis, a first lens group G1 having a negative refractive power, a second lens group G2 having a positive refractive power, a third lens group G3 having a negative refractive power, a fourth lens group G4 having a positive refractive power, and a fifth lens group G5 having a positive refractive power.

The first lens group G1 is constituted by, in order from the object along the optical axis, a negative meniscus lens L11 having a convex surface oriented toward the object side, a negative meniscus lens L12 having a convex surface oriented toward the object side, a biconcave lens L13, and a biconvex lens L14. The negative meniscus lens L11 is an aspherical lens of which the object-side lens surface and the image-side lens surface are aspherical surfaces. The negative meniscus lens L12 is an aspherical lens of which the image-side lens surface is an aspherical surface.

The second lens group G2 is constituted by, in order from the object along the optical axis, a cemented lens including a biconvex lens L21 and a negative meniscus lens L22 having a concave surface oriented toward the object side, a biconcave lens L23, and a cemented lens including a negative meniscus lens L24 having a convex surface oriented toward the object side, a biconvex lens L25, and a negative meniscus lens L26 having a concave surface oriented toward the object side. The biconvex lens L21 is an aspherical lens of which the object-side lens surface is an aspherical surface. The negative meniscus lens L24 is an aspherical lens of which the object-side lens surface is an aspherical surface.

The third lens group G3 is constituted by, in order from the object along the optical axis, an aperture stop S, a cemented lens including a biconcave lens L31 and a positive meniscus lens L32 having a convex surface oriented toward the object side, and a flare-cut diaphragm FS.

The fourth lens group G4 is constituted by, in order from the object along the optical axis, a cemented lens including a biconvex lens L41 and a negative meniscus lens L42 having a concave surface oriented toward the object side and a cemented lens including a negative meniscus lens L43 having a convex surface oriented toward the object side and a biconvex lens L44. The negative meniscus lens L42 is an aspherical lens of which the image-side lens surface is an aspherical surface.

The fifth lens group G5 is constituted by a positive meniscus lens L51 having a concave surface oriented toward the object side. The positive meniscus lens L51 is an aspherical lens of which the object-side lens surface and the image-side lens surface are aspherical surfaces.

An image sensor (not illustrated) configured as a CCD, CMOS, or the like is disposed at the image plane I.

In the zoom lens according to this example having the above-described configuration, when the zoom lens performs varying magnification from the wide-angle end state to the telephoto end state, the first lens group G1, the second lens group G2, the third lens group G3, the fourth lens group G4, and the fifth lens group G5 move along the optical axis in relation to the image plane I such that the distance between the first and second lens groups G1 and G2 decreases, the distance between the second and third lens groups G2 and G3 increases, the distance between the third and fourth lens groups G3 and G4 decreases, and the distance between the fourth and fifth lens groups G4 and G5 increases. Specifically, when the zoom lens performs varying magnification, the first lens group G1 is moved toward the image plane I and is then moved toward the object side, the second and fourth lens groups G2 and G4 are moved integrally toward the object side, the third lens group G3 is moved toward the object side, and the fifth lens group G5 is moved toward the object side and is then moved toward the image plane I.

The aperture stop S is disposed between the second and third lens groups G2 and G3 and is moved together with the third lens group G3 upon varying magnification from the wide-angle end state to the telephoto end state.

Moreover, the zoom lens according to this example performs focusing from an object at infinity to an object at a close distance by moving the fifth lens group G5 toward the object side.

Moreover, the zoom lens according to this example performs image plane correction (that is, vibration reduction) when image blur occurs by moving the cemented lens of the second lens group G2 including the negative meniscus lens L24 having a convex surface oriented toward the object side, the biconvex lens L25, and the negative meniscus lens L26 having a concave surface oriented toward the object side in such a direction as to include a component in the direction orthogonal to the optical axis as a vibration-reduction lens group.

Here, when the focal length of an entire system of the zoom lens according to this example is f and the ratio of a moving distance of an image on the image plane I with respect to a moving distance of the vibration-reduction lens group during blur correction is K, in order to correct rotation blur of angle θ, the vibration-reduction lens group may be shifted in the direction orthogonal to the optical axis by (f·tan θ)/K.

In the zoom lens according to this example, in the wide-angle end state, since the vibration reduction coefficient K is 0.97 and the focal length is 16.48 (mm) (see Table 11 below), the moving distance of the vibration-reduction lens group for correcting the rotation blur of 0.81° is 0.24 (mm). Moreover, in the intermediate focal length state, since the vibration reduction coefficient K is 1.19 and the focal length is 25.21 (mm) (see Table 11 below), the moving distance of the vibration-reduction lens group for correcting the rotation blur of 0.66° is 0.24 (mm). Moreover, in the telephoto end state, since the vibration reduction coefficient K is 1.43 and the focal length is 33.94 (mm) (see Table 11 below), the moving distance of the vibration-reduction lens group for correcting the rotation blur of 0.57° is 0.23 (mm).

Table 10 below illustrates the specification values of the zoom lens according to Example 10.

TABLE 10

| Example 10 | | | |
|---|---|---|---|
| [Overall Specification] | | | |
| | W | M | T |
| f | 16.48 | 25.21 | 33.94 |
| FNO | 4.00 | 4.00 | 4.00 |
| ω | 54.1 | 40.4 | 32.8 |
| Y | 21.64 | 21.64 | 21.64 |
| TL | 162.327 | 153.706 | 157.417 |
| BF | 18.026 | 19.051 | 18.015 |
| [Surface Data] | | | |
| Surface number | r | d | nd | νd |
|---|---|---|---|---|
| | Object plane | ∞ | | |
| *1) | 132.59820 | 2.000 | 1.82080 | 42.7 |
| *2) | 19.32271 | 7.442 | | |
| 3) | 160.87743 | 2.000 | 1.90043 | 37.4 |
| *4) | 32.91214 | 9.741 | | |
| 5) | −38.07464 | 2.000 | 1.49782 | 82.6 |
| 6) | 561.24096 | 0.150 | | |
| 7) | 73.09225 | 5.033 | 2.00100 | 29.1 |
| 8) | −129.44599 | (Variable) | | |
| *9) | 40.27118 | 7.618 | 1.58313 | 59.4 |
| 10) | −22.79658 | 1.500 | 1.65160 | 58.6 |
| 11) | −37.12857 | 2.061 | | |
| 12) | −39.17300 | 1.500 | 1.51742 | 52.2 |
| 13) | 1874.52540 | 1.776 | | |
| *14) | 51.35062 | 1.500 | 1.79504 | 28.7 |
| 15) | 28.77558 | 8.221 | 1.48749 | 70.3 |
| 16) | −23.13956 | 1.500 | 1.68893 | 31.2 |
| 17) | −31.27181 | (Variable) | | |
| 18) | (Diaphragm) | ∞ | 4.000 | |

TABLE 10-continued

| Example 10 | | | | |
|---|---|---|---|---|
| 19) | −105.52859 | 1.500 | 1.74400 | 44.8 |
| 20) | 25.92479 | 2.859 | 1.80244 | 25.6 |
| 21) | 69.72964 | 1.000 | | |
| 22) | (FS) | ∞ | (Variable) | |
| 23) | 65.71858 | 10.859 | 1.49782 | 82.6 |
| 24) | −19.28535 | 1.500 | 1.88202 | 37.2 |
| *25) | −31.97958 | 0.150 | | |
| 26) | 89.97758 | 1.500 | 1.90043 | 37.4 |
| 27) | 24.75006 | 11.838 | 1.49782 | 82.6 |
| 28) | −103.72759 | (Variable) | | |
| *29) | −135.00000 | 4.892 | 1.77250 | 49.5 |
| *30) | −59.90604 | (BF) | | |
| Image plane | ∞ | | | |

[Lens Group Data]

| | Starting surface | Focal distance |
|---|---|---|
| G1 | 1 | −21.74 |
| G2 | 9 | 34.29 |
| G3 | 18 | −60.80 |
| G4 | 23 | 73.88 |
| G5 | 29 | 135.56 |

[Aspheric Data]

Surface number: 1

$\kappa = 0.00000E+00$
$A4 = 1.16094E-05$
$A6 = -9.06420E-09$
$A8 = 2.81639E-12$
$A10 = 2.24774E-15$ Surface number: 2

$\kappa = 1.30300E-01$
$A4 = -1.18813E-05$
$A6 = 5.68936E-08$
$A8 = -9.29931E-11$
$A10 = 2.59824E-14$ Surface number: 4

$\kappa = 1.00000E+00$
$A4 = 2.67754E-05$
$A6 = -6.40784E-09$
$A8 = -5.02628E-11$
$A10 = 2.60885E-13$ Surface number: 9

$\kappa = 1.00000E+00$
$A4 = -2.85903E-06$
$A6 = -6.88788E-09$
$A8 = 0.00000E+00$
$A10 = 0.00000E+00$ Surface number: 14

$\kappa = 1.00000E+00$
$A4 = -4.52862E-06$
$A6 = 3.83779E-09$
$A8 = -2.25240E-11$
$A10 = 7.59629E-14$ Surface number: 25

$\kappa = 1.00000E+00$
$A4 = 4.32494E-06$
$A6 = 5.82097E-09$
$A8 = -4.56687E-11$
$A10 = 3.78592E-14$ Surface number: 29

$\kappa = 1.00000E+00$
$A4 = 9.68518E-06$
$A6 = -2.01079E-08$
$A8 = 1.31643E-11$
$A10 = -2.09414E-15$ TABLE 10-continued Example 10

Surface number: 30

κ = 1.00000E+00
A4 = 8.93441E−06
A6 = −2.66479E−08
A8 = 2.35900E−11
A10 = −9.65459E−15

[Variable Distance Data]

|  | W Infinity | M Infinity | T Infinity | W Close point | M Close point | T Close point |
|---|---|---|---|---|---|---|
| d0 | ∞ | ∞ | ∞ | 230.00 | 238.63 | 234.90 |
| β | — | — | — | −0.0651 | −0.0951 | −0.1271 |
| f | 16.48 | 25.21 | 33.94 | — | — | — |
| d8 | 29.064 | 8.952 | 0.500 | 29.064 | 8.952 | 0.500 |
| d17 | 2.000 | 9.683 | 15.225 | 2.000 | 9.683 | 15.225 |
| d22 | 14.725 | 7.042 | 1.500 | 14.725 | 7.042 | 1.500 |
| d28 | 4.371 | 14.839 | 28.037 | 0.147 | 6.667 | 14.415 |
| BF | 18.026 | 19.051 | 18.015 | 22.275 | 22.275 | 31.731 |

[Conditional Expression Correspondence Values]

(1) (−f3)/fw = 3.690
(2) |m34|/fw = 0.803
(3) f5/(−f1) = 6.234
(4) |m12|/fw = 1.734
(5) f5/f4 = 1.835
(6) f4/f2 = 2.155
(7) (r1 + r2)/(r1 − r2) = 2.596

Figure 38:
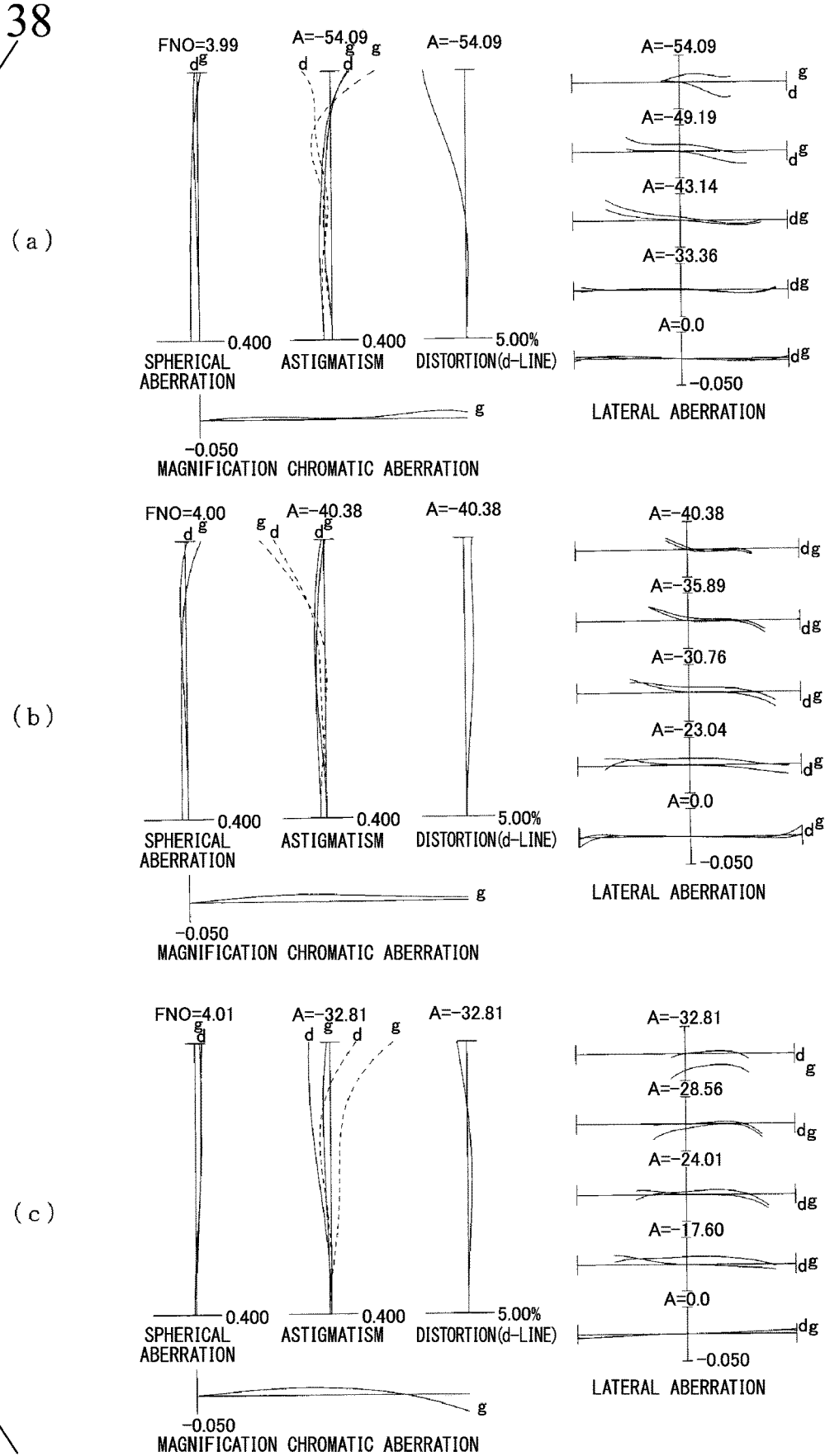
FIG. 38 shows graphs illustrating various aberrations of the zoom lens according to Example 10 upon focusing on an object at infinity, wherein parts (a), (b), and (c) are in the wide-angle end state, the intermediate focal length state, and the telephoto end state, respectively.

FIG. 38 shows graphs illustrating various aberrations of the zoom lens according to Example 10 upon focusing on an object at infinity, wherein parts (a), (b), and (d) are in the wide-angle end state, the intermediate focal length state, and the telephoto end state, respectively.

Figure 39:
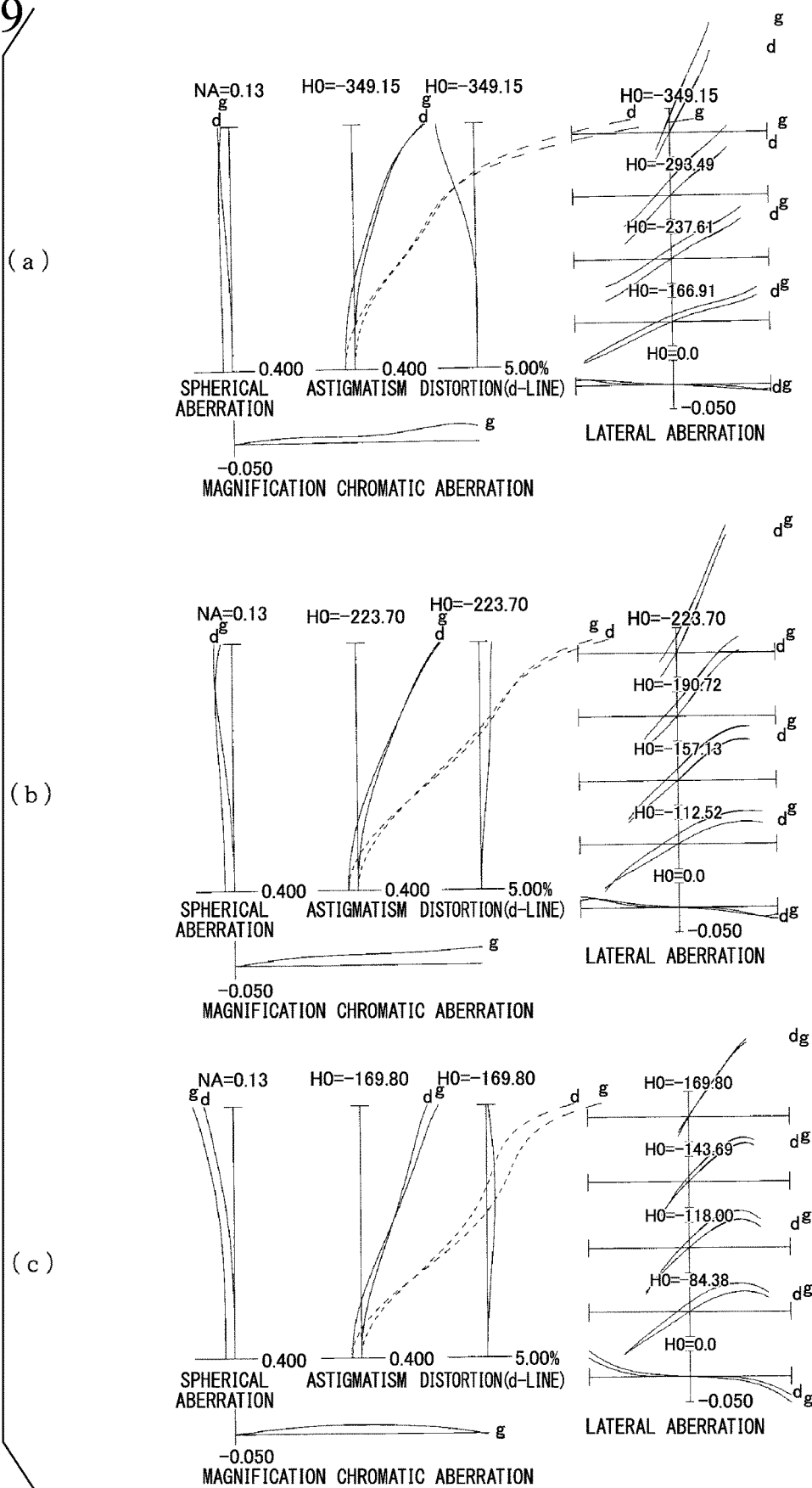
FIG. 39 shows graphs illustrating various aberrations of the zoom lens according to Example 10 upon focusing on an object at a close point, wherein parts (a), (b), and (c) are in the wide-angle end state, the intermediate focal length state, and the telephoto end state, respectively.

FIG. 39 shows graphs illustrating various aberrations of the zoom lens according to Example 10 upon focusing on an object at a close point in, wherein parts (a), (b), and (d) are in the wide-angle end state, the intermediate focal length state, and the telephoto end state, respectively.

Figure 40:
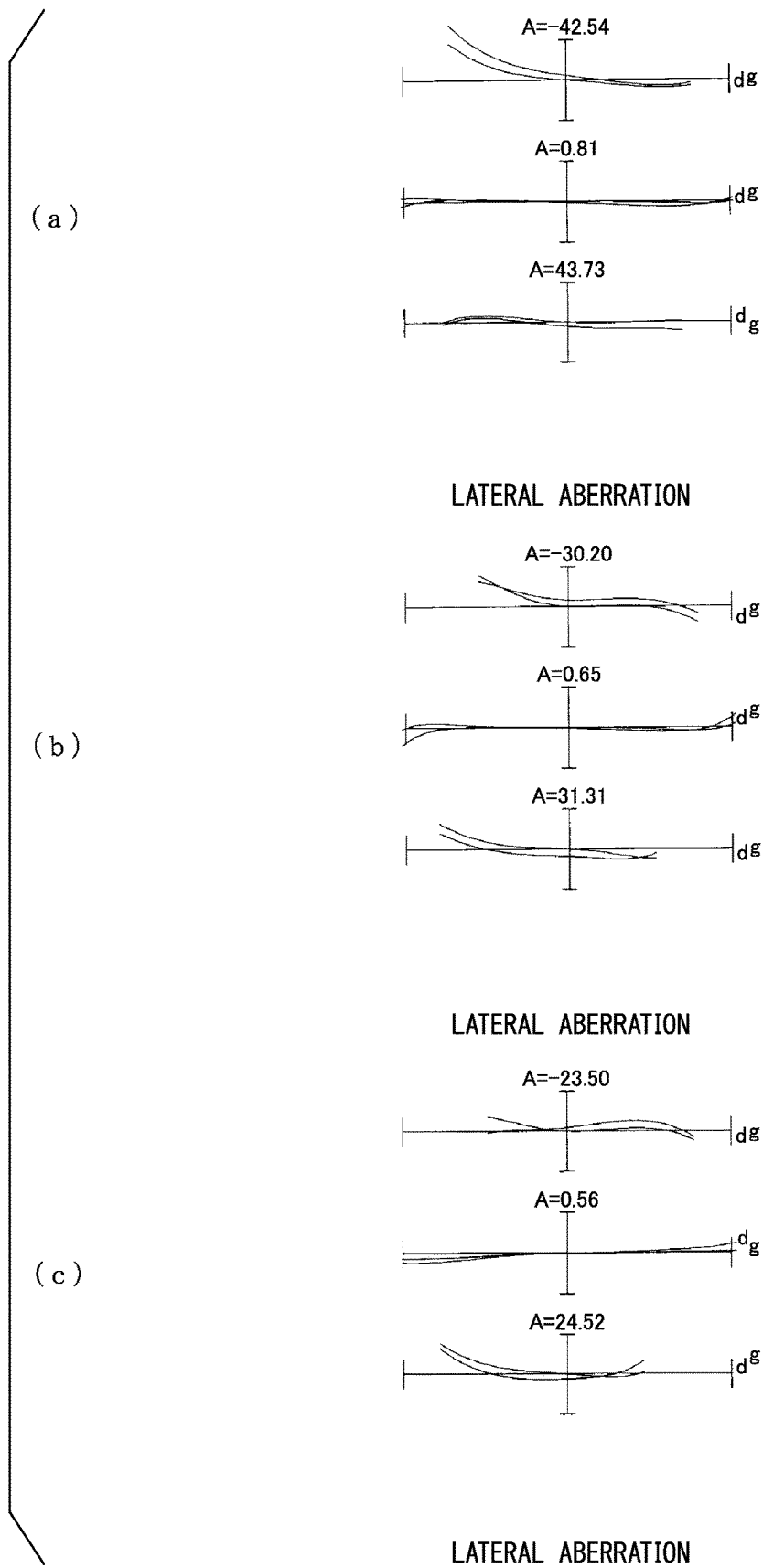
FIG. 40 shows graphs illustrating meridional lateral aberrations of the zoom lens according to Example 10 when vibration reduction is performed, wherein parts (a), (b), and (c) are in the wide-angle end state, the intermediate focal length state, and the telephoto end state, respectively.

FIG. 40 shows graphs illustrating meridional lateral aberrations of the zoom lens according to Example 10 when vibration reduction is performed, wherein parts (a), (b), and (d) are in the wide-angle end state, the intermediate focal length state, and the telephoto end state, respectively.

It can be understood from the respective aberration diagrams that the zoom lens according to Example 10 can satisfactorily correct various aberrations in states ranging from the wide-angle end state to the telephoto end state and has an excellent optical performance upon vibration reduction.

As described above, according to the respective examples, it is possible to implement a zoom lens having an F-number for brightness and an excellent optical performance. Particularly, it is possible to implement a zoom lens of which the variable magnification ratio (variable power ratio) is between approximately 1.5 and 2.5 and which has a brightness of an F-number of approximately 2.8 to 4.0 and a wide angle of view. Moreover, it is possible to decrease the size of a vibration-reduction lens group and to achieve an excellent optical performance upon vibration reduction. According to the respective examples, it is possible to implement a zoom lens of which the half-angle of view (unit: degrees) in the wide-angle end state is in the range of 39<ωW<57 (more preferably, 42<ωW<57).

Moreover, it is preferable that the half-angle of view (unit: degrees) in the wide-angle end state of the zoom lens be in the range of 39<ωW<57 (more specifically, 42<ωW<57). Moreover, it is preferable that the F-number of the zoom lens be approximately constant when performing varying magnification from the wide-angle end state to the telephoto end state. Moreover, it is preferable that a motor for moving the focusing lens group of the zoom lens be a step motor. Furthermore, it is preferable that the first lens group G1 move toward the image plane I and then moves toward the object side when the zoom lens performs varying magnification from the wide-angle end state to the telephoto end state. Moreover, it is preferable that the fifth lens group G5 be immovable in relation to the image plane I when the zoom lens performs varying magnification from the wide-angle end state to the telephoto end state. Moreover, it is preferable that the second and fourth lens groups G2 and G4 move toward the object side along the same moving trajectory by the same moving distance when the zoom lens performs varying magnification from the wide-angle end state to the telephoto end state. Moreover, the second and fourth lens groups G2 and G4 move toward the object side but do not move toward the image side when the zoom lens performs varying magnification from the wide-angle end state to the telephoto end state. Moreover, the second, third, and fourth lens groups G2, G3, and G4 may move in the same direction when the zoom lens performs varying magnification. Moreover, the moving distance of the second and fourth lens groups G2 and G4 may be larger than the moving distance of the third lens group G3 when the zoom lens performs varying magnification from the wide-angle end state to the telephoto end state. Moreover, the second and fourth lens groups G2 and G4 of the zoom lens may be fixed to the same barrel member. Moreover, it is preferable that the distance between the first and second lens groups G1 and G2 change, the distance between the second and third lens groups G2 and G3 changes, the distance between the third and fourth lens groups G3 and G4 changes, and the distance between the fourth and fifth lens groups G4 and G5 changes when the zoom lens performs varying magnification from the wide-angle end state to the telephoto end state.

The respective examples illustrate specific examples, but the present invention is not limited thereto. The following content can be appropriately employed within a range where the optical performance of the zoom lens is not diminished.

Although the numbered examples of a five-group configuration have been illustrated as numbered examples of the zoom lens, the present invention can be applied to other group configurations such as a six-group configuration or the like, for example. Specifically, a configuration in which a lens or a lens group is added to the side closest to the object and a configuration in which a lens or a lens group is added to the side closest to the image may be employed. A lens group refers to a portion having at least one lens isolated by air space.

Moreover, in the zoom lens, a single lens group or plurality of lens groups or a partial lens group may be moved in the optical axis direction as a focusing lens group so as to perform focusing from an object at infinity to an object at a close distance. This focusing lens group can be applied to autofocus and is also suitable for driving based on an autofocus motor (for example, an ultrasonic motor or the like). Although it is particularly preferable that a portion of the second lens group G2 be used as the focusing lens group, a portion or the entire portion of the third and fifth lens groups G3 and G5 may be used as the focusing lens group and the entire second lens group G2 may be used as the focusing lens group.

In the zoom lens, an entire lens group or a partial lens group may be moved so as to have a component in the direction orthogonal to the optical axis or may be rotated (oscillated) in the direction including the optical axis so as to function as a vibration-reduction lens group that corrects image blur occurring due to camera shake or the like. Although it is particularly preferable that the entire third lens group G3 be used as the vibration-reduction lens group, the entire portion or a portion of the fourth lens group G4 may be used as the vibration-reduction lens group and a portion of the third lens group may be used as the vibration-reduction lens group.

Moreover, the lens surfaces of lenses that form the zoom lens may be formed as a spherical surface or a flat surface and may be formed as an aspherical surface. When a lens surface is a spherical surface or a flat surface, it is possible to facilitate lens processing, assembly, and adjustment and to prevent deterioration of optical performance resulting from errors in the processing, assembly and adjustment. Moreover, deterioration of the rendering performance is little even when the image plane is shifted. When a lens surface is an aspherical surface, the aspherical surface may be an aspherical surface obtained by grinding, a glass-molded aspherical surface obtained by molding glass into an aspherical surface, or a composite aspherical surface obtained by forming a resin on the surface of glass into an aspherical shape. Moreover, the lens surface may be a diffraction surface and may be a refractive index distributed lens (a GRIN lens) or a plastic lens.

In the zoom lens, although it is preferable that the aperture stop be disposed between the second and third lens groups G2 and G3, the role of the aperture stop may be substituted by the frame of a lens without providing a separate member as the aperture stop.

Moreover, the lens surfaces of lenses that form the zoom lens may be coated with an anti-reflection film which has high transmittance in a wide wavelength region in order to decrease flare and ghosting and achieve satisfactory optical performance with high contrast.

Next, a camera having a zoom lens will be described with reference to FIG. 41.

Figure 41:
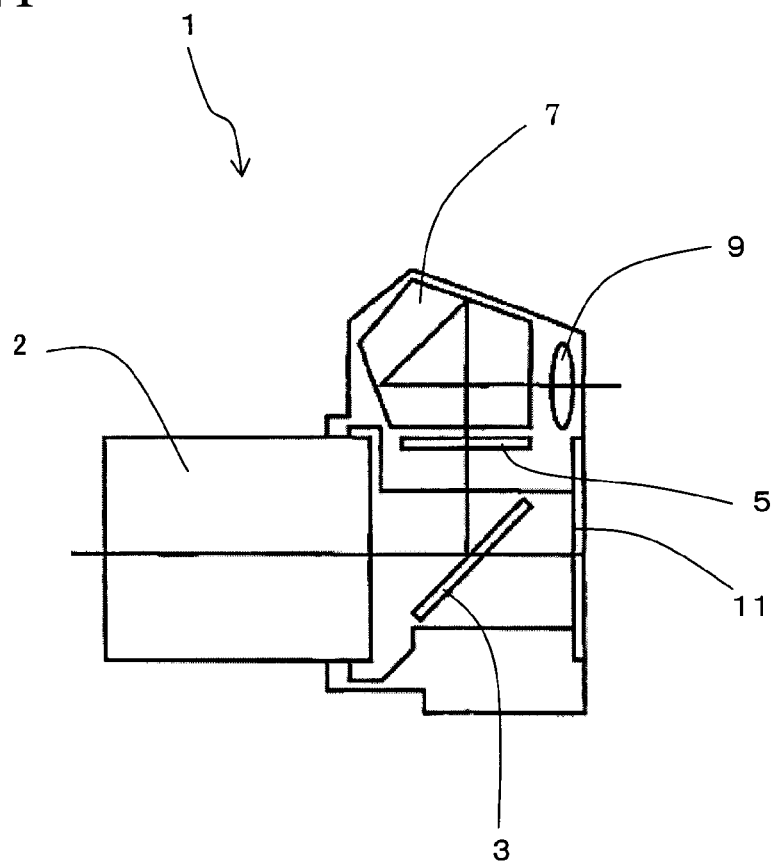
FIG. 41 is a schematic diagram illustrating a configuration of a camera having a zoom lens.

FIG. 41 is a schematic diagram illustrating a configuration of a camera having a zoom lens.

As illustrated in FIG. 41, a camera 1 is a digital single-lens reflex camera having the zoom lens according to Example 1 as an image capturing lens 2.

In the digital single-lens reflex camera 1 illustrated in FIG. 41, light from an object (a subject) (not illustrated) is collected by the image capturing lens 2 and is imaged on an imaging plate 5 via a quick return mirror 3. Moreover, the light imaged on the imaging plate 5 is reflected a plurality of times in a pentagonal prism 7 and is guided to an eye lens 9. In this way, a photographer can observe an object (subject) image via the eye lens 9 as an erect image.

When a release button (not illustrated) is pressed by the photographer, the quick return mirror 4 moves out of an optical path and the object (subject) light collected by the image capturing lens 3 forms a subject image on an image sensor 11. In this way, light from an object is imaged by the image sensor 11 and is stored in a memory (not illustrated) as an object image. In this way, the photographer can capture an image of the object using the camera 1.

Here, the zoom lens according to Example 1 mounted on the camera 1 as the image capturing lens 2 is a zoom lens having an F-number for brightness and an excellent optical performance. Therefore, the camera 1 is a camera having an excellent optical performance. A camera having the zoom lens according to any one of Examples 2 to 10 mounted thereon as the image capturing lens 2 can provide the same effects as the camera 1. Moreover, the camera 1 may hold the image capturing lens 2 in a detachable manner and may be formed integrally with the image capturing lens 2. Moreover, the camera 1 may be a camera which does not have a quick return mirror and the like.

Figure 42:
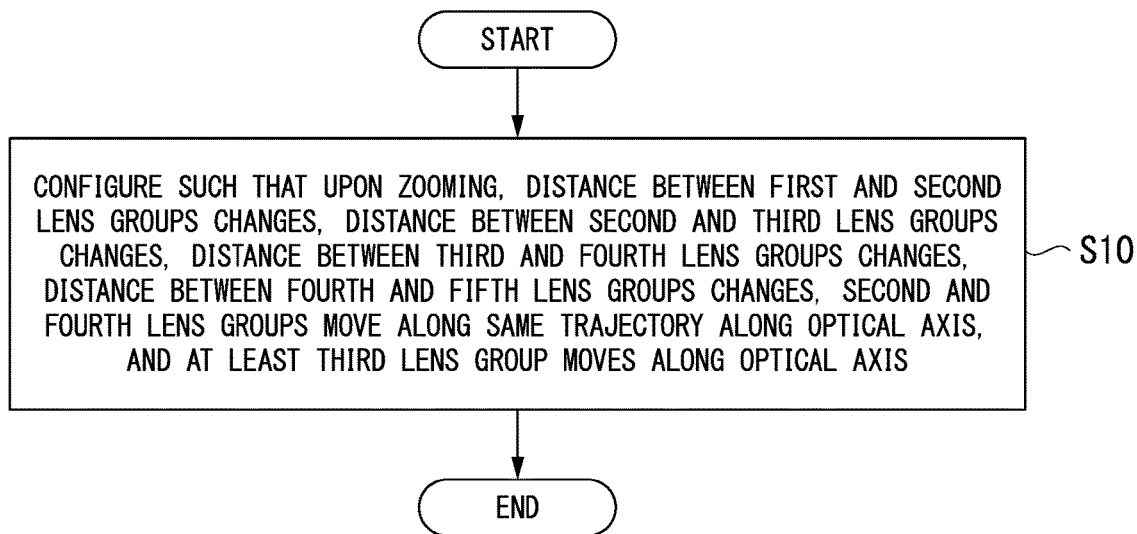
FIG. 42 is a diagram illustrating an outline of a method for manufacturing a zoom lens.
Figure 43:
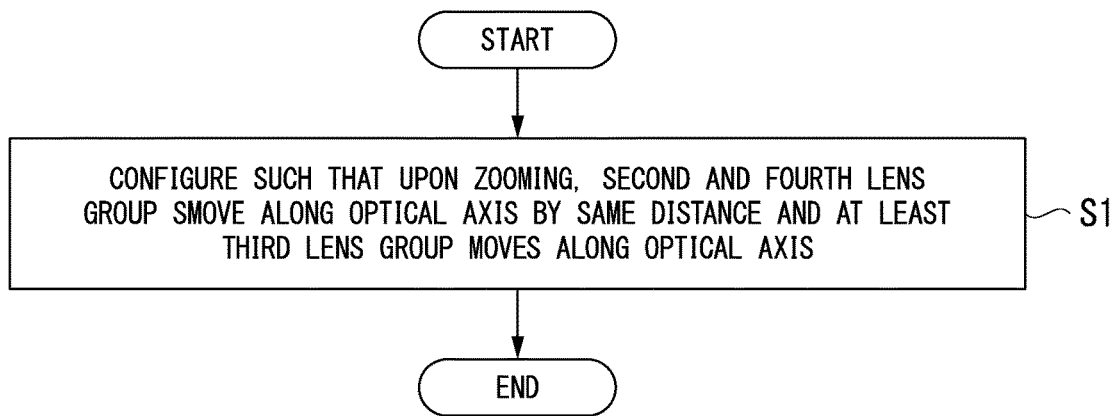
FIG. 43 is a diagram illustrating an outline of a method for manufacturing a zoom lens.

Next, a zoom lens manufacturing method will be described. FIGS. 42 and 43 are diagrams illustrating an outline of a zoom lens manufacturing method.

In the example illustrated in FIG. 42, a zoom lens manufacturing method is a method for manufacturing a zoom lens including, in order from an object along an optical axis, a first lens group having a negative refractive power, a second lens group having a positive refractive power, a third lens group having a negative refractive power, a fourth lens group, and a fifth lens group and includes step 10 as illustrated in FIG. 42.

In step S10, when the zoom lens performs varying magnification, the distance between the first and second lens groups changes, the distance between the second and third lens groups changes, the distance between the third and fourth lens groups changes, the distance between the fourth and fifth lens groups changes, the second and fourth lens groups move along the same trajectory along the optical axis, and at least the third lens group moves along the optical axis.

Alternatively, in the example illustrated in FIG. 43, a zoom lens manufacturing method is a method for manufacturing a zoom lens including, in order from an object along an optical axis, a first lens group having a negative refractive power, a second lens group having a positive refractive power, a third lens group having a negative refractive power, a fourth lens group having a positive refractive power, and a fifth lens group having a positive refractive power, and includes step S1 as illustrated in FIG. 43.

In step S1, when the zoom lens performs varying magnification, the second and fourth lens groups move by the same distance along the optical axis, and at least the third lens group moves along the optical axis.

According to these zoom lens manufacturing methods, it is possible to manufacture a zoom lens having an F-number for brightness and an excellent optical performance. Particularly, it is possible to manufacture a zoom lens of which the zoom ratio is between approximately 1.5 and 2.5 and which has a brightness of an F-number of approximately 2.8 to 4.0 and a wide angle of view.

EXPLANATION OF NUMERALS AND CHARACTERS

G1 First lens group
G2 Second lens group
G3 Third lens group
G4 Fourth lens group
G5 Fifth lens group
Gf Focusing lens group
S Aperture stop
FS Flare-cut diaphragm
I Image plane
1 Optical apparatus
2 Image capturing lens
3 Quick return mirror
Imaging plate
7 Pentagonal prism
9 Eye lens
11 Image sensor

The invention claimed is:

1. A zoom lens comprising, in order from an object along an optical axis:
a first lens group having a negative refractive power;
a second lens group having a positive refractive power;
a third lens group having a negative refractive power; and
a fourth lens group, wherein
when the zoom lens performs zooming, the first lens group, the second lens group, the third lens group, and the fourth lens group move along the optical axis, a distance between the first and second lens groups changes, a distance between the second and third lens groups changes, and a distance between the third and fourth lens groups changes,
the first lens group comprises, in order from the object along the optical axis, a negative lens, a negative lens, a negative lens, and a positive lens,
the third lens group consists of one lens component having negative refractive power, and
the following conditional expression is satisfied:

$1.500 < (-f3)/fw < 7.000$ where
f3: a focal length of the third lens group,
fw: a focal length of the zoom lens in a wide-angle end state.

2. The zoom lens according to claim 1, wherein the following conditional expression is satisfied:

$0.050 < |m34|/fw < 1.500$ where
m34: a change in distance between the third lens group and the fourth lens group along the optical axis upon zooming from the wide-angle end state to a telephoto end state.

3. The zoom lens according to claim 1, wherein the following conditional expression is satisfied:

$0.300 < |m12|/fw < 5.000$ where
m12: a change in distance between the first lens group and the second lens group along the optical axis upon zooming from the wide-angle end state to a telephoto end state.

4. The zoom lens according to claim 1, wherein the second lens group has a positive lens component positioned closest to the object.

5. The zoom lens according to claim 1, wherein the fourth lens group has a positive lens component positioned closest to the object.

6. An optical apparatus having the zoom lens of claim 1.

7. A method for manufacturing a zoom lens, wherein the zoom lens includes, in order from an object along an optical axis: a first lens group having a negative refractive power; a second lens group having a positive refractive power; a third lens group having a negative refractive power; and a fourth lens group,
the method comprising:
arranging the lens groups such that when the zoom lens performs zooming, the first lens group, the second lens group, the third lens group, and the fourth lens group move along the optical axis, a distance between the first and second lens groups changes, a distance between the second and third lens groups changes, and a distance between the third and fourth lens groups changes;
configuring the first lens group to comprise, in order from the object along the optical axis, a negative lens, a negative lens, a negative lens, and a positive lens;
configuring the third lens group to consist of one lens component having negative refractive power; and
satisfying the following conditional expression:

$1.500 < (-f3)/fw < 7.000$ where
f3: a focal length of the third lens group,
fw: a focal length of the zoom lens in a wide-angle end state.

* * * * *